(12) United States Patent
Yardibi et al.

(10) Patent No.: US 12,316,965 B2
(45) Date of Patent: May 27, 2025

(54) ADAPTIVE OVERLAY STABILIZATION OF FALSE COLOR OVERLAY HEATMAPS

(71) Applicant: Cilag GmbH International, Zug (CH)

(72) Inventors: Tarik Yardibi, Cambridge, MA (US); Steen Hansen, Copenhagen (DK)

(73) Assignee: Cilag GmbH International, Zug (CH)

( * ) Notice: Subject to any disclaimer, the term of this patent is extended or adjusted under 35 U.S.C. 154(b) by 278 days.

(21) Appl. No.: 18/174,818

(22) Filed: Feb. 27, 2023

(65) Prior Publication Data

US 2024/0292099 A1    Aug. 29, 2024

(51) Int. Cl.
*A61B 1/04* (2006.01)
*H04N 13/15* (2018.01)
(Continued)

(52) U.S. Cl.
CPC .......... *H04N 23/683* (2023.01); *H04N 13/15* (2018.05); *H04N 23/555* (2023.01);
(Continued)

(58) Field of Classification Search
CPC .... H04N 23/683; H04N 13/15; H04N 23/555; H04N 23/6811; H04N 23/6812;
(Continued)

(56) References Cited

U.S. PATENT DOCUMENTS 8,045,850 B2    10/2011    Tanoue
8,248,414 B2    8/2012    Gattani et al.
(Continued)

FOREIGN PATENT DOCUMENTS

| CN | 107256552 B | 8/2020 |
|---|---|---|
| WO | WO 2013093761 A2 | 6/2013 |
| WO | WO 2022054400 A1 | 3/2022 |

OTHER PUBLICATIONS

"Puerto-Souza Gustavo et al: ""Toward Long-Term and Accurate Augmented-Reality for Monocular Endoscopic Videos""", IEEE Transactions on Biomedical Engineering, IEEE, USA, vol. 61, No. 10, Oct. 1, 2014".

(Continued)

*Primary Examiner* — Howard D Brown, Jr.
(74) *Attorney, Agent, or Firm* — TechLaw Ventures, PLLC; Terrence J. Edwards

(57) ABSTRACT

Systems for endoscopic visualization with advanced overlay image frames including color image data and multispectral or fluorescence image data. A system includes an image sensor comprising a pixel array that detects electromagnetic radiation and reads out a plurality of data frames. The system includes an image sensor processor that receives the plurality of data frames read out by the image sensor, wherein the plurality of data frames comprises a plurality of color data frames and a plurality of advanced data frames. The image signal processor renders a video stream comprising a plurality of advanced overlay data frames, wherein each of the plurality of advanced overlay data frames comprises a color data frame and a false color overlay generated based on an advanced data frame. The image signal processor executes (Continued)

an adaptive persistence algorithm to stabilize movement of the false color overlay across the plurality of advanced overlay data frames.

20 Claims, 23 Drawing Sheets

(51) Int. Cl.
    *H04N 23/50*          (2023.01)
    *H04N 23/68*          (2023.01)
    *H04N 23/84*          (2023.01)
    *H04N 25/78*          (2023.01)
    *H04N 13/00*          (2018.01)

(52) U.S. Cl.
    CPC ..... *H04N 23/6811* (2023.01); *H04N 23/6812* (2023.01); *H04N 23/84* (2023.01); *H04N 25/78* (2023.01); *H04N 2013/0081* (2013.01)

(58) Field of Classification Search
    CPC .................. H04N 23/84; H04N 25/78; H04N 2013/0081; H04N 5/272
    See application file for complete search history.

(56) References Cited

U.S. PATENT DOCUMENTS

| | | |
|---|---|---|
| 8,443,279 B1 | 5/2013 | Hameed et al. |
| 9,092,556 B2 | 7/2015 | Amble et al. |
| 9,153,284 B2 | 10/2015 | Shibata |
| 9,462,234 B2 | 10/2016 | Blanquart et al. |
| 9,492,060 B2 | 11/2016 | Blanquart |
| 9,509,917 B2 | 11/2016 | Blanquart et al. |
| 9,516,239 B2 | 12/2016 | Blanquart et al. |
| 9,621,817 B2 | 4/2017 | Blanquart et al. |
| 9,635,343 B2 | 4/2017 | Kasumi |
| 9,641,799 B2 | 5/2017 | Smurro |
| 9,641,815 B2 | 5/2017 | Richardson et al. |
| 9,762,879 B2 | 9/2017 | Blanquart et al. |
| 9,777,913 B2 | 10/2017 | Talbert et al. |
| 9,980,629 B2 | 5/2018 | King |
| 10,075,626 B2 | 9/2018 | Blanquart et al. |
| 10,134,126 B2 | 11/2018 | Fram |
| 10,165,195 B2 | 12/2018 | Blanquart et al. |
| 10,205,877 B2 | 2/2019 | Richardson et al. |
| 10,206,561 B2 | 2/2019 | Wichern et al. |
| 10,250,819 B2 | 4/2019 | Hosono et al. |
| 10,251,530 B2 | 4/2019 | Henley et al. |
| 10,277,875 B2 | 4/2019 | Blanquart et al. |
| 10,299,732 B2 | 5/2019 | Henley et al. |
| 10,341,588 B2 | 7/2019 | Richardson et al. |
| 10,341,593 B2 | 7/2019 | Blanquart et al. |
| 10,342,410 B2 | 7/2019 | Schwartz et al. |
| 10,362,240 B2 | 7/2019 | Richardson et al. |
| 10,389,926 B2 | 8/2019 | Shibata |
| 10,426,322 B2 | 10/2019 | Tsuchiya et al. |
| 10,477,127 B2 | 11/2019 | Blanquart |
| 10,506,142 B2 | 12/2019 | Talbert et al. |
| 10,512,512 B2 | 12/2019 | Richmond et al. |
| 10,517,469 B2 | 12/2019 | Blanquart et al. |
| 10,561,302 B2 | 2/2020 | Henley et al. |
| 10,568,496 B2 | 2/2020 | Blanquart et al. |
| 10,607,653 B2 | 3/2020 | Hayashi et al. |
| 10,670,248 B2 | 6/2020 | Talbert et al. |
| 10,695,003 B2 | 6/2020 | Henley et al. |
| 10,701,254 B2 | 6/2020 | Blanquart et al. |
| 10,729,502 B1 | 8/2020 | Wolf et al. |
| 10,742,895 B2 | 8/2020 | Blanquart et al. |
| 10,750,933 B2 | 8/2020 | Blanquart |
| 10,758,314 B2 | 9/2020 | Wade |
| 10,785,410 B2 | 9/2020 | Toyoda et al. |
| 10,785,461 B2 | 9/2020 | Blanquart et al. |
| 10,839,955 B2 | 11/2020 | Accomazzi et al. |
| 10,855,942 B2 | 12/2020 | Blanquart |
| 10,881,272 B2 | 1/2021 | Blanquart |
| 10,917,562 B2 | 2/2021 | Richardson et al. |
| 10,932,656 B2 | 3/2021 | Peleg |
| 10,952,619 B2 | 3/2021 | Talbert et al. |
| 10,956,492 B2 | 3/2021 | Barral et al. |
| 10,972,690 B2 | 4/2021 | Blanquart et al. |
| 10,980,406 B2 | 4/2021 | Blanquart et al. |
| 10,984,550 B2 | 4/2021 | Matsunaga et al. |
| 11,006,113 B2 | 5/2021 | Fuchie et al. |
| 11,056,226 B2 | 7/2021 | Shibata |
| 11,062,419 B1 | 7/2021 | Fell |
| 11,070,779 B2 | 7/2021 | Blanquart et al. |
| 11,082,627 B2 | 8/2021 | Blanquart et al. |
| 11,083,367 B2 | 8/2021 | Blanquart et al. |
| 11,089,192 B2 | 8/2021 | Blanquart et al. |
| 11,096,565 B2 | 8/2021 | Talbert et al. |
| 11,115,610 B2 | 9/2021 | Richardson et al. |
| 11,123,150 B2 | 9/2021 | Ichiki et al. |
| 11,134,832 B2 | 10/2021 | Talbert et al. |
| 11,185,213 B2 | 11/2021 | Henley et al. |
| 11,196,904 B2 | 12/2021 | Talbert et al. |
| 11,206,340 B2 | 12/2021 | Talbert et al. |
| 11,213,194 B2 | 1/2022 | Talbert et al. |
| 11,237,270 B2 | 2/2022 | Talbert et al. |
| 11,238,592 B2 | 2/2022 | Maimon et al. |
| 11,240,426 B2 | 2/2022 | Talbert et al. |
| 11,253,139 B2 | 2/2022 | Blanquart |
| 11,266,305 B2 | 3/2022 | Wichern et al. |
| 11,281,940 B2 | 3/2022 | Toyoda et al. |
| 11,284,785 B2 | 3/2022 | Talbert et al. |
| 11,294,062 B2 | 4/2022 | Talbert et al. |
| 11,344,189 B2 | 5/2022 | Blanquart et al. |
| 11,361,406 B2 | 6/2022 | Kimura et al. |
| 11,368,609 B2 | 6/2022 | Tokuse et al. |
| 11,373,422 B2 | 6/2022 | Sakane |
| 11,376,094 B2 | 7/2022 | Wade |
| 11,380,431 B2 | 7/2022 | Wolf et al. |
| 11,389,066 B2 | 7/2022 | Talbert et al. |
| 11,399,717 B2 | 8/2022 | Talbert et al. |
| 11,419,696 B2 | 8/2022 | Kamikawa et al. |
| 11,425,322 B2 | 8/2022 | Blanquart et al. |
| 11,431,911 B2 | 8/2022 | Kita et al. |
| 11,432,704 B2 | 9/2022 | Adachi |
| 11,446,113 B2 | 9/2022 | Nakamura et al. |
| 11,457,154 B2 | 9/2022 | Talbert et al. |
| 11,470,227 B2 | 10/2022 | Talbert et al. |
| 11,484,270 B2 | 11/2022 | Henley et al. |
| 11,516,387 B2 | 11/2022 | Talbert et al. |
| 11,531,112 B2 | 12/2022 | Talbert et al. |
| 11,539,880 B2 | 12/2022 | Richardson et al. |
| 11,574,412 B2 | 2/2023 | Talbert et al. |
| 11,575,811 B2 | 2/2023 | Talbert et al. |
| 11,622,677 B2 | 4/2023 | Talbert et al. |
| 2012/0123205 A1* | 5/2012 | Nie ...................... A61B 5/0084 600/109 |
| 2015/0193929 A1 | 7/2015 | Ikemoto |
| 2019/0125454 A1 | 5/2019 | Stokes et al. |
| 2019/0191974 A1 | 6/2019 | Talbert et al. |
| 2019/0191975 A1 | 6/2019 | Talbert et al. |
| 2019/0191976 A1 | 6/2019 | Talbert et al. |
| 2019/0191977 A1 | 6/2019 | Talbert et al. |
| 2019/0191978 A1 | 6/2019 | Talbert et al. |
| 2019/0356867 A1 | 11/2019 | Richardson et al. |
| 2019/0365252 A1* | 12/2019 | Fernald .................. A61B 5/004 |
| 2019/0385302 A1 | 12/2019 | Ngo Dinh et al. |
| 2020/0126655 A1 | 4/2020 | Sasaki et al. |
| 2020/0178769 A1 | 6/2020 | Henley et al. |
| 2020/0184640 A1 | 6/2020 | Mahadik et al. |
| 2020/0292160 A1 | 9/2020 | Talbert et al. |
| 2020/0397246 A1 | 12/2020 | Talbert et al. |
| 2020/0397277 A1 | 12/2020 | Talbert et al. |
| 2020/0404131 A1 | 12/2020 | Talbert et al. |
| 2021/0120149 A1 | 4/2021 | Jauss |
| 2021/0160444 A1 | 5/2021 | Blanquart |
| 2021/0267443 A1* | 9/2021 | Baumann ........... A61B 1/00096 |
| 2021/0274998 A1 | 9/2021 | Thomas et al. |
| 2021/0313044 A1 | 10/2021 | Shibata |
| 2021/0344885 A1 | 11/2021 | Blanquart et al. |
| 2021/0360142 A1 | 11/2021 | Blanquart et al. |

(56) References Cited

U.S. PATENT DOCUMENTS

| | | |
|---|---|---|
| 2021/0361152 A1 | 11/2021 | Blanquart et al. |
| 2021/0368076 A1 | 11/2021 | Blanquart et al. |
| 2021/0378495 A1 | 12/2021 | Talbert et al. |
| 2021/0409627 A1 | 12/2021 | Richardson et al. |
| 2022/0047148 A1 | 2/2022 | Henley et al. |
| 2022/0107418 A1 | 4/2022 | Talbert et al. |
| 2022/0109790 A1 | 4/2022 | Talbert et al. |
| 2022/0125285 A1 | 4/2022 | Talbert et al. |
| 2022/0175234 A1 | 6/2022 | Wichern et al. |
| 2022/0192474 A1 | 6/2022 | Talbert et al. |
| 2022/0236421 A1 | 7/2022 | Talbert et al. |
| 2022/0248941 A1 | 8/2022 | Blanquart |
| 2022/0287552 A1 | 9/2022 | Blanquart et al. |
| 2022/0296082 A1 | 9/2022 | Shiraki |
| 2022/0327707 A1 | 10/2022 | Nishide |
| 2022/0330826 A1 | 10/2022 | Talbert et al. |
| 2022/0331014 A1* | 10/2022 | Weeks .............. A61B 1/000094 |
| 2022/0334061 A1 | 10/2022 | Talbert et al. |
| 2022/0378294 A1 | 12/2022 | Talbert et al. |
| 2022/0383453 A1 | 12/2022 | Talbert et al. |
| 2022/0394199 A1 | 12/2022 | Blanquart et al. |
| 2023/0028618 A1 | 1/2023 | Talbert et al. |
| 2023/0080490 A1 | 3/2023 | Henley et al. |
| 2023/0111981 A1 | 4/2023 | Talbert et al. |
| 2023/0130164 A1 | 4/2023 | Talbert et al. |
| 2023/0137694 A1 | 5/2023 | Richardson et al. |
| 2024/0108204 A1* | 4/2024 | Zimmer .............. A61B 1/00057 |
| 2024/0289947 A1 | 8/2024 | Yardibi et al. |

OTHER PUBLICATIONS

"Ruikai Zhang et al: ""Polyp detection during colonoscopy using a regression-based convolutional neural network with a tracker""", Pattern Recognition., vol. 83, Nov. 1, 2018".

Yang Bo et al: "Reconstruct Dynamic Soft-Tissue With Stereo Endoscope Based on a Single-Layer Network", IEEE Transactions on Image Processing, vol. 31, Jan. 1, 2022 (Jan. 1, 2022).

International Search Report for PCT/IB2024/051806 dated May 6, 2024.

International Search Report for PCT/IB2024/051804 dated May 6, 2024.

English translation of CN 107256552 prepared by Google Patents on Sep. 11, 2024 (https://patents.google.com/patent/CN107256552B/en?oq=CN+107256552).

* cited by examiner

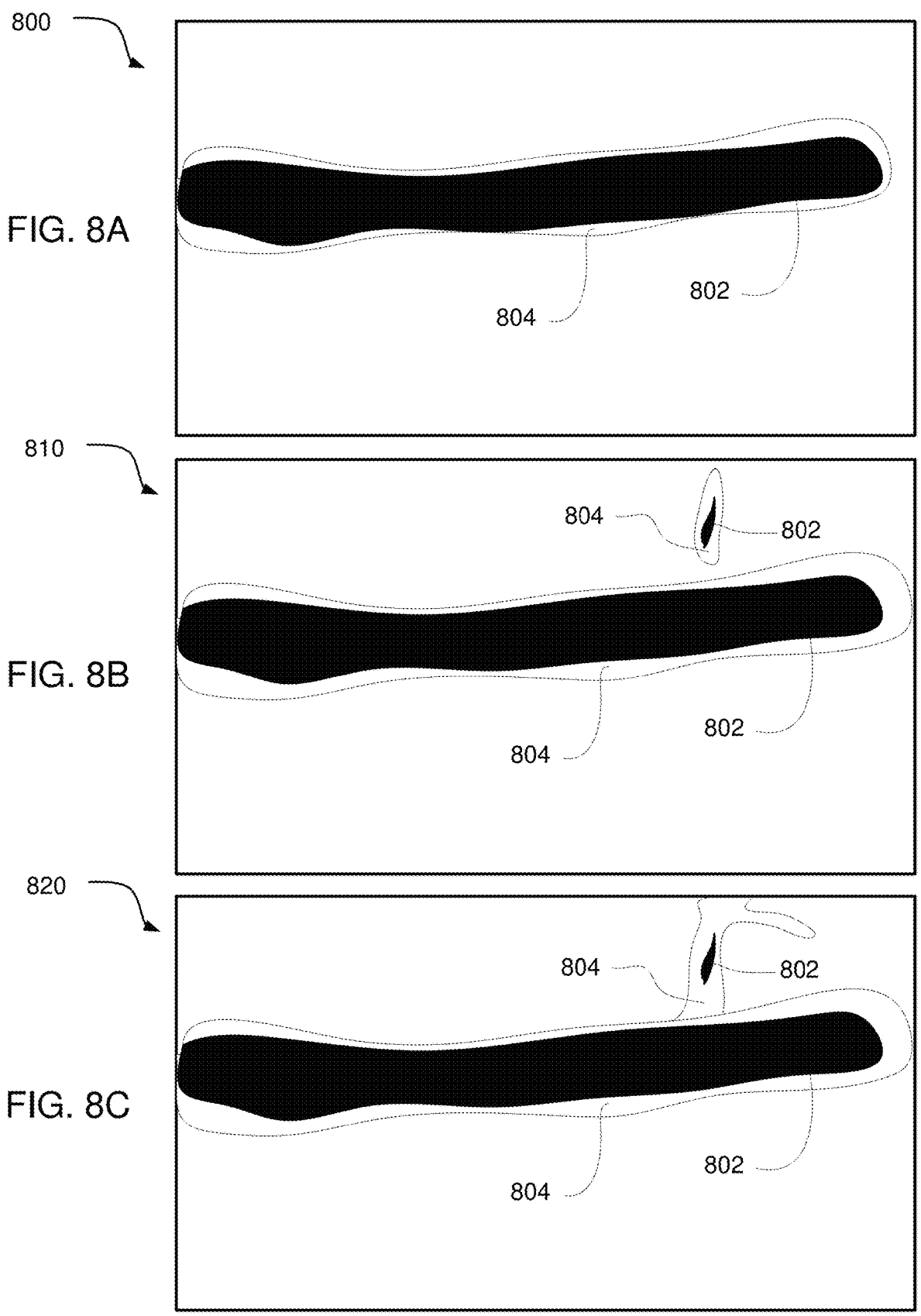

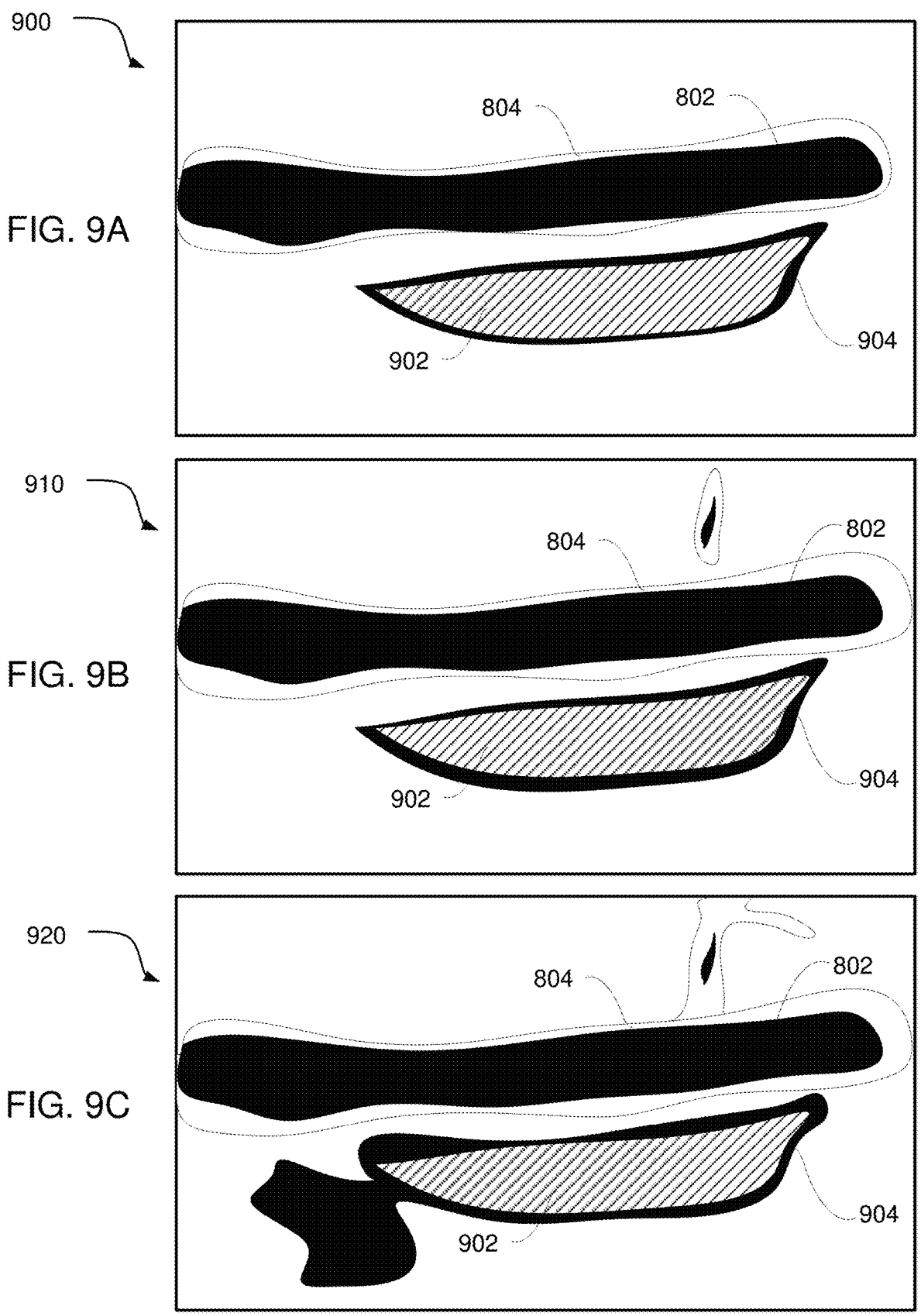

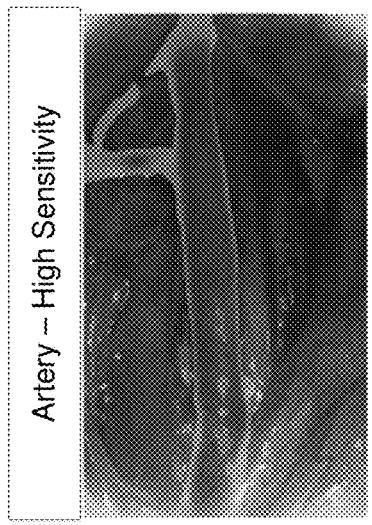
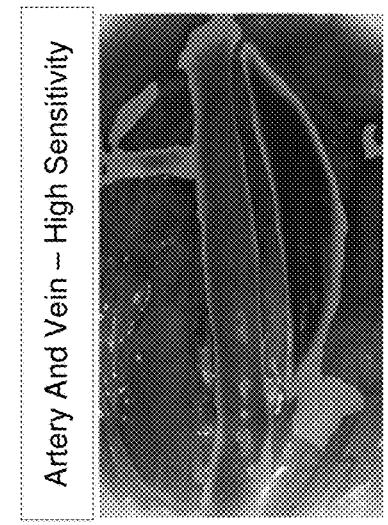
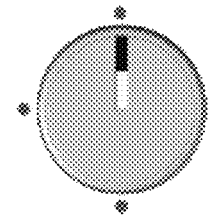
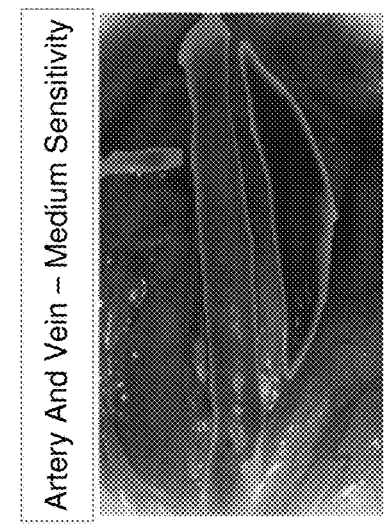
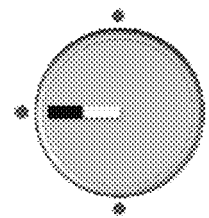
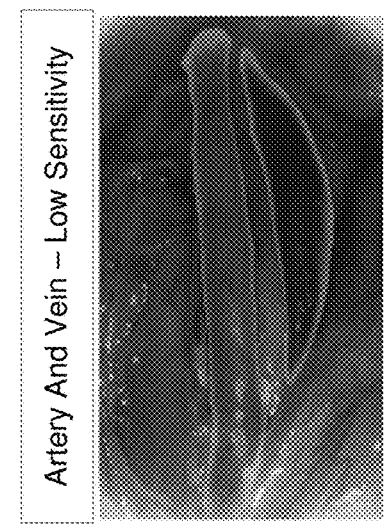
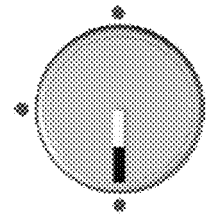
FIG. 10

Stabilization

ADAPTIVE OVERLAY STABILIZATION OF FALSE COLOR OVERLAY HEATMAPS

TECHNICAL FIELD

This disclosure is directed to advanced visualization and digital imaging systems and methods and, more particularly but not entirely, to image processing means for outputting advanced video streams comprising false color overlay heatmaps with adaptive overlay stabilization.

BACKGROUND

Endoscopic surgical instruments are often preferred over traditional open surgical devices because the small incision tends to reduce post-operative recovery time and associated complications. In some instances of endoscopic visualization, it is desirable to view a space with high-definition color imaging and further with one or more advanced visualization techniques providing additional information that cannot be discerned with the human eye. However, the space constrained environment of an endoscope introduces numerous technical challenges when seeking to capture advanced visualization data in a light deficient environment of a surgical scene.

There are numerous endoscopic visualization systems seeking to capture advanced visualization data, such as multispectral data, fluorescence data, and mapping data, while working within the space constrained environment of an endoscope. However, these systems do not address the technical challenges associated with rendering advanced visualization data on a color video stream viewable by a user. Specifically, these traditional systems do not disclose wherein a false color overlay can be rendered on a color video stream to identify target objects with varying sensitivity settings. Additionally, these traditional systems do not describe means for stabilizing movement of a false color overlay to improve user experience and ensure target objects can be accurately and easily identified during use.

For example, commonly owned U.S. Patent Application Publication No. 2020/0404131, entitled "HYPERSPECTRAL AND FLUORESCENCE IMAGING WITH TOPOLOGY LASER SCANNING IN A LIGHT DEFICIENT ENVIRONMENT," filed on Oct. 24, 2019, which is incorporated by reference in its entirety, describes an endoscopic visualization system for color and "specialty" imaging. In this disclosure, an emitter is configured to emit electromagnetic energy in wavelength bands within the visible spectrum, including red, green, and blue emissions, as well as specialty emissions, wherein the specialty emissions may include hyperspectral, fluorescence, or laser mapping emissions of electromagnetic energy. However, this disclosure does not describe means for generating false color overlays with adaptive stabilization and adjustable sensitivity settings.

In view of the foregoing, disclosed herein are systems, methods, and devices for generating advanced visualization video streams comprising stabilized false color overlay heatmaps for identifying a target structure within a scene.

BRIEF DESCRIPTIONS OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

Figure 7A:
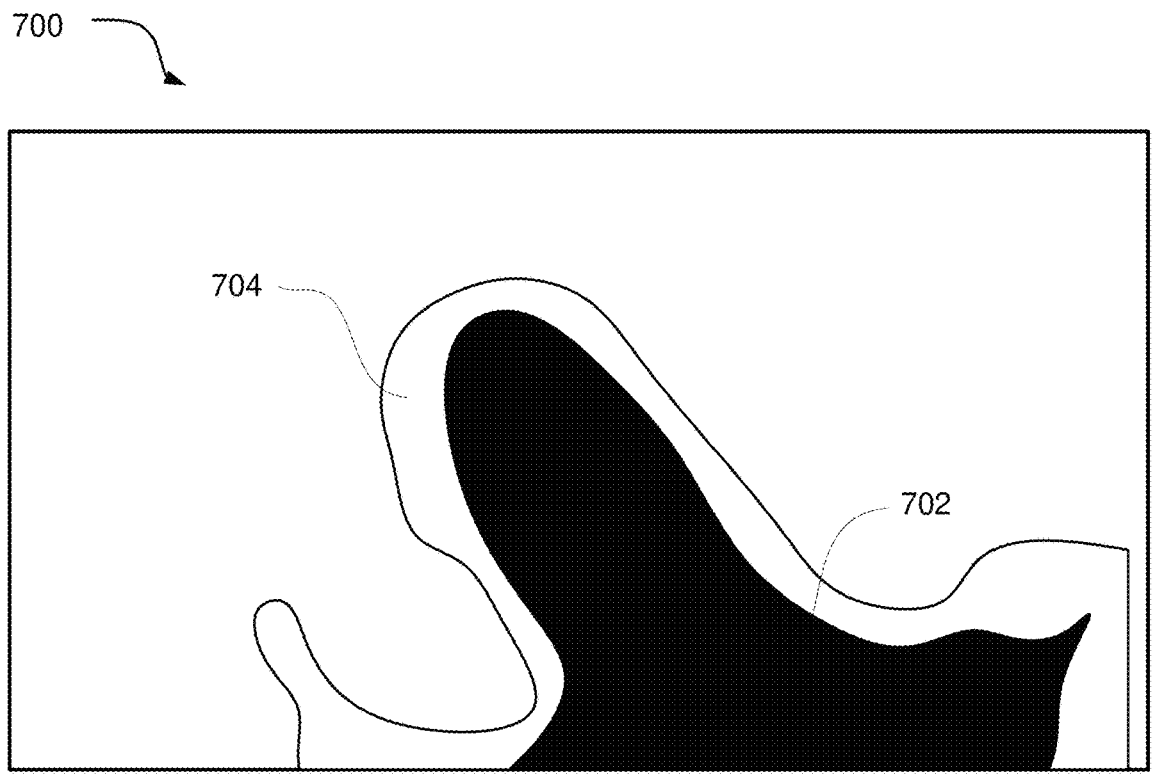
Figure 11:
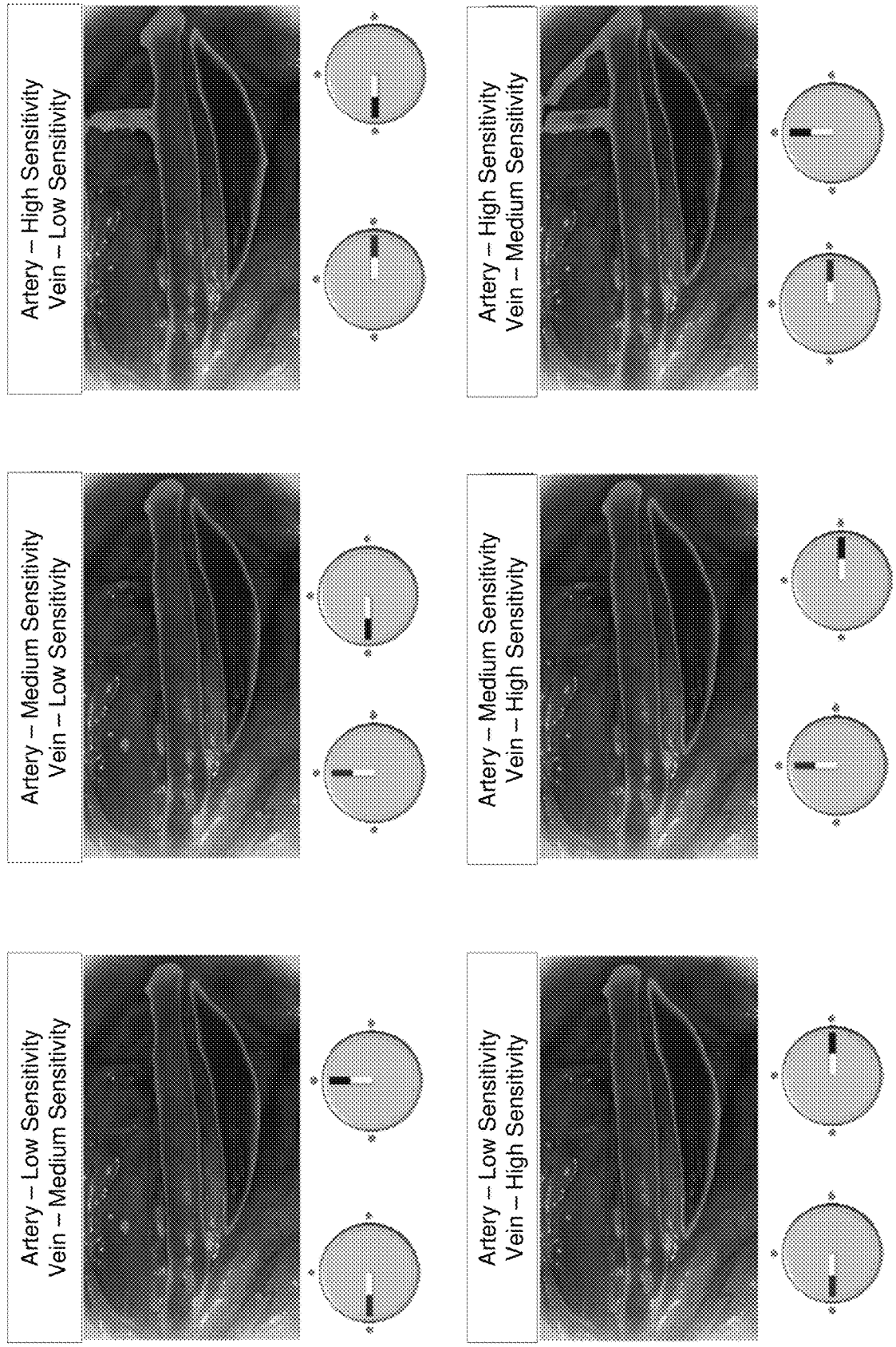
Figure 12:
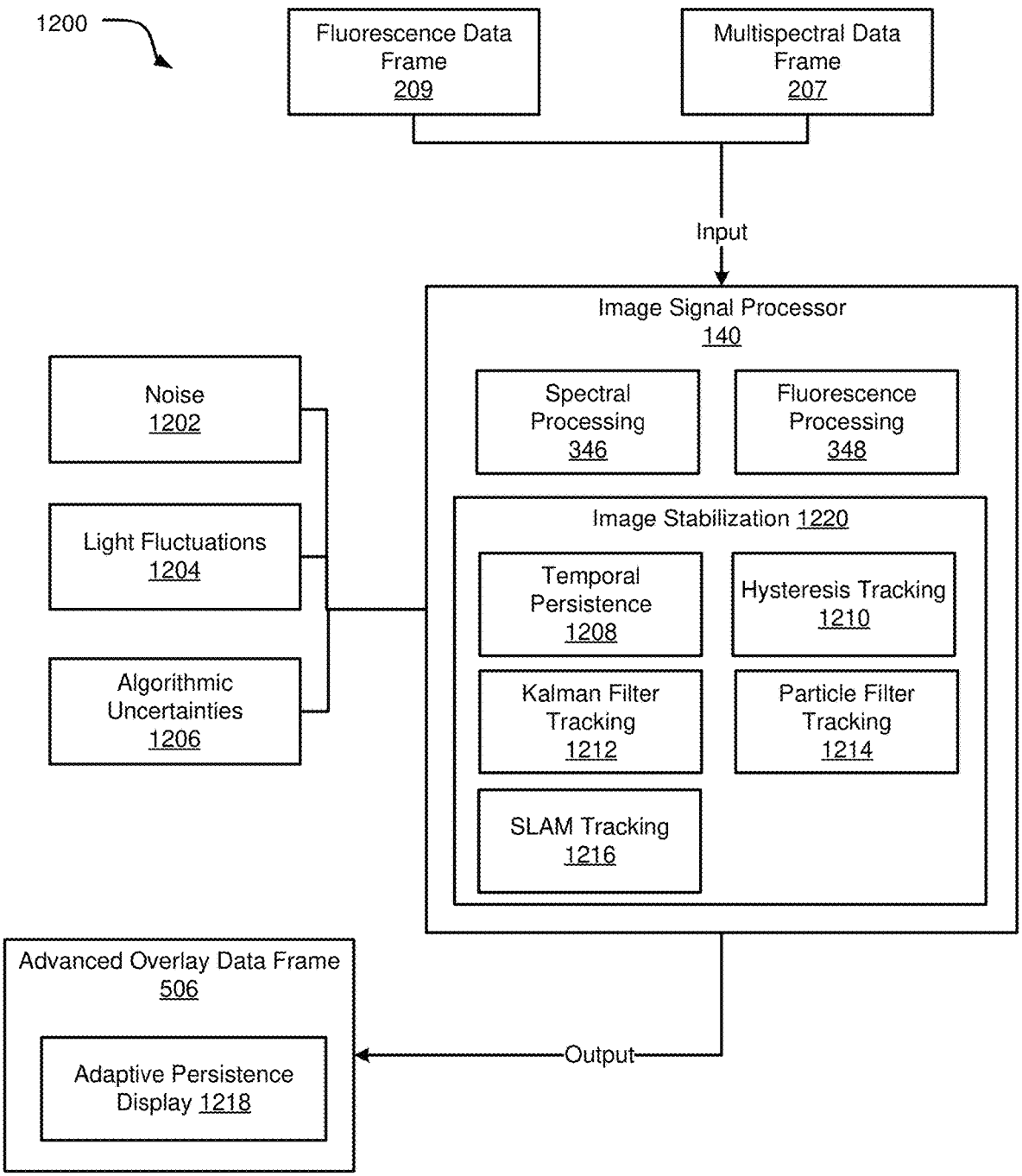
Figure 13A:
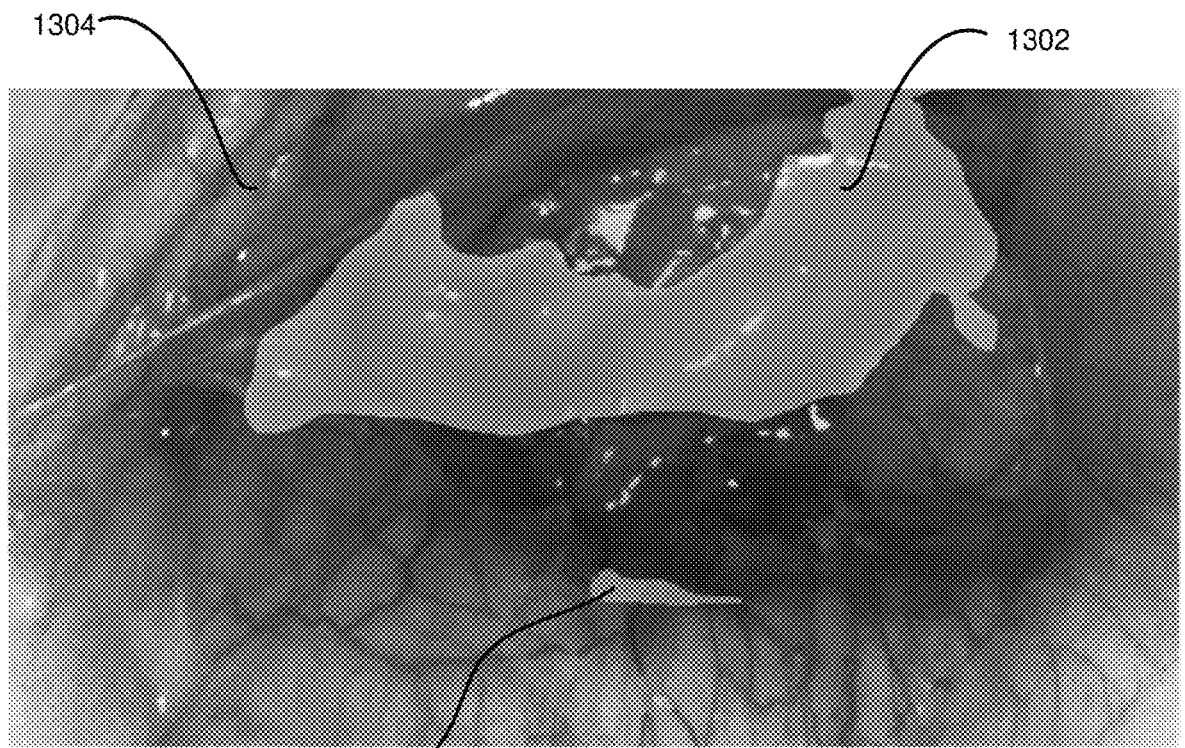
Figure 13B:
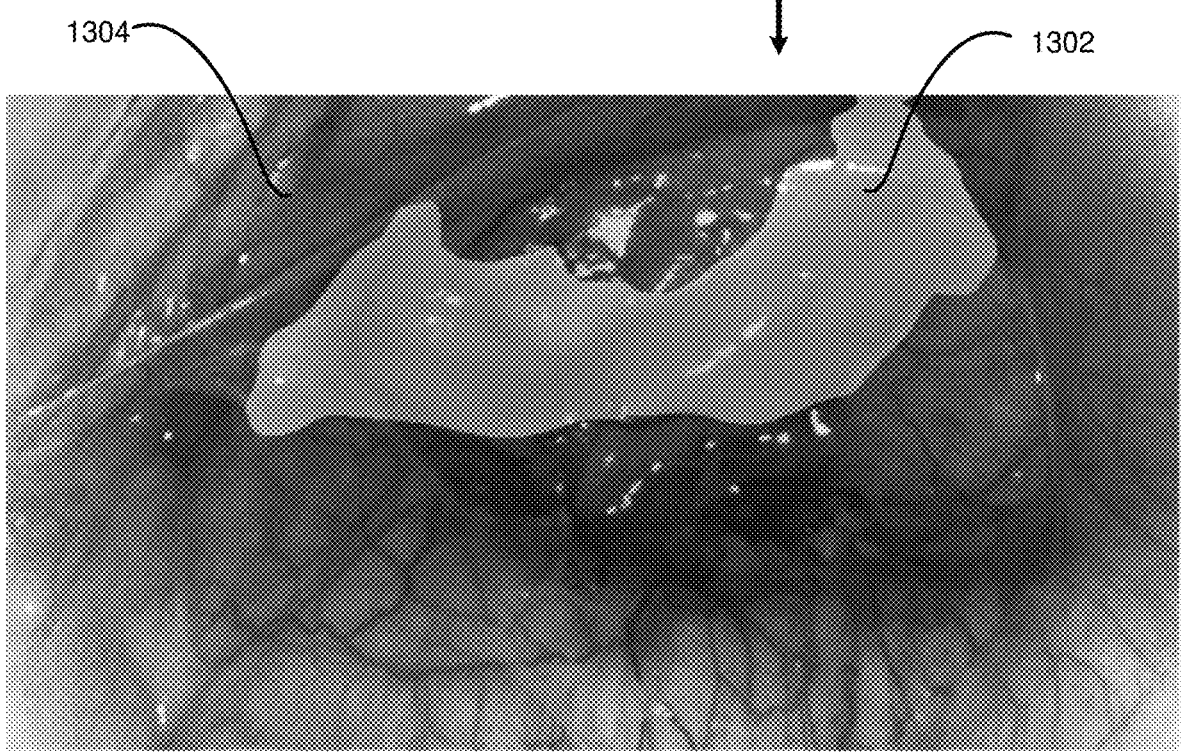
Figure 14:
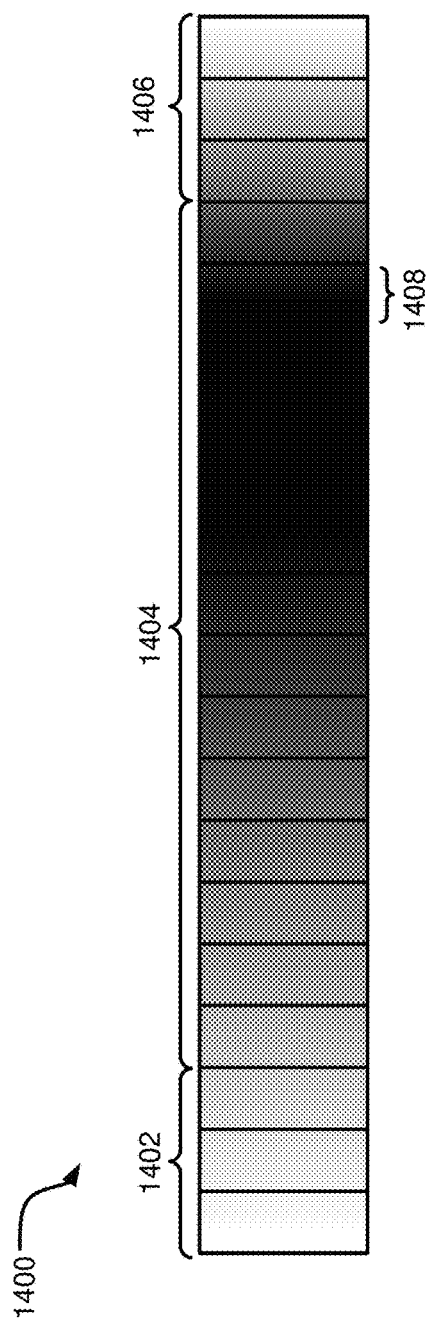
Figure 15:
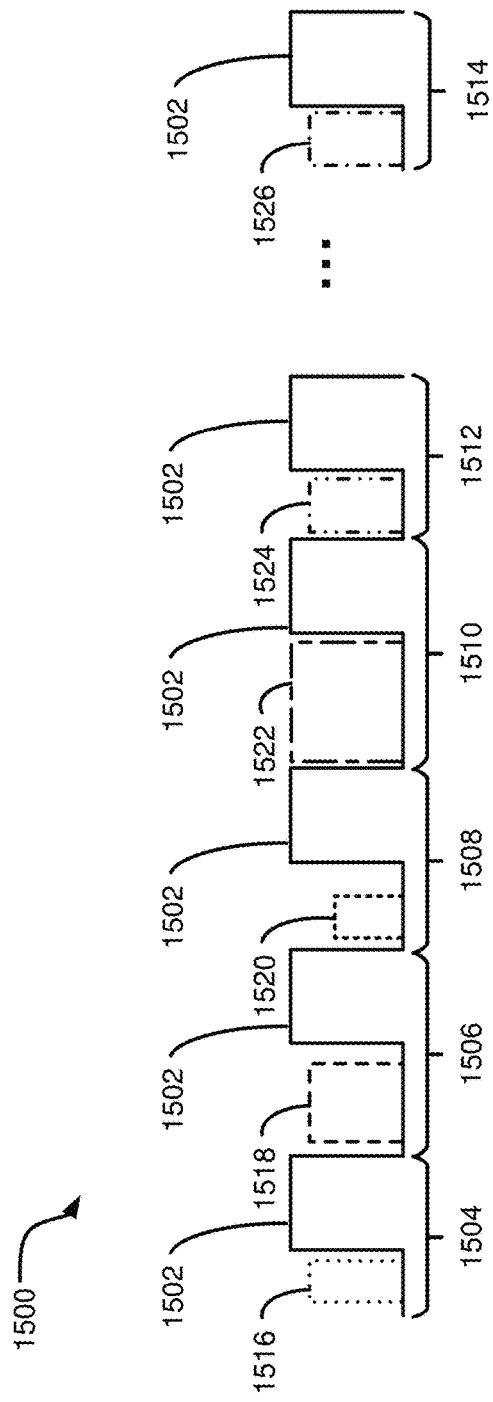
Figure 16A:
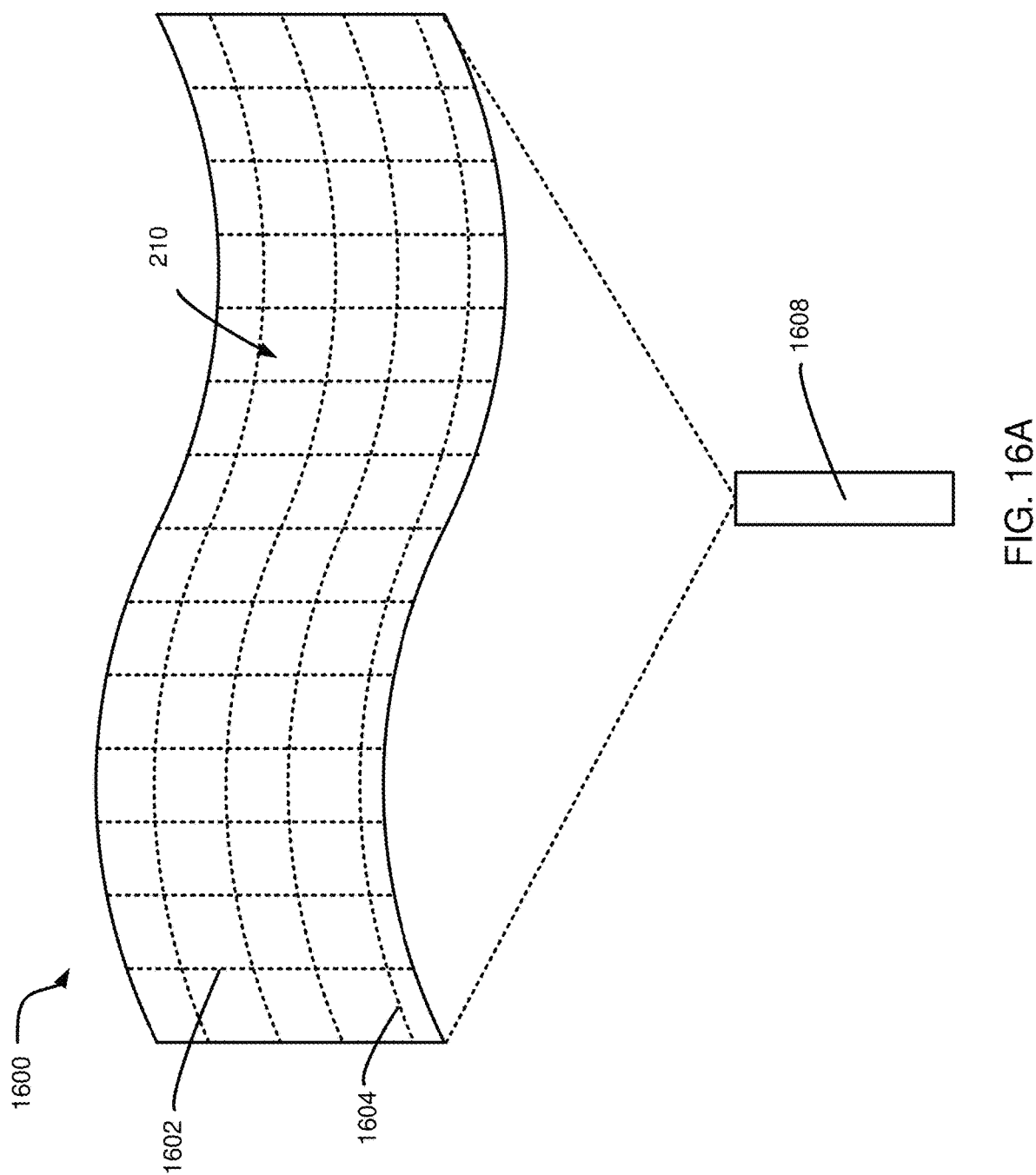
Figure 16B:
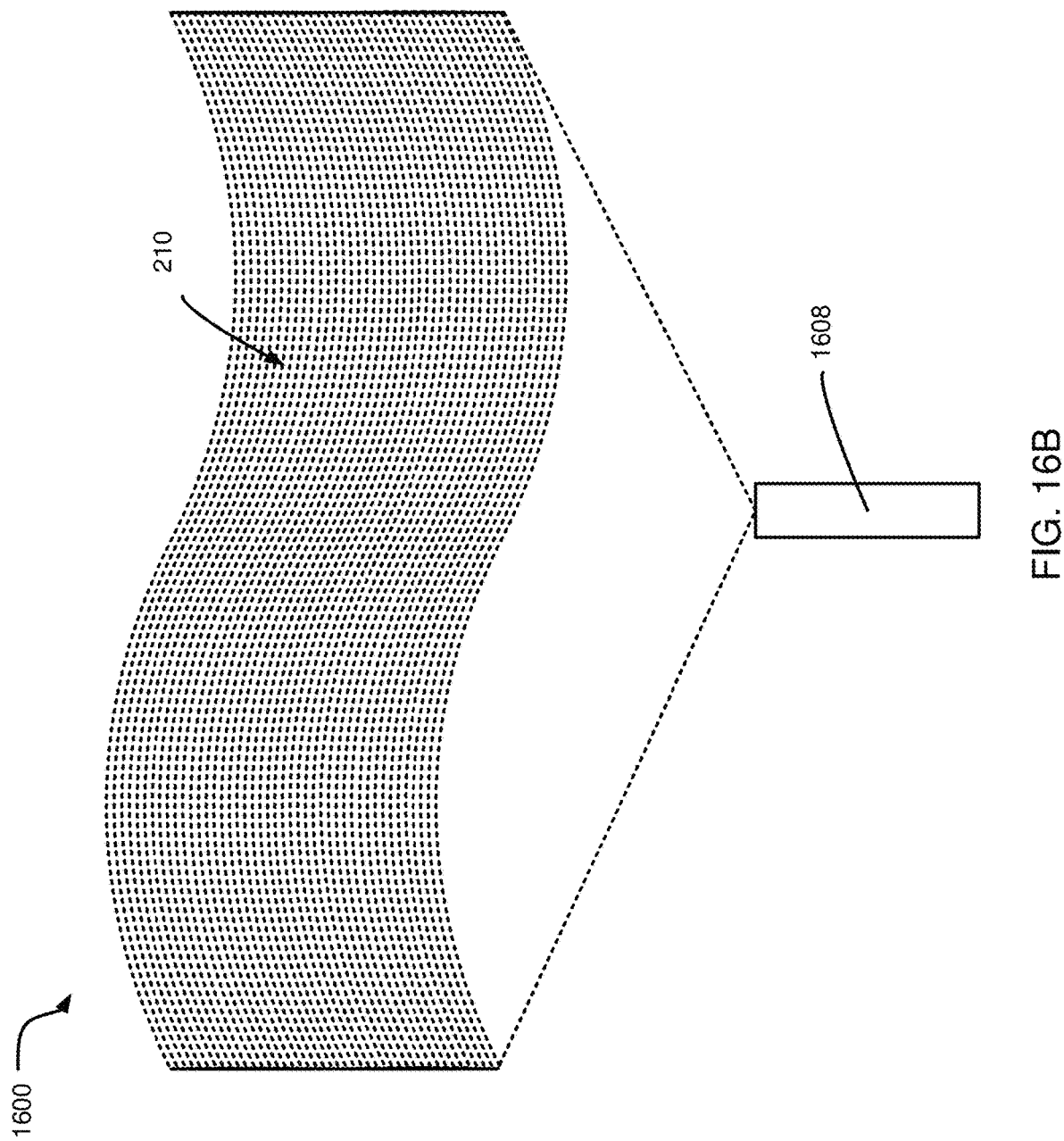
Figure 17:
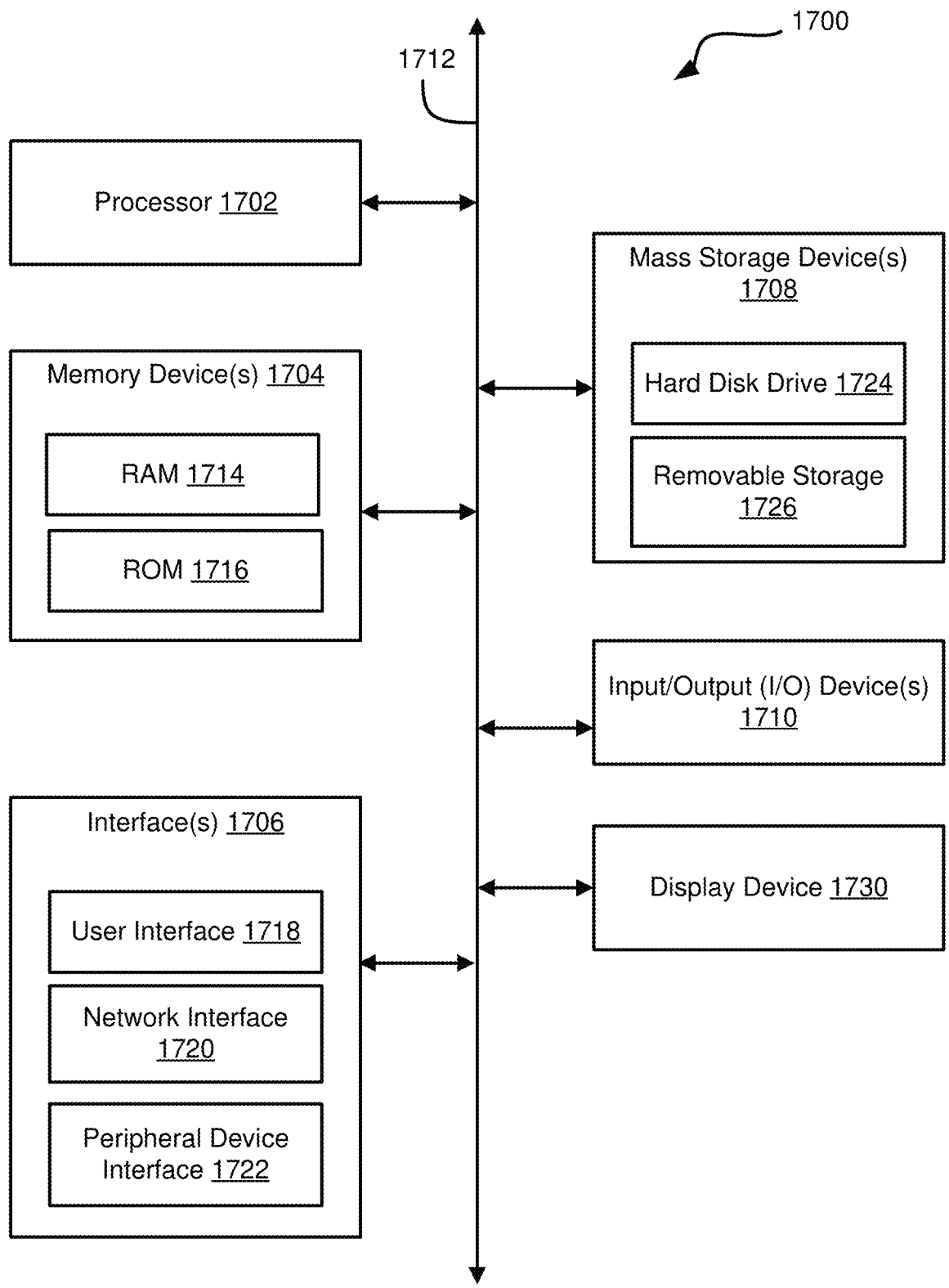

FIGS. 7A. and 7B are schematic illustrations of example advanced overlay data frames comprising a false color overlay, wherein a sensitivity of the false color overlay is adjustable based on user input;

FIGS. 8A-8C are schematic illustrations of example advanced overlay data frames comprising a false color overlay, wherein a sensitivity of the false color overlay is adjustable based on user input;

FIGS. 9A-9C are schematic illustrations of example advanced overlay data frames comprising a false color overlay, wherein a sensitivity of the false color overlay is adjustable based on user input;

FIG. 10 is a series of images of a scene rendered with one or more false color overlays, with low sensitivity, medium sensitivity, and high sensitivity;

FIG. 11 is a series of images of a scene rendered with one or more false color overlays, with different target objects rendered with different sensitivity settings;

FIG. 12 is a schematic block diagram of an example system and process flow for generating advanced overlay data frames with adaptive persistence display to stabilize movement of a false color overlay;

FIGS. 13A and 13B are images of example advanced overlay data frames comprising a base image frame and a false color overlay overlaid thereon, wherein movement of the false color overlay is stabilized using a persistence algorithm;

FIG. 14 illustrates a portion of the electromagnetic spectrum divided into a plurality of different wavebands which may be pulsed by sources of electromagnetic radiation of an emitter;

FIG. 15 is a schematic diagram illustrating a timing sequence for emission and readout for generating data frames in response to pulses of electromagnetic radiation;

FIG. 16A is a schematic illustration of an example mapping pattern comprising a grid array;

FIG. 16B is a schematic illustration of an example mapping pattern comprising a dot array; and FIG. 17 is a schematic block diagram of an example computing device.

DETAILED DESCRIPTION

Disclosed herein are systems, methods, and devices for digital visualization that may be primarily suited to medical applications such as medical endoscopic imaging. An embodiment of the disclosure is an endoscopic system for color visualization and "advanced visualization" of a scene. The advanced visualization includes one or more of multispectral imaging, fluorescence imaging, or topographical mapping. Data retrieved from the advanced visualization may be processed by one or more algorithms configured to determine characteristics of the scene. The advanced visualization data may specifically be used to identify tissue structures within a scene, generate a three-dimensional topographical map of the scene, calculate dimensions of objects within the scene, identify margins and boundaries of different tissue types, and so forth.

Specifically disclosed herein are systems and methods for generating heatmaps for advanced visualization that can be adjusted in real-time based on a desired sensitivity level. The systems described herein output advanced overlay video streams comprising color image frames and false color overlays configured to highlight target objects depicted within the color image frames. The false color overlays are rendered as heatmaps comprising multiple distinct colors to visualize the likelihood that a certain region includes the target object. In the false color overlay heatmaps, some regions are rendered with a first color indicating a high likelihood that region includes the target object, and boundaries or other regions are rendered with another color indicating a lesser likelihood that region includes the target object. The sensitivity of the heatmaps can be adjusted in real-time based on user input.

Additionally disclosed herein are systems and methods for automatically estimating camera movement to enable adaptive persistence displays that do not require manual hyperparameter determination. The systems described herein are capable of estimating camera movement based on real-time sensor outputs from an inertial measurement unit (IMU) or based on movement estimations determined based on sequential image frames. The IMU acceleration values and/or movement between sequential images are used to automatically adjust a hysteresis or memory of a persistence algorithm. This is implemented to stabilize a false color overlay between frames to improve user experience and ensure target objects are easily and accurately identifiable in an advanced video stream.

An embodiment of the disclosure is an endoscopic visualization system that includes an emitter, an image sensor, and a controller. The emitter includes a plurality of separate and independently actuatable sources of EMR that may be separately cycled on and off to illuminate a scene with pulses of EMR. The image sensor accumulates photons and converts this reading to an electrical charge. The image sensor reads out the electrical charge data to generate a plurality of data frames. The controller synchronizes operations of the emitter and the image sensor to output a desired visualization scheme based on user input, which may be provided via a surgical display system. The visualization scheme may include a selection of one or more of color imaging, multispectral imaging, fluorescence imaging, topographical mapping, or anatomical measurement.

The controller instructs the emitter and the image sensor to operate in a synchronized sequence to output a video stream that includes one or more types of visualization (i.e., color imaging, multispectral imaging, fluorescence imaging, topographical mapping, or anatomical measurement). The controller instructs the emitter to actuate one or more of the plurality of EMR sources to pulse according to a variable pulse cycle. The controller instructs the image sensor to accumulate EMR and read out data according to a variable sensor cycle that is synchronized in time with the variable pulse cycle. The synchronized sequence of the emitter and the image sensor enables the image sensor to read out data corresponding with a plurality of different visualization types. For example, the image sensor may read out a color frame in response to the emitter pulsing a white light or other visible EMR, the image sensor may readout a multispectral frame in response to the emitter pulsing a multispectral waveband of EMR, the image sensor may read out data for calculating a three-dimensional topographical map in response to the emitter pulsing EMR in a mapping pattern, and so forth.

The controller optimizes and adjusts a sensor cycle of an image sensor to output data frames for color imaging and/or advanced imaging at a sufficient rate, while ensuring the pixel array accumulates a sufficient amount of EMR for each data frame. The controller may instruct the image sensor to implement pixel binning on a per-frame basis, such that the image sensor implements pixel binning for some data frames and reads out all pixels for other data frames. In some cases, the controller instructs the image sensor to read out all pixels and thereby output a high-definition color data frame in response to the emitter pulsing white EMR. The controller may further instruct the image sensor to bin the pixel array and read out fewer pixels in response to the emitter pulsing EMR for advanced visualization, such as multispectral imaging, fluorescence imaging, or topographical mapping.

The controller may additionally optimize and adjust the variable pulse cycle in real-time based on user input, sufficient exposure of resultant data frames, and inherent properties of a corresponding pixel array. In some cases, a pixel array has varying sensitivities to different wavebands of EMR. In these cases, the pixel array is irradiated with EMR for shorter or longer durations of time depending on the type of illumination pulse to ensure the pixel array outputs data frames with consistent exposure levels. The controller adjusts the irradiation time of the pixel array and the pulsing duration of the emitter in real-time to compensate for the pixel array's varying efficiencies to distinct types of illumination.

The systems, methods, and devices described herein are implemented for color visualization and advanced visualization. The advanced visualization techniques described herein can be used to identify certain tissues, see through tissues in the foreground, calculate a three-dimensional topography of a scene, and calculate dimensions and distances for objects within the scene. The advanced visualization techniques described herein specifically include multispectral visualization, fluorescence visualization, laser mapping visualization, and stereo visualization with disparity mapping.

Multispectral Visualization

Spectral imaging uses multiple bands across the electromagnetic spectrum. This is different from conventional cameras that only capture light across the three wavelengths based in the visible spectrum that are discernable by the human eye, including the red, green, and blue wavelengths to generate an RGB image. Spectral imaging may use any wavelength bands in the electromagnetic spectrum, including infrared wavelengths, the visible spectrum, the ultraviolet spectrum, x-ray wavelengths, or any suitable combination of various wavelength bands. Spectral imaging may overlay imaging generated based on non-visible bands (e.g., infrared) on top of imaging based on visible bands (e.g., a standard RGB image) to provide additional information that is easily discernable by a person or computer algorithm.

The multispectral imaging techniques discussed herein can be used to "see through" layers of tissue in the foreground of a scene to identify specific types of tissue and/or specific biological or chemical processes. Multispectral imaging can be used in the medical context to quantitatively track the process of a disease and to determine tissue pathology. Additionally, multispectral imaging can be used to identify critical structures such as nerve tissue, muscle tissue, cancerous cells, blood vessels, and so forth. In an embodiment, multispectral partitions of EMR are pulsed and data is gathered regarding the spectral responses of different types of tissue in response to the partitions of EMR. A datastore of spectral responses can be generated and analyzed to assess a scene and predict which tissues are present within the scene based on the sensed spectral responses. Additionally, machine learning, artificial intelligence, and/or deep learning methods may be implemented to process image sensor readings from different wavelengths and then detect a specific tissue class for each pixel. These algorithms are typically trained using expert labeled datasets where tissue spectral signatures are fed to the machine learning algorithm with the corresponding known tissue type.

Multispectral imaging enables numerous advantages over conventional imaging. The information obtained by multispectral imaging enables medical practitioners and/or computer-implemented programs to precisely identify certain tissues or conditions that may not be possible to identify with RGB imaging. Additionally, multispectral imaging may be used during medical procedures to provide image-guided surgery that enables a medical practitioner to, for example, view tissues located behind certain tissues or fluids, identify atypical cancerous cells in contrast with typical healthy cells, identify certain tissues or conditions, identify critical structures, and so forth. Multispectral imaging provides specialized diagnostic information about tissue physiology, morphology, and composition that cannot be generated with conventional imaging.

Fluorescence Visualization

Fluorescence occurs when an orbital electron of a molecule, atom, or nanostructure is excited by light or other EMR, and then relaxes to its ground state by emitting a photon from the excited state. The specific frequencies of EMR that excite the orbital electron, or are emitted by the photon during relaxation, are dependent on the particular atom, molecule, or nanostructure. In most cases, the light emitted by the substance has a longer wavelength, and therefore lower energy, than the radiation that was absorbed by the substance.

Fluorescence imaging is particularly useful in biochemistry and medicine as a non-destructive means for tracking or analyzing biological molecules. The biological molecules, including certain tissues or structures, are tracked by analyzing the fluorescent emission of the biological molecules after being excited by a certain wavelength of EMR. However, relatively few cellular components are naturally fluorescent. In certain implementations, it may be desirable to visualize a certain tissue, structure, chemical process, or biological process that is not intrinsically fluorescent. In such an implementation, the body may be administered a dye or reagent that may include a molecule, protein, or quantum dot having fluorescent properties. The reagent or dye may then fluoresce after being excited by a certain wavelength of EMR. Different reagents or dyes may include different molecules, proteins, and/or quantum dots that will fluoresce at particular wavelengths of EMR. Thus, it may be necessary to excite the reagent or dye with a specialized band of EMR to achieve fluorescence and identify the desired tissue, structure, or process in the body.

The fluorescence imaging techniques described herein may be used to identify certain materials, tissues, components, or processes within a body cavity or other light deficient environment. Fluorescence imaging data may be provided to a medical practitioner or computer-implemented algorithm to enable the identification of certain structures or tissues within a body. Such fluorescence imaging data may be overlaid on black-and-white or RGB images to provide additional information and context.

The fluorescence imaging techniques described herein may be implemented in coordination with fluorescent reagents or dyes. Some reagents or dyes are known to attach to certain types of tissues and fluoresce at specific wavelengths of the electromagnetic spectrum. In an implementation, a reagent or dye is administered to a patient that is configured to fluoresce when activated by certain wavelengths of light. The visualization system disclosed herein is used to excite and fluoresce the reagent or dye. The fluorescence of the reagent or dye is detected by an image sensor to aid in the identification of tissues or structures in the body cavity. In an implementation, a patient is administered a plurality of reagents or dyes that are each configured to fluoresce at different wavelengths and/or provide an indication of different structures, tissues, chemical reactions, biological processes, and so forth. In such an implementation, the visualization system described herein emits each of the applicable wavelengths to fluoresce each of the applicable reagents or dyes. This may negate the need to perform individual imaging procedures for each of the plurality of reagents or dyes.

Laser Mapping Visualization

Laser mapping generally includes the controlled deflection of laser beams. Laser mapping can be implemented to generate one or more of a three-dimensional topographical map of a scene, calculate distances between objects within the scene, calculate dimensions of objects within the scene, track the relative locations of tools within the scene, and so forth.

Laser mapping combines controlled steering of laser beams with a laser rangefinder. By taking a distance measurement at every direction, the laser rangefinder can rapidly capture the surface shape of objects, tools, and landscapes. Construction of a full three-dimensional topography may include combining multiple surface models that are obtained from different viewing angles. Various measurement systems and methods exist in the art for applications in archaeology, geography, atmospheric physics, autonomous vehicles, and others. One such system includes light detection and ranging (LIDAR), which is a three-dimensional mapping system. LIDAR has been applied in navigation systems such as airplanes or satellites to determine position and orientation of a sensor in combination with other systems and sensors. LIDAR uses active sensors to illuminate an object and detect energy that is reflected off the object and back to a sensor.

As discussed herein, the term "laser mapping" includes laser tracking. Laser tracking, or the use of lasers for tool tracking, measures objects by determining the positions of optical targets held against those objects. Laser trackers can be accurate to the order of 0.025 mm over a distance of several meters. The visualization system described herein pulses EMR for use in conjunction with a laser tracking system such that the position of tools within a scene can be tracked and measured.

The endoscopic visualization system described herein implements laser mapping imaging to determine precise measurements and topographical outlines of a scene. In one implementation, mapping data is used to determine precise measurements between, for example, structures or organs in a body cavity, devices, or tools in the body cavity, and/or critical structures in the body cavity. As discussed herein, the term "mapping" encompasses technologies referred to as laser mapping, laser scanning, topographical scanning, three-dimensional scanning, laser tracking, tool tracking, and others. A mapping data frame as discussed herein includes data for calculating one or more of a topographical map of a scene, dimensions of objects or structures within a scene, distances between objects or structures within the scene, relative locations of tools or other objects within the scene, and so forth.

Stereo Visualization and Disparity Mapping

Stereo visualization is a computer vision technique for estimating a three-dimensional structure from multiple images. The endoscopic visualization systems described herein May include two or more image sensors located at different positions. The data frames output by these two or more image sensors are assessed to estimate the depth of each pixel and generate a three-dimensional topographical map of a scene.

Additionally, the systems described herein are capable of calculating a disparity map for generating a three-dimensional rendering of a scene. Disparity is the apparent motion of objects between a pair of stereo images. Given a pair of stereo images, the disparity map is computed by matching each pixel within the "left image" with its corresponding pixel within the "right image." Then, the distance is computed for each pair of matching pixel. Finally, the disparity map is generated by representing these distance values as an intensity image. The depth is inversely proportional to the disparity, and thus, when the geometric arrangement of the image sensors is known, the disparity map is converted into a depth map using triangulation.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "proximal" shall refer broadly to the concept of a portion nearest an origin.

As used herein, the term "distal" shall generally refer to the opposite of proximal, and thus to the concept of a portion farther from an origin, or a farthest portion, depending upon the context.

As used herein, color sensors are sensors known to have a color filter array (CFA) thereon to filter the incoming EMR into its separate components. In the visual range of the electromagnetic spectrum, such a CFA may be built on a Bayer pattern or modification thereon to separate green, red, and blue spectrum components of visible EMR.

As used herein, a monochromatic sensor refers to an unfiltered imaging sensor comprising color-agnostic pixels.

The systems, methods, and devices described herein are specifically optimized to account for variations between "stronger" electromagnetic radiation ("EMR") sources and "weaker" EMR sources. In some cases, the stronger EMR sources are considered "stronger" based on the inherent qualities of a pixel array, e.g., if a pixel array is inherently more sensitive to detecting EMR emitted by the stronger EMR source, then the stronger EMR source may be classified as "stronger" when compared with another EMR source. Conversely, if the pixel array is inherently less sensitive to detecting EMR emitted by the weaker EMR source, then the weaker EMR source may be classified as "weaker" when compared with another EMR source. Additionally, a "stronger" EMR source may have a higher amplitude, greater brightness, or higher energy output when compared with a "weaker" EMR source. The present disclosure addresses the disparity between stronger EMR sources and weaker EMR sources by adjusting a pulse cycle of an emitter to ensure a pixel array has sufficient time to accumulate a sufficient amount of EMR corresponding with each of a stronger EMR source and a weaker EMR source.

Figure 1A:
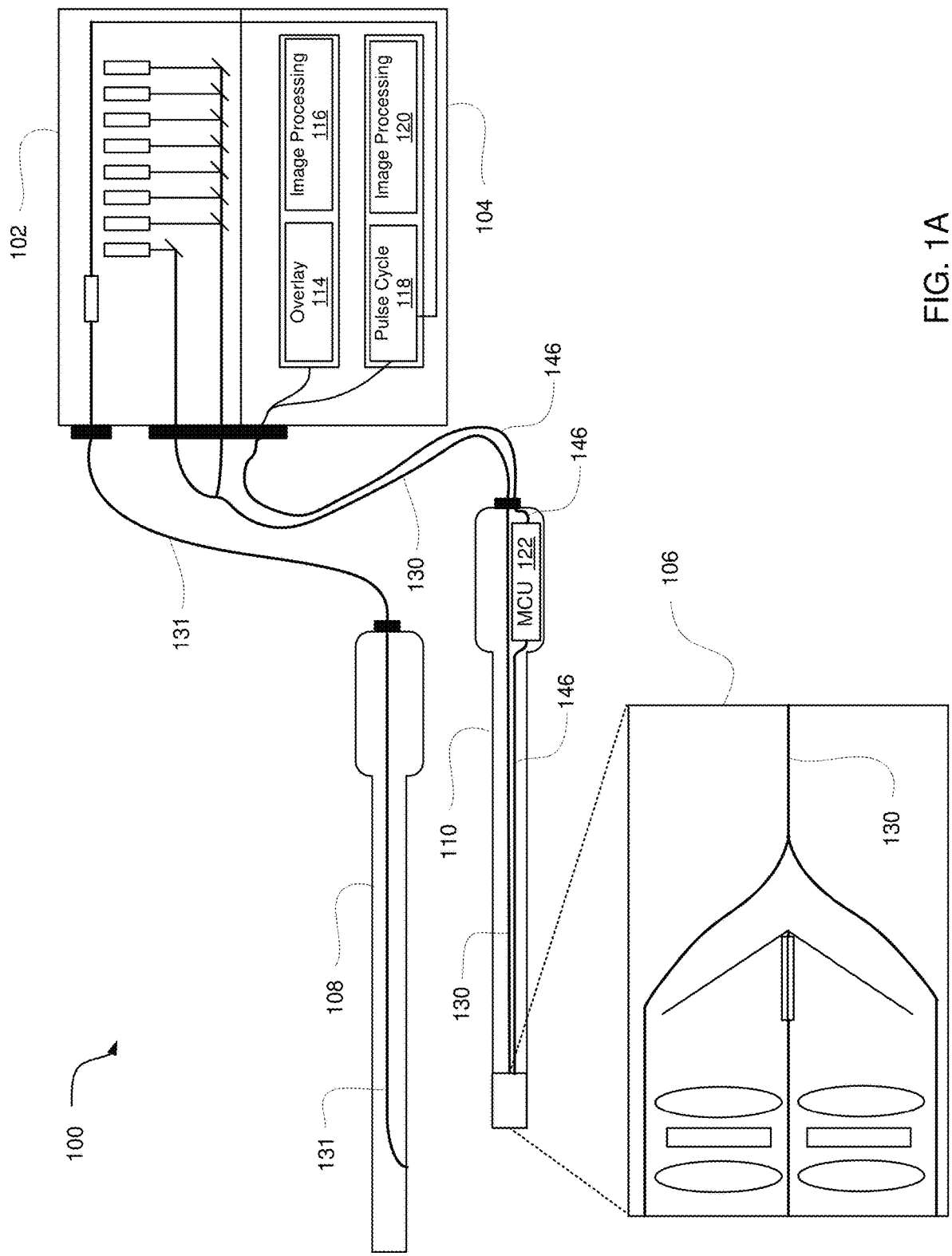
FIG. 1A is a schematic illustration of an example system for endoscopic visualization with color imaging and advanced imaging.
Figure 1B:
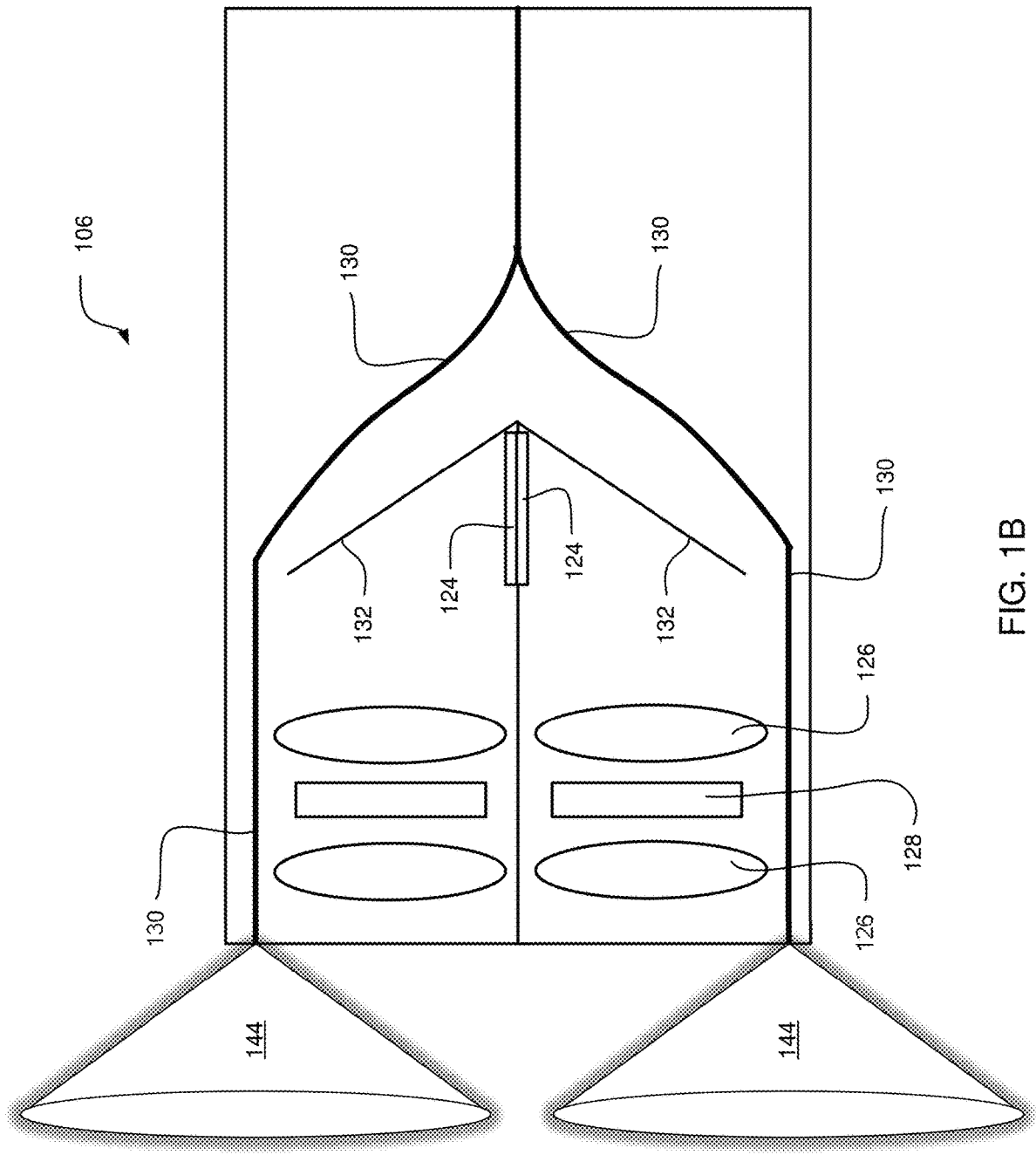
FIG. 1B is a schematic illustration of an example image pickup portion of a system for endoscopic visualization with color imaging and advanced imaging
Figure 1C:
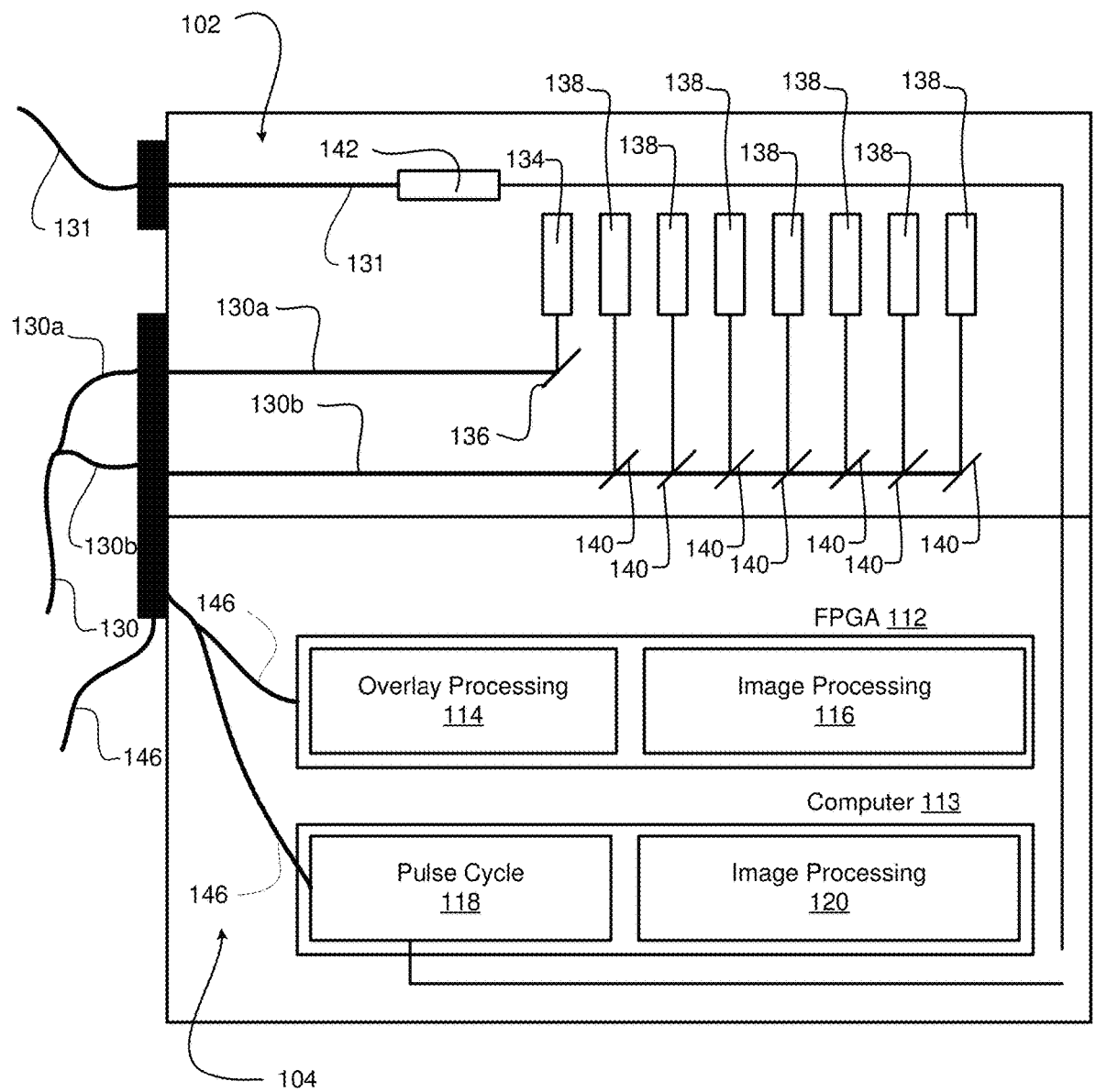
FIG. 1C is a schematic illustration of an example emitter and controller of a system for endoscopic visualization with color imaging and advanced imaging.

Referring now to the figures, FIGS. 1A-1C illustrate schematic diagrams of a system 100 for endoscopic visualization. The system 100 includes an emitter 102, a controller 104, and an optical visualization system 106. The system 100 includes one or more tools 108, which may include endoscopic tools such as forceps, brushes, scissors, cutters, burs, staplers, ligation devices, tissue staplers, suturing systems, and so forth. The system 100 includes one or more endoscopes 110 such as arthroscopes, bronchoscopes, colonoscopes, colposcopes, cystoscopes, esophagoscope, gastroscopes, laparoscopes, laryngoscopes, neuroendoscopes, proctoscopes, sigmoidoscopes, thoracoscopes, and so forth. The system 100 may include additional endoscopes 110 and/or tools 108 with an image sensor equipped therein. In these implementations, the system 100 is equipped to output stereo visualization data for generating a three-dimensional topographical map of a scene using disparity mapping and triangulation.

The optical visualization system 106 may be disposed at a distal end of a lumen of an endoscope 110. Alternatively, one or more components of the optical visualization system 106 may be disposed at a proximal end of the lumen of the endoscope 110 or in another region of the endoscope 110. The optical visualization system 106 may include one or more image sensors 124 that each include a pixel array (see pixel array 125 first illustrated in FIG. 2A). The optical visualization system 106 may include one or more lenses 126 and filters 128 and may further include one or more prisms 132 for reflecting EMR on to the pixel array 125 of the one or more image sensors 124. The system 100 may include a waveguide 130 configured to transmit EMR from the emitter 102 to a distal end of the endoscope 110 to illuminate a light deficient environment for visualization, such as within a surgical scene. The system 100 may further include a waveguide 131 configured to transmit EMR from the emitter 102 to a termination point on the tool 108, which may specifically be actuated for laser mapping imaging and tool tracking as described herein.

The optical visualization system 106 may specifically include two lenses 126 dedicated to each image sensor 124 to focus EMR on to a rotated image sensor 124 and enable a depth view. The filter 128 may include a notch filter configured to block unwanted reflected EMR. In a particular use-case, the unwanted reflected EMR may include a fluorescence excitation wavelength that was pulsed by the emitter 102, wherein the system 100 wishes to only detect a fluorescence relaxation wavelength emitted by a fluorescent reagent or tissue.

The optical visualization system 106 may additionally include an inertial measurement unit (IMU) (not shown). The IMU may be configured to track the real-time movements and rotations of the image sensor 124. Sensor data output from the IMU may be provided to the controller 104 to improve post processing of image frames output by the image sensor 124. Specifically, sensor data captured by the IMU may be utilized to stabilize the movement of image frames and/or the movement of false color overlays rendered over color image frames.

The image sensor 124 includes one or more image sensors, and the example implementation illustrated in FIGS. 1A-1B illustrates an optical visualization system 106 comprising two image sensors 124. The image sensor 124 may include a CMOS image sensor and may specifically include a high-resolution image sensor configured to read out data according to a rolling readout scheme. The image sensors 124 may include a plurality of different image sensors that are tuned to collect different wavebands of EMR with varying efficiencies. In an implementation, the image sensors 124 include separate image sensors that are optimized for color imaging, fluorescence imaging, multispectral imaging, and/or topographical mapping.

The optical visualization system 106 typically includes multiple image sensors 124 such that the system 100 is equipped to output stereo visualization data. In some cases, stereo data frames are assessed to output a disparity map showing apparent motion of objects between the "left" stereo image and the "right" stereo image. Because the geographical locations of the image sensors 124 is known, the disparity map may then be used to generate a three-dimensional topographical map of a scene using triangulation.

The emitter 102 includes one or more EMR sources, which may include, for example, lasers, laser bundles, light emitting diodes (LEDs), electric discharge sources, incandescence sources, electroluminescence sources, and so forth. In some implementations, the emitter 102 includes at least one white EMR source 134 (may be referred to herein as a white light source). The emitter 102 may additionally include one or more EMR sources 138 that are tuned to emit a certain waveband of EMR. The EMR sources 138 may specifically be tuned to emit a waveband of EMR that is selected for multispectral or fluorescence visualization. The emitter 102 may additionally include one or more mapping sources 142 that are configured to emit EMR in a mapping pattern such as a grid array or dot array selected for capturing data for topographical mapping or anatomical measurement.

The one or more white EMR sources 134 emit EMR into a dichroic mirror 136 that feeds the white EMR into a waveguide 130, which may specifically include a fiber optic cable or other means for carrying EMR to the endoscope. The white EMR source 134 may specifically feed into a first waveguide 130a dedicated to white EMR. The EMR sources 138 emit EMR into independent dichroic mirrors 140 that each feed EMR into the waveguide 130 and may specifically feed into a second waveguide 130b. The first waveguide 130a and the second waveguide 130b later merge into a waveguide 130 that transmits EMR to a distal end of the endoscope 110 to illuminate a scene with an emission of EMR 144.

The one or more EMR sources 138 that are tuned to emit a waveband of EMR may specifically be tuned to emit EMR that is selected for multispectral or fluorescence visualization. In some cases, the EMR sources 138 are finely tuned to emit a central wavelength of EMR with a tolerance threshold not exceeding ±5 nm, ±4 nm, ±3 nm, ±2 nm, or ±1 nm. The EMR sources 138 may include lasers or laser bundles that are separately cycled on and off by the emitter 102 to pulse the emission of EMR 144 and illuminate a scene with a finely tuned waveband of EMR.

The one or more mapping sources 142 are configured to pulse EMR in a mapping pattern, which may include a dot array, grid array, vertical hashing, horizontal hashing, pin grid array, and so forth. The mapping pattern is selected for laser mapping imaging to determine one or more of a three-dimensional topographical map of a scene, a distance between two or more objects within a scene, a dimension of an object within a scene, a location of a tool 108 within the scene, and so forth. The EMR pulsed by the mapping source 142 is diffracted to spread the energy waves according to the desired mapping pattern. The mapping source 142 may specifically include a device that splits the EMR beam with quantum-dot-array diffraction grafting. The mapping source 142 may be configured to emit low mode laser light.

The controller 104 (may be referred to herein as a camera control unit or CCU) may include a field programmable gate array (FGPA) 112 and a computer 113. The FGPA 112 may be configured to perform overlay processing 114 and image processing 116. The computer 113 may be configured to generate a pulse cycle 118 for the emitter 102 and to perform further image processing 120. The FGPA 112 receives data from the image sensor 124 and may combine data from two or more data frames by way of overlay processing 114 to output an overlay image frame. The computer 113 may provide data to the emitter 102 and the image sensor 124. Specifically, the computer 113 may calculate and adjust a variable pulse cycle to be emitted by the emitter 102 in real-time based on user input. Additionally, the computer 113 may receive data frames from the image sensor 124 and perform further image processing 120 on those data frames.

The controller 104 may be in communication with a network, such as the Internet, and automatically upload data to the network for remote storage. The MCU 122 and image sensors 124 maybe exchanged and updated and continue to communicate with an established controller 104. In some cases, the controller 104 is "out of date" with respect to the MCU 122 but will still successfully communicate with the MCU 122. This may increase the data security for a hospital or other healthcare facility because the existing controller 104 may be configured to undergo extensive security protocols to protect patient data.

The controller 104 may communicate with a microcontroller unit (MCU) 122 disposed within a handpiece of the endoscope and/or the image sensor 124 by way of a data transmission pipeline 146. The data transmission pipeline 146 may include a data connection port disposed within a housing of the emitter 102 or the controller 104 that enables a corresponding data cable to carry data to the endoscope 110. In another embodiment, the controller 104 wirelessly communicates with the MCU 122 and/or the image sensor 124 to provide instructions for upcoming data frames. One frame period includes a blanking period and a readout period. Generally speaking, the pixel array 125 accumulates EMR during the blanking period and reads out pixel data during the readout period. It will be understood that a blanking period corresponds to a time between a readout of a last row of active pixels in the pixel array of the image sensor and a beginning of a next subsequent readout of active pixels in the pixel array. Additionally, the readout period corresponds to a duration of time when active pixels in the pixel array are being read. Further, the controller 104 may write correct registers to the image sensor 124 to adjust the duration of one or more of the blanking period or the readout period for each frame period on a frame-by-frame basis within the sensor cycle as needed.

The controller 104 may reprogram the image sensor 124 for each data frame to set a required blanking period duration and/or readout period duration for a subsequent frame period. In some cases, the controller 104 reprograms the image sensor 124 by first sending information to the MCU 122, and then the MCU 122 communicates directly with the image sensor 124 to rewrite registers on the image sensor 124 for an upcoming data frame.

The MCU 122 may be disposed within a handpiece portion of the endoscope 110 and communicate with electronic circuitry (such as the image sensor 124) disposed within a distal end of a lumen of the endoscope 110. The MCU 122 receives instructions from the controller 104, including an indication of the pulse cycle 118 provided to the emitter 102 and the corresponding sensor cycle timing for the image sensor 124. The MCU 122 executes a common Application Program Interface (API). The controller 104 communicates with the MCU 122, and the MCU 122 executes a translation function that translates instructions received from the controller 104 into the correct format for each type of image sensor 124. In some cases, the system 100 may include multiple different image sensors that each operate according to a different "language" or formatting, and the MCU 122 is configured to translate instructions from the controller 104 into each of the appropriate data formatting languages. The common API on the MCU 122 passes information by the scene, including, for example parameters pertaining to gain, exposure, white balance, setpoint, and so forth. The MCU 122 runs a feedback algorithm to the controller 104 for any number of parameters depending on the type of visualization.

The MCU 122 stores operational data and images captured by the image sensors 124. In some cases, the MCU 122 does not need to continuously push data up the data chain to the controller 104. The data may be set once on the microcontroller 122, and then only critical information may be pushed through a feedback loop to the controller 104. The MCU 122 may be set up in multiple modes, including a primary mode (may be referred to as a "master" mode when referring to a master/slave communication protocol). The MCU 122 ensures that all downstream components (i.e., distal components including the image sensors 124, which may be referred to as "slaves" in the master/slave communication protocol) are apprised of the configurations for upcoming data frames. The upcoming configurations may include, for example, gain, exposure duration, readout duration, pixel binning configuration, and so forth.

The MCU 122 includes internal logic for executing triggers to coordinate different devices, including, for example multiple image sensors 124. The MCU 122 provides instructions for upcoming frames and executes triggers to ensure that each image sensor 124 begins to capture data the same time. In some cases, the image sensors 124 may automatically advance to a subsequent data frame without receiving a unique trigger from the MCU 122.

In some cases, the endoscope 110 includes two or more image sensors 124 that detect EMR and output data frames simultaneously. The simultaneous data frames may be used to output a three-dimensional image and/or output imagery with increased definition and dynamic range. The pixel array of the image sensor 124 may include active pixels and optical black ("OB") or optically blind pixels. The optical black pixels may be read during a blanking period of the pixel array when the pixel array is "reset" or calibrated. After the optical black pixels have been read, the active pixels are read during a readout period of the pixel array. The active pixels accumulate EMR that is pulsed by the emitter 102 during the blanking period of the image sensor 124. The pixel array 125 may include monochromatic or "color agnostic" pixels that do not comprise any filter for selectively receiving certain wavebands of EMR. The pixel array may include a color filter array (CFA), such as a Bayer pattern CFA, that selectively allows certain wavebands of EMR to pass through the filters and be accumulated by the pixel array.

The image sensor 124 is instructed by a combination of the MCU 122 and the controller 104 working in a coordinated effort. Ultimately, the MCU 122 provides the image sensor 124 with instructions on how to capture the upcoming data frame. These instructions include, for example, an indication of the gain, exposure, white balance, exposure duration, readout duration, pixel binning configuration, and so forth for the upcoming data frame. When the image sensor 124 is reading out data for a current data frame, the MCU 122 is rewriting the correct registers for the next data frame. The MCU 122 and the image sensor 124 operate in a back-and-forth data flow, wherein the image sensor 124 provides data to the MCU 122 and the MCU 122 rewrites correct registers to the image sensor 124 for each upcoming data frame. The MCU 122 and the image sensor 124 may operate according to a "ping pong buffer" in some configurations.

The image sensor 124, MCU 122, and controller 104 engage in a feedback loop to continuously adjust and optimize configurations for upcoming data frames based on output data. The MCU 122 continually rewrites correct registers to the image sensor 124 depending on the type of upcoming data frame (i.e., color data frame, multispectral data frame, fluorescence data frame, topographical mapping data frame, and so forth), configurations for previously output data frames, and user input. In an example implementation, the image sensor 124 outputs a multispectral data frame in response to the emitter 102 pulsing a multispectral waveband of EMR. The MCU 122 and/or controller 104 determines that the multispectral data frame is underexposed and cannot successfully be analyzed by a corresponding machine learning algorithm. The MCU 122 and/or controller 104 than adjusts configurations for upcoming multispectral data frames to ensure that future multispectral data frames are properly exposed. The MCU 122 and/or controller 104 may indicate that the gain, exposure duration, pixel binning configuration, etc. must be adjusted for future multispectral data frames to ensure proper exposure. All image sensor 124 configurations may be adjusted in real-time based on previously output data processed through the feedback loop, and further based on user input.

The waveguides 130, 131 include one or more optical fibers. The optical fibers may be made of a low-cost material, such as plastic to allow for disposal of one or more of the waveguides 130, 131. In some implementations, one or more of the waveguides 130, 131 include a single glass fiber having a diameter of 500 microns. In some implementations, one or more of the waveguides 130, 131 include a plurality of glass fibers.

Figure 2A:
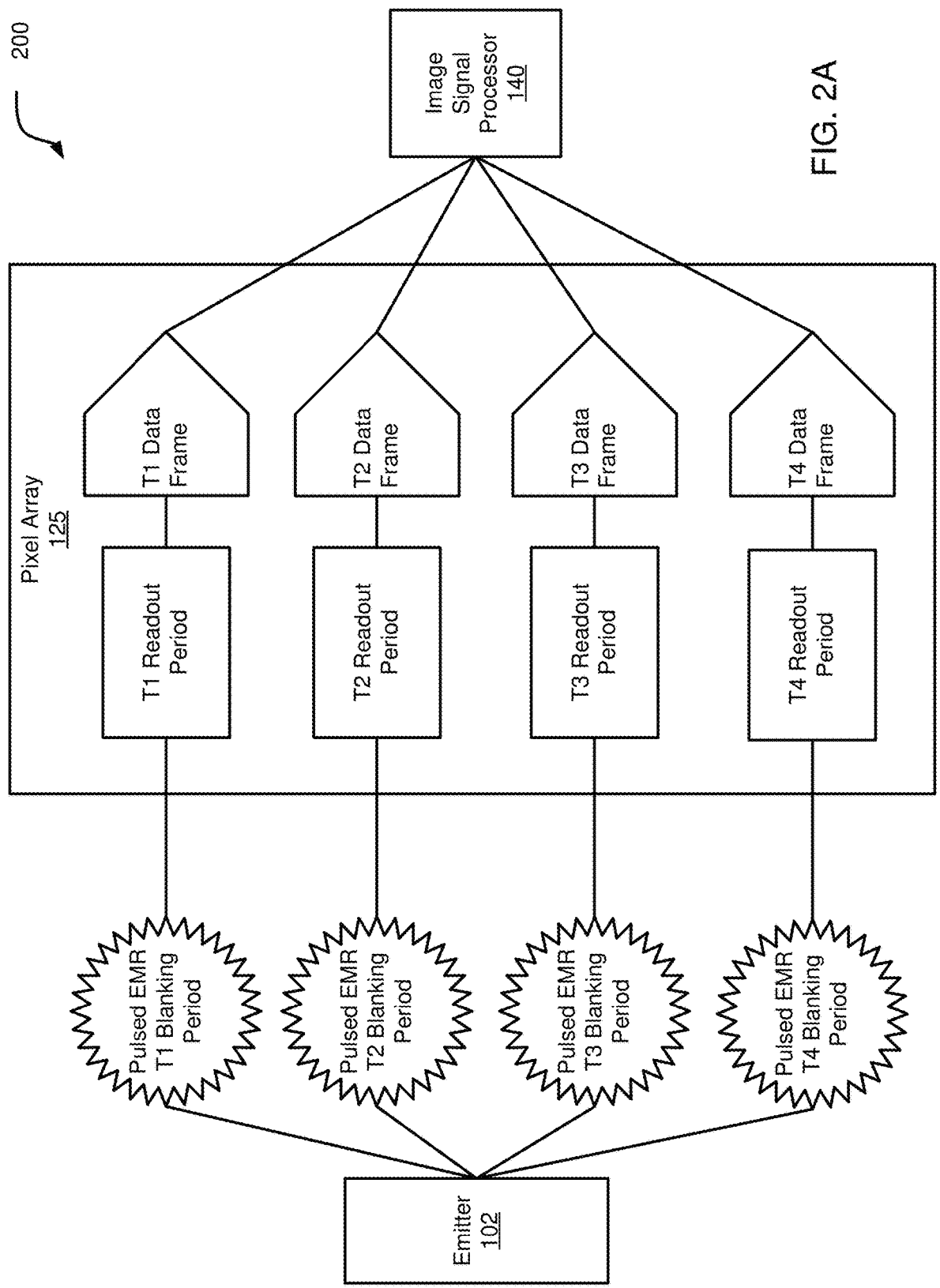
FIG. 2A is a schematic block diagram of an example data flow for a time-sequenced visualization system.
Figure 2B:
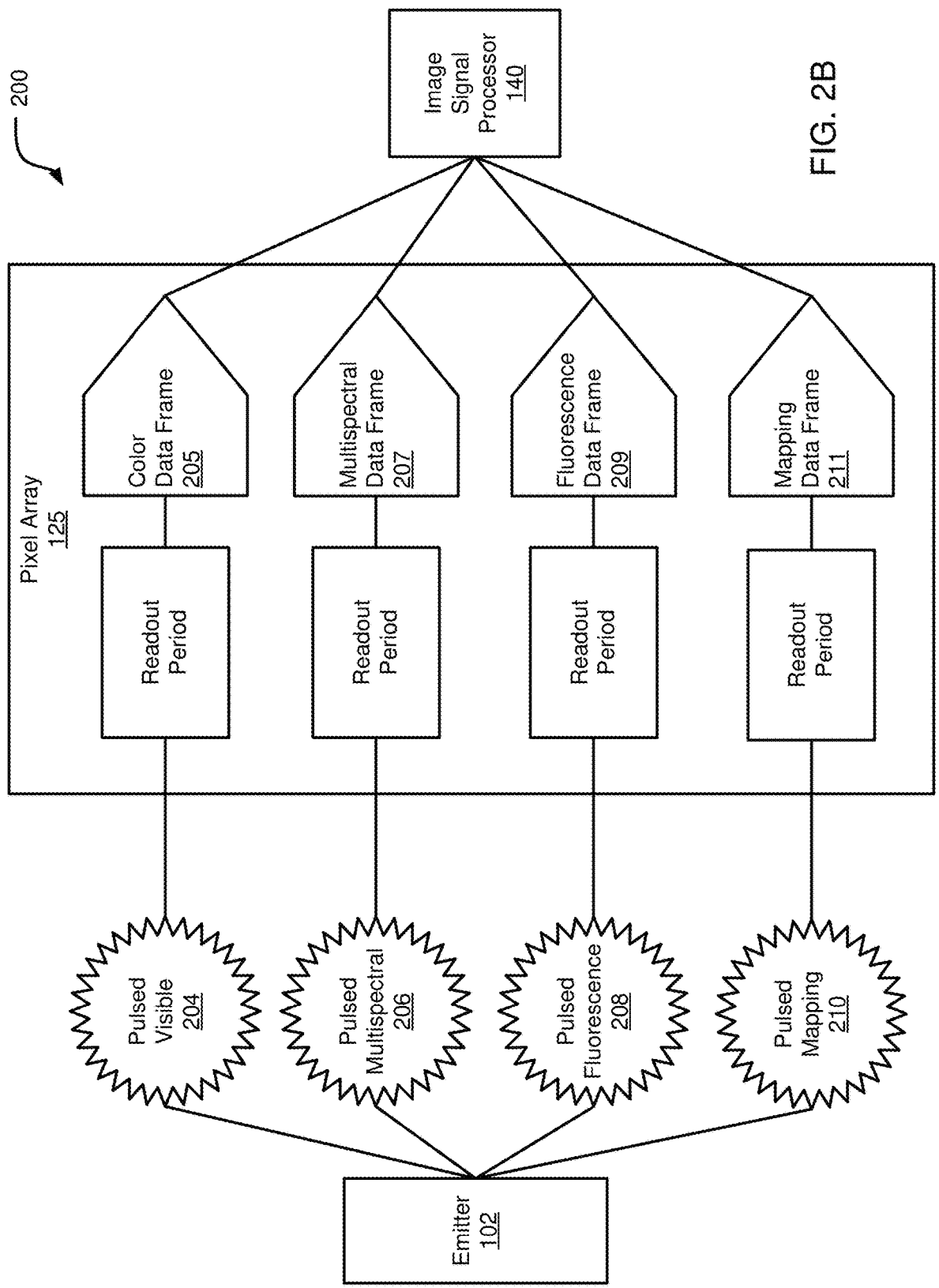
FIG. 2B is a schematic block diagram of an example data flow for a time-sequenced visualization system.

FIGS. 2A and 2B each illustrate a schematic diagram of a data flow 200 for time-sequenced visualization of a light deficient environment. The data flow 200 illustrated in FIGS. 2A-2B may be implemented by the system 100 for endoscopic visualization illustrated in FIGS. 1A-1C. FIG. 2A illustrates a generic implementation that may be applied to any type of illumination or wavelengths of EMR. FIG. 2B illustrates an example implementation wherein the emitter 102 actuates visible, multispectral, fluorescence, and mapping EMR sources.

The data flow 200 includes an emitter 102, a pixel array 125 of an image sensor 124 (not shown), and an image signal processor 140. The image signal processor 140 may include one or more of the image processing 116, 120 modules illustrated in FIGS. 1A and 1C. The emitter 102 includes a plurality of separate and independently actuatable EMR sources (see, e.g., 134, 138 illustrated in FIGS. 1A and 1C). Each of the EMR sources can be cycled on and off to emit a pulse of EMR with a defined duration and magnitude. The pixel array 125 of the image sensor 124 may include a color filter array (CFA) or an unfiltered array comprising color-agnostic pixels. The emitter 102 and the pixel array 125 are each in communication with a controller 104 (not shown in FIGS. 2A-2B) that instructs the emitter 102 and the pixel array 125 to synchronize operations to generate a plurality of data frames according to a desired visualization scheme.

The controller 104 instructs the emitter 102 to cycle the plurality of EMR sources according to a variable pulse cycle. The controller 104 calculates the variable pulse cycle based at least in part upon a user input indicating the desired visualization scheme. For example, the desired visualization scheme may indicate the user wishes to view a scene with only color imaging. In this case, the variable pulse cycle may include only pulses of white EMR. In an alternative example, the desired visualization scheme may indicate the user wishes to be notified when nerve tissue can be identified in the scene and/or when a tool within the scene is within a threshold distance from the nerve tissue. In this example, the variable pulse cycle may include pulses of white EMR and may further include pulses of one or more multispectral wavebands of EMR that elicit a spectral response from the nerve tissue and/or "see through" non-nerve tissues by penetrating those non-nerve tissues. Additionally, the variable pulse cycle may include pulses of EMR in a mapping pattern configured for laser mapping imaging to determine when the tool is within the threshold distance from the nerve tissue. The controller 104 may reconfigure the variable pulse cycle in real-time in response to receiving a revised desired visualization scheme from the user.

FIGS. 2A and 2B each illustrate a schematic diagram of a data flow 200 for time-sequenced visualization of a light deficient environment. The data flow 200 illustrated in FIGS. 2A-2B may be implemented by the system 100 for endoscopic visualization illustrated in FIGS. 1A-1C. FIG. 2A illustrates a generic implementation that may be applied to any type of illumination or wavelengths of EMR. FIG. 2B illustrates an example implementation wherein the emitter 102 actuates visible, multispectral, fluorescence, and mapping EMR sources.

The data flow 200 includes an emitter 102, a pixel array 125 of an image sensor 124 (not shown), and an image signal processor 140. The image signal processor 140 may include one or more of the image processing 116, 120 modules illustrated in FIGS. 1A and 1C. The emitter 102 includes a plurality of separate and independently actuatable EMR sources (see, e.g., 134, 138 illustrated in FIGS. 1A and 1C). Each of the EMR sources can be cycled on and off to emit a pulse of EMR with a defined duration and magnitude. The pixel array 125 of the image sensor 124 may include a color filter array (CFA) or an unfiltered array comprising color-agnostic pixels. The emitter 102 and the pixel array 125 are each in communication with a controller 104 (not shown in FIGS. 2A-2B) that instructs the emitter 102 and the pixel array 125 to synchronize operations to generate a plurality of data frames according to a desired visualization scheme.

The controller 104 instructs the emitter 102 to cycle the plurality of EMR sources according to a variable pulse cycle. The controller 104 calculates the variable pulse cycle based at least in part upon a user input indicating the desired visualization scheme. For example, the desired visualization scheme may indicate the user wishes to view a scene with only color imaging. In this case, the variable pulse cycle may include only pulses of broad spectrum visible EMR. In an alternative example, the desired visualization scheme may indicate the user wishes to be notified when nerve tissue can be identified in the scene and/or when a tool within the scene is within a threshold distance from the nerve tissue. In this example, the variable pulse cycle may include pulses of white EMR and may further include pulses of one or more multispectral wavebands of EMR that elicit a spectral response from the nerve tissue and/or "see through" non-nerve tissues by penetrating those non-nerve tissues. Additionally, the variable pulse cycle may include pulses of EMR in a mapping pattern configured for laser mapping imaging to determine when the tool is within the threshold distance from the nerve tissue. The controller 104 may reconfigure the variable pulse cycle in real-time in response to receiving a revised desired visualization scheme from the user.

FIG. 2A illustrates wherein the emitter cycles one or more EMR sources on and off to emit a pulse of EMR during each of a plurality of separate blanking periods of the pixel array 125. Specifically, the emitter 102 emits pulsed EMR during each of a T1 blanking period, T2 blanking period, T3 blanking period, and T4 blanking period of the pixel array 125. The pixel array 125 accumulates EMR during its blanking periods and reads out data during its readout periods.

Specifically, the pixel array 125 accumulates EMR during the T1 blanking period and reads out the T1 data frame during the T1 readout period, which follows the T1 blanking period. Similarly, the pixel array 125 accumulates EMR during the T2 blanking period and reads out the T2 data frame during the T2 readout period, which follows the T2 blanking period. The pixel array 125 accumulates EMR during the T3 blanking period and reads out the T3 data frame during the T3 readout period, which follows the T3 blanking period. The pixel array 125 accumulates EMR during the T4 blanking period and reads out the T4 data frame during the T4 readout period, which follows the T4 blanking period. Each of the T1 data frame, the T2 data frame, the T3 data frame, and the T4 data frame is provided to the image signal processor 140.

The contents of each of the T1-T4 data frames is dependent on the type of EMR that was pulsed by the emitter 102 during the preceding blanking period. For example, if the emitter 102 pulses white light during the preceding blanking period, then the resultant data frame may include a color data frame (if the pixel array 125 includes a color filter array for outputting red, green, and blue image data). Further for example, if the emitter 102 pulses a multispectral waveband of EMR during the preceding blanking period, then the resultant data frame is a multispectral data frame comprising information for identifying a spectral response by one or more objects within the scene and/or information for "seeing through" one or more structures within the scene. Further for example, if the emitter 102 pulses a fluorescence excitation waveband of EMR during the preceding blanking period, then the resultant data frame is a fluorescence data frame comprising information for identifying a fluorescent reagent or autofluorescence response by a tissue within the scene. Further for example, if the emitter 102 pulses EMR in a mapping pattern during the preceding blanking period, then the resultant data frame is a mapping data frame comprising information for calculating one or more of a three-dimensional topographical map of the scene, a dimension of one or more objects within the scene, a distance between two or more objects within the scene, and so forth.

Some "machine vision" or "computer vision" data frames, including multispectral data frames, fluorescence data frames, and mapping data frames may be provided to a corresponding algorithm or neural network configured to evaluate the information therein. A multispectral algorithm may be configured to identify one or more tissue structures within a scene based on how those tissue structures respond to one or more different wavebands of EMR selected for multispectral imaging. A fluorescence algorithm may be configured to identify a location of a fluorescent reagent or auto-fluorescing tissue structure within a scene. A mapping algorithm may be configured to calculate one or more of a three-dimensional topographical map of a scene, a depth map, a dimension of one or more objects within the scene, and/or a distance between two or more objects within the scene based on the mapping data frame.

FIG. 2B illustrates an example wherein the emitter 102 cycles separate visible, multispectral, fluorescence, and mapping EMR sources to emit pulsed visible 204, pulsed multispectral 206, pulsed fluorescence 208, and pulsed EMR in a mapping pattern 210. It should be appreciated that FIG. 2B is illustrative only, and that the emissions 204, 206, 208, 210 may be emitted in any order, may be emitted during a single visualization session as shown in FIG. 2B, and may be emitted during separate visualization sessions.

The pixel array 125 reads out a color data frame 205 in response to the emitter 102 pulsing the pulsed visible 204 EMR. The pulsed visible 204 EMR may specifically include a pulse of white light. The pixel array 125 reads out a multispectral data frame 207 in response to the emitter 102 pulsing the multispectral 206 waveband of EMR. The pulsed multispectral 206 waveband of EMR may specifically include one or more of EMR within a waveband from about 450-500 nanometer (nm), 513-545 nm, 565-585 nm, 600-650 nm, 700-770 nm, 770-790 nm, 805-850 nm, and/or 900-1000 nm. It will be appreciated that the pulsed multispectral 206 waveband of EMR may include various other wavebands used to elicit a spectral response. The pixel array 125 reads out a fluorescence data frame 209 in response to the emitter 102 pulsing the fluorescence 208 waveband of EMR. The pulsed fluorescence 208 waveband of EMR may specifically include one or more of EMR within a waveband from about 770-795 nm and/or 790-815 nm. The pixel array 125 reads out a mapping data frame 211 in response to the emitter 102 pulsing EMR in a mapping pattern 210. The pulsed mapping pattern 210 may include one or more of vertical hashing, horizontal hashing, a pin grid array, a dot array, a raster grid of discrete points, and so forth. Each of the color data frame 205, the multispectral data frame 207, the fluorescence data frame 209, and the mapping data frame 211 is provided to the image signal processor 140.

In an implementation, the emitter 102 separately pulses red, green, and blue visible EMR. In this implementation, the pixel array 125 may include a monochromatic (color agnostic) array of pixels. The pixel array 125 may separately read out a red data frame, a green data frame, and a blue data frame in response to the separate pulses of red, green, and blue visible EMR.

In an implementation, the emitter 102 separately pulses wavebands of visible EMR that are selected for capturing luminance ("Y") imaging data, red chrominance ("Cr") imaging data, and blue chrominance ("Cb") imaging data. In this implementation, the pixel array 125 may separately read out a luminance data frame (comprising only luminance imaging information), a red chrominance data frame, and a blue chrominance data frame.

Figure 2C:
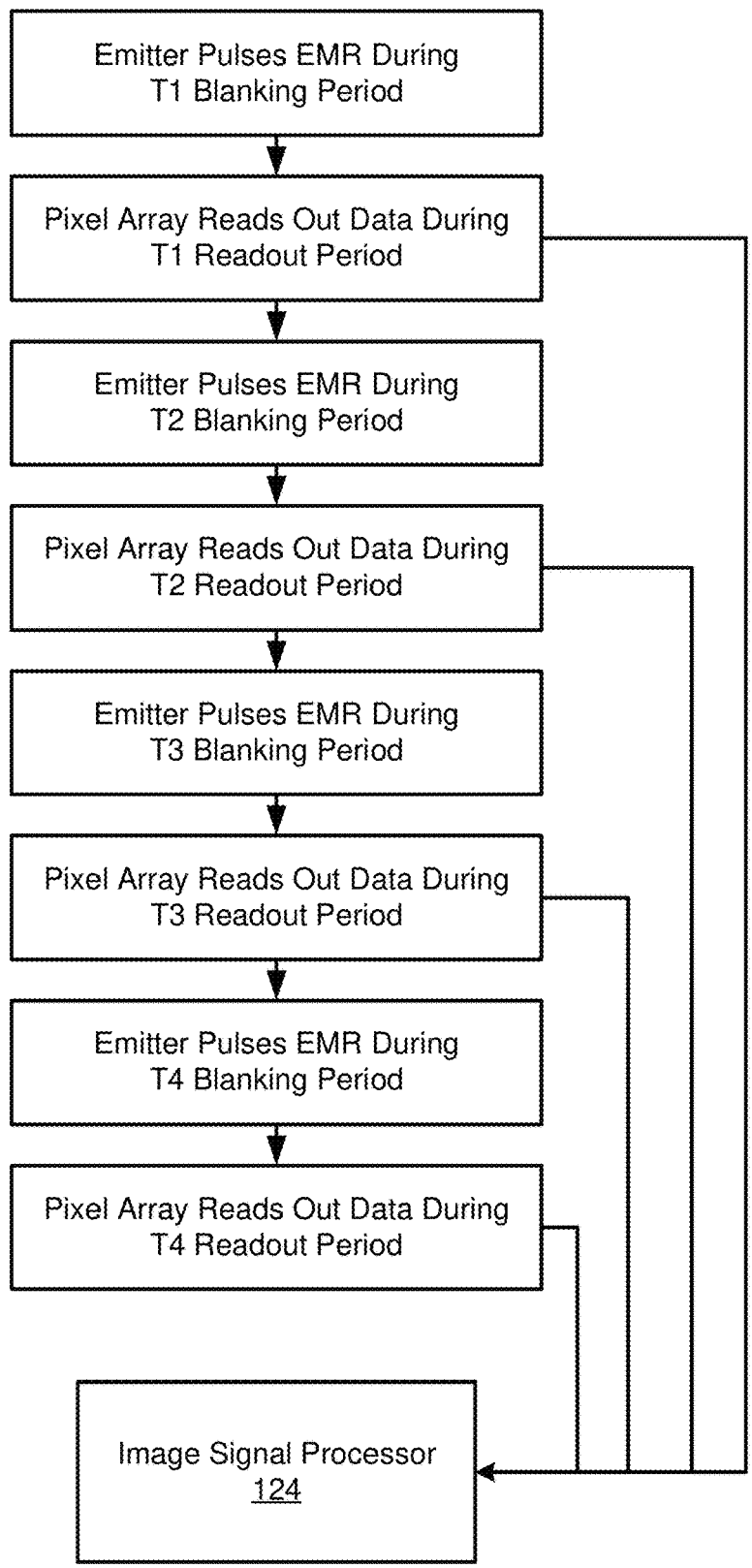
FIG. 2C is a schematic flow chart diagram of a data flow for capturing and reading out data for a time-sequenced visualization system.

FIG. 2C illustrates a schematic flow chart diagram of a process flow for synchronizing operations of the emitter 102 and the pixel array 125. The process flow corresponds with the schematic diagram illustrated in FIG. 2A. The process flow includes the controller 104 instructing the emitter 102 to pulse EMR during a T1 blanking period of the pixel array 125 and then instructing the pixel array 125 to read out data during a T1 readout period following the T1 blanking period. Similarly, the controller 104 instructs the emitter to pulse EMR during each of the T2 blanking period, the T3 blanking period, and the T4 blanking period. The controller 104 instructs the emitter to read out data during each of the T2 readout period, the T3 readout period, and the T4 readout period that follow the corresponding blanking periods. Each of the output data frames are provided to the image signal processor 140.

The emitter 102 pulses according to a variable pulse cycle that includes one or more types of EMR. The variable pulse cycle may include visible EMR, which may include a white light emission, red light emission, green light emission, blue light emission, or some other waveband of visible EMR. The white light emission may be pulsed with a white light emitting diode (LED) or other light source and may alternatively be pulsed with a combination of red, green, and blue light sources pulsing in concert. The variable pulse cycle may include one or more wavebands of EMR that are selected for multispectral imaging or fluorescence imaging. The variable pulse cycle may include one or more emissions of EMR in a mapping pattern selected for three-dimensional topographical mapping or calculating dimensions within a scene. In some cases, several types of EMR are represented in the variable pulse cycle with different regularity than other types of EMR. This may be implemented to emphasize and de-emphasize aspects of the recorded scene as desired by the user.

The controller 104 adjusts the variable pulse cycle in real-time based on the visualization objectives. The system enables a user to input one or more visualization objectives and to change those objectives while using the system. For example, the visualization objective may indicate the user wishes to view only color imaging data, and in this case, the variable pulse cycle may include pulsed or constant emissions of white light (or other visible EMR). The visualization objective may indicate the user wishes to be notified when a scene includes one or more types of tissue or conditions that may be identified using one or more of color imaging, multispectral imaging, or fluorescence imaging. The visualization objective may indicate that a patient has been administered a certain fluorescent reagent or dye, and that fluorescence imaging should continue while the reagent or dye remains active. The visualization objective may indicate the user wishes to view a three-dimensional topographical map of a scene, receive information regarding distances or dimensions within the scene, receive an alert when a tool comes within critical distance from a certain tissue structure, and so forth.

The variable pulse cycle may include one or more finely tuned partitions of the electromagnetic spectrum that are selected to elicit a fluorescence response from a reagent, dye, or auto-fluorescing tissue. The fluorescence excitation wavebands of EMR include one or more of the following: 400±50 nm, 450±50 nm, 500±50 nm, 550±50 nm, 700±50 nm, 650±50 nm, 800±50 nm, 810±50 nm, 820±50 nm, 730±50 nm, 740±50 nm, 750±50 nm, 760±50 nm, 770±50 nm, 780±50 nm, 790±50 nm, 800±50 nm, 810±50 nm, 820±50 nm, 830±50 nm, 840±50 nm, 850±50 nm, 860±50 nm, 870±50 nm, 880±50 nm, 890±50 nm, or 900±50 nm. The aforementioned wavebands may be finely tuned such that the emitter pulses the central wavelength with a tolerance threshold of ±100 nm, ±90 nm, ±80 nm, ±70 nm, ±60 nm, ±50 nm, ±40 nm, ±30 nm, ±20 nm, ±10 nm, ±8 nm, ±6 nm, ±5 nm, ±4 nm, ±3 nm, ±2 nm, ±1 nm, and so forth. In some cases, the emitter includes a plurality of laser bundles that are each configured to pulse a particular wavelength of EMR with a tolerance threshold not greater than ±5 nm, ±4 nm, ±3 nm, or ±2 nm.

The variable pulse cycle may include one or more wavebands of EMR that are tuned for multispectral imaging. These wavebands of EMR are selected to elicit a spectral response from a certain tissue or penetrate through a certain tissue (such that substances disposed behind that tissue may be visualized). The multispectral wavebands of EMR include one or more of the following: 400±50 nm, 410±50 nm, 420±50 nm, 430±50 nm, 440±50 nm, 450±50 nm, 460±50 nm, 470±50 nm, 480±50 nm, 490±50 nm, 500±50 nm, 546±50 nm, 600±50 nm, 530±50 nm, 540±50 nm, 550±50 nm, 560±50 nm, 570±50 nm, 580±50 nm, 590±50 nm, 700±50 nm, 630b±50 nm, 620±50 nm, 630±50 nm, 640±50 nm, 650±50 nm, 660±50 nm, 670±50 nm, 680±50 nm, 690±50 nm, 800±50 nm, 810±50 nm, 820±50 nm, 730±50 nm, 740±50 nm, 750±50 nm, 760±50 nm, 770±50 nm, 780±50 nm, 790±50 nm, 800±50 nm, 810±50 nm, 820±50 nm, 830±50 nm, 840±50 nm, 850±50 nm, 860±50 nm, 870±50 nm, 880±50 nm, 890±50 nm, 900±50 nm, 910±50 nm, 920±50 nm, 930±50 nm, 940±50 nm, 950±50 nm, 960±50 nm, 970±50 nm, 980±50 nm, 990±50 nm, 1000±50 nm, 900±100 nm, 950±100 nm, or 1000±100 nm. The aforementioned wavebands may be finely tuned such that the emitter pulses the central wavelength with a tolerance threshold of ±100 nm, ±90 nm, ±80 nm, ±70 nm, ±60 nm, ±50 nm, ±40 nm, ±30 nm, ±20 nm, ±10 nm, ±8 nm, ±6 nm, ±5 nm, ±4 nm, ±3 nm, ±2 nm, ±1 nm, and so forth. In some cases, the emitter includes a plurality of laser bundles that are each configured to pulse a particular wavelength of EMR with a tolerance threshold not greater than ±5 nm, ±4 nm, ±3 nm, or ±2 nm.

Certain multispectral wavelengths pierce through tissue and enable a medical practitioner to "see through" tissues in the foreground to identify chemical processes, structures, compounds, biological processes, and so forth that are located behind the foreground tissues. The multispectral wavelengths may be specifically selected to identify a specific disease, tissue condition, biological process, chemical process, type of tissue, and so forth that is known to have a certain spectral response.

The variable pulse cycle may include one or more emissions of EMR that are optimized for mapping imaging, which includes, for example, three-dimensional topographical mapping, depth map generation, calculating distances between objects within a scene, calculating dimensions of objects within a scene, determining whether a tool or other object approaches a threshold distance from another object, and so forth. The pulses for laser mapping imaging include EMR formed in a mapping pattern, which may include one or more of vertical hashing, horizontal hashing, a dot array, and so forth.

The controller 104 optimizes the variable pulse cycle to accommodate various imaging and video standards. In most use-cases, the system outputs a video stream comprising at least 30 frames per second (fps). The controller 104 synchronizes operations of the emitter and the image sensor to output data at a sufficient frame rate for visualizing the scene and further for processing the scene with one or more advanced visualization techniques. A user may request a real-time color video stream of the scene and may further request information based on one or more of multispectral imaging, fluorescence imaging, or laser mapping imaging (which may include topographical mapping, calculating dimensions and distances, and so forth). The controller 104 causes the image sensor to separately sense color data frames, multispectral data frames, fluorescence data frames, and mapping data frames based on the variable pulse cycle of the emitter.

In some cases, a user requests more data types than the system can accommodate while maintaining a smooth video frame rate. The system is constrained by the image sensor's ability to accumulate a sufficient amount of electromagnetic energy during each blanking period to output a data frame with sufficient exposure. In some cases, the image sensor outputs data at a rate of 60-120 fps and may specifically output data at a rate of 60 fps. In these cases, for example, the controller 104 may devote 24-30 fps to color visualization and may devote the other frames per second to one or more advanced visualization techniques.

The controller 104 calculates and adjusts the variable pulse cycle of the emitter 102 in real-time based at least in part on the known capabilities of the pixel array 125. The controller 104 may access data stored in memory indicating how long the pixel array 125 must be exposed to a certain waveband of EMR for the pixel array 125 to accumulate a sufficient amount of EMR to output a data frame with sufficient exposure. In most cases, the pixel array 125 is inherently more or less sensitive to different wavebands of EMR. Thus, the pixel array 125 may require a longer or shorter blanking period duration for some wavebands of EMR to ensure that all data frames output by the image sensor 124 comprise sufficient exposure levels.

Figure 3A:
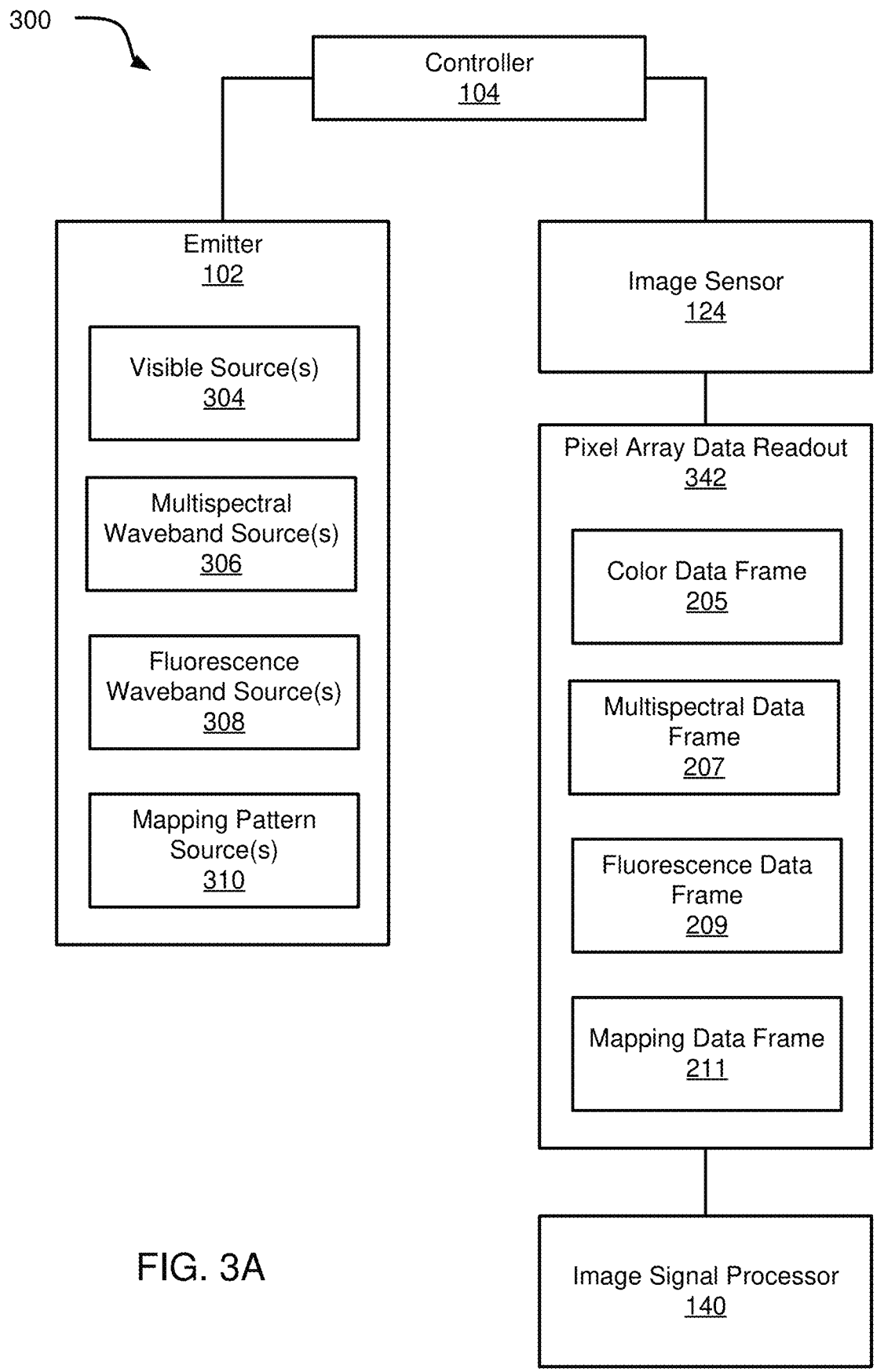
FIG. 3A is a schematic block diagram of an example system for processing data output by an image sensor with a controller in communication with an emitter and the image sensor.
Figure 3B:
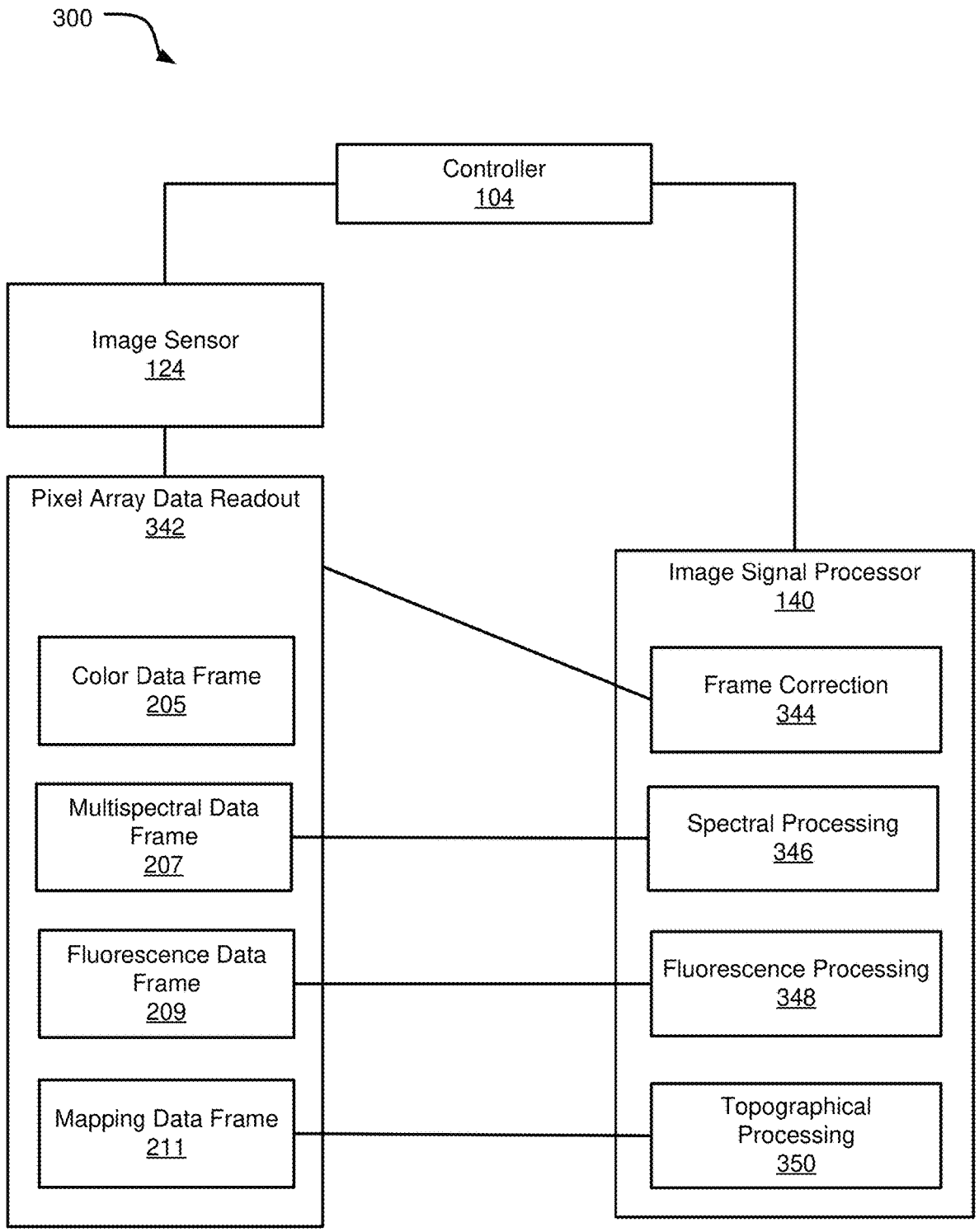
FIG. 3B is a schematic block diagram of an example system for processing data output by an image sensor to generate color imaging data and advanced imaging data.

The controller 104 determines the data input requirements for various advanced visualization algorithms (see, e.g., the algorithms 346, 348, 350 first described in FIG. 3B). For example, the controller 104 may determine that certain advanced visualization algorithms do not require a data input at the same regularity as a color video stream output of 30 fps. In these cases, the controller 104 may optimize the variable pulse cycle to include white light pulses at a more frequent rate than pulses for advanced visualization such as multispectral, fluorescence, or laser mapping imaging. Additionally, the controller 104 determines whether certain algorithms may operate with lower resolution data frames that are read out by the image sensor using a pixel binning configuration. In some cases, the controller 104 ensures that all color frames provided to a user are read out in high-resolution (without pixel binning). However, some advanced visualization algorithms (see e.g., 346, 348, 350) may execute with lower resolution data frames.

The system 100 may include a plurality of image sensors 124 that may have different or identical pixel array configurations. For example, one image sensor 124 may include a monochromatic or "color agnostic" pixel array with no filters, another image sensor 124 may include a pixel array with a Bayer pattern CFA, and another image sensor 124 may include a pixel array with a different CFA. The multiple image sensors 124 may be assigned to detect EMR for a certain imaging modality, such as color imaging, multispectral imaging, fluorescence imaging, or laser mapping imaging. Further, each of the image sensors 124 may be configured to simultaneously accumulate EMR and output a data frame, such that all image sensors are capable of sensing data for all imaging modalities.

The controller 104 prioritizes certain advanced visualization techniques based on the user's ultimate goals. In some cases, the controller 104 prioritizes outputting a smooth and high-definition color video stream to the user above other advanced visualization techniques. In other cases, the controller 104 prioritizes one or more advanced visualization techniques over color visualization, and in these cases, the output color video stream may appear choppy to a human eye because the system outputs fewer than 30 fps of color imaging data.

For example, a user may indicate that a fluorescent reagent has been administered to a patient. If the fluorescent reagent is time sensitive, then the controller 104 may ensure that a sufficient ratio of frames is devoted to fluorescence imaging to ensure the user receives adequate fluorescence imaging data while the reagent remains active. In another example, a user requests a notification whenever the user's tool comes within a threshold distance of a certain tissue, such as a blood vessel, nerve fiber, cancer tissue, and so forth. In this example, the controller 104 may prioritize laser mapping visualization to constantly determine the distance between the user's tool and the surrounding structures and may further prioritize multispectral or fluorescence imaging that enables the system to identify the certain tissue. The controller 104 may further prioritize color visualization to ensure the user continues to view a color video stream of the scene.

Figure 3C:
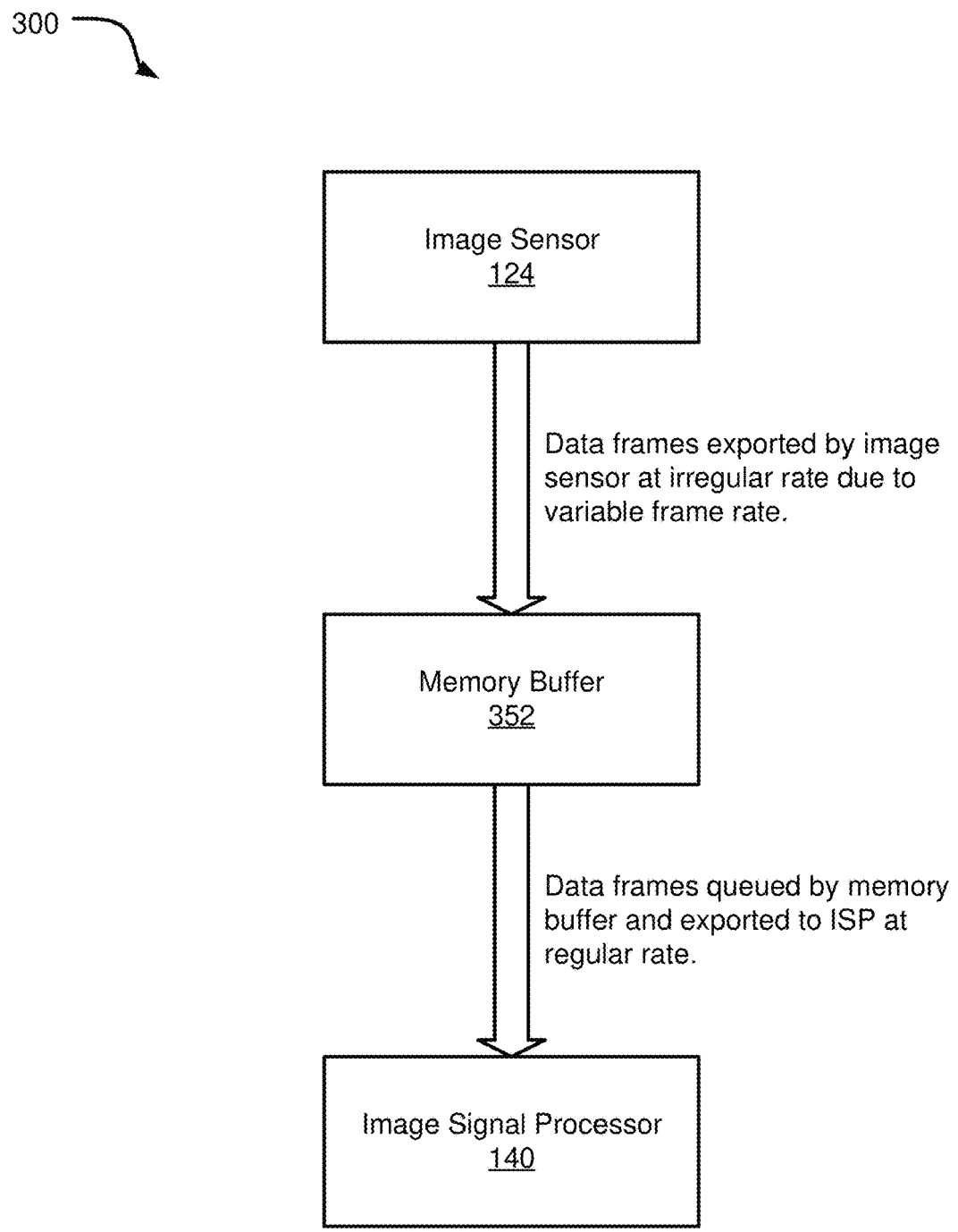
FIG. 3C is a schematic block diagram of an example system for processing data through a memory buffer to provide data frames to an image signal processor at regular intervals.

FIGS. 3A-3C illustrate schematic diagrams of a system 300 for processing data output by an image sensor 124 comprising the pixel array 125. The system 300 includes a controller 104 in communication with each of the emitter 102 and the image sensor 124 comprising the pixel array 125. The emitter 102 includes one or more visible sources 304, multispectral waveband sources 306, fluorescence waveband sources 308, and mapping pattern sources 310 of EMR. The pixel array data readout 342 of the image sensor 124 includes one or more of the color data frames 205, multispectral data frames 207, fluorescence data frames 209, and mapping data frames 211 as discussed in connection with FIG. 2B.

As illustrated in FIG. 3B, all data read out by the pixel array may undergo frame correction 344 processing by the image signal processor 140. In various implementations, one or more of the color data frame 205, the multispectral data frame 207, the fluorescence data frame 209, and the mapping data frame 211 undergoes frame correction 344 processes. The frame correction 344 includes one or more of sensor correction, white balance, color correction, or edge enhancement.

The multispectral data frame 207 may undergo spectral processing 346 that is executed by the image signal processor 140 and/or another processor that is external to the system 300. The spectral processing 346 may include a machine learning algorithm and may be executed by a neural network configured to process the multispectral data frame 207 to identify one or more tissue structures within a scene based on whether those tissue structures emitted a spectral response.

The fluorescence data frame 209 may undergo fluorescence processing 348 that is executed by the image signal processor 140 and/or another processor that is external to the system 300. The fluorescence processing 348 may include a machine learning algorithm and may be executed by a neural network configured to process to fluorescence data frame 209 and identify an intensity map wherein a fluorescence relaxation wavelength is detected by the pixel array.

The mapping data frame 211 may undergo topographical processing 350 that is executed by the image signal processor 140 and/or another processor that is external to the system 300. The topographical processing 350 may include a machine learning algorithm and may be executed by a neural network configured to assess time-of-flight information to calculate a depth map representative of the scene. The topographical processing 350 includes calculating one or more of a three-dimensional topographical map of the scene, a dimension of one or more objects within the scene, a distance between two or more objects within the scene, a distance between a tool and a certain tissue structure within the scene, and so forth.

FIG. 3C illustrates a schematic diagram of a system 300 and process flow for managing data output at an irregular rate. The image sensor 124 operates according to a sensor cycle that includes blanking periods and readout periods. The image sensor 124 outputs a data frame at the conclusion of each readout period that includes an indication of the amount of EMR the pixel array accumulated during the preceding accumulation period or blanking period.

Each frame period in the sensor cycle is adjustable on a frame-by-frame basis to optimize the output of the image sensor and compensate for the pixel array 125 having varying degrees of sensitivity to different wavebands of EMR. The duration of each blanking period may be shortened or lengthened to customize the amount of EMR the pixel array 125 can accumulate. Additionally, the duration of each readout period may be shortened or lengthened by implementing a pixel binning configuration or causing the image sensor to read out each pixel within the pixel array 125. Thus, the image sensor 124 may output data frames at an irregular rate due to the sensor cycle comprising a variable frame rate. The system 300 includes a memory buffer 352 that receives data frames from the image sensor 124. The memory buffer 352 stores the data frames and then outputs each data frame to the image signal processor 140 at a regular rate. This enables the image signal processor 140 to process each data frame in sequence at a regular rate.

Figure 4:
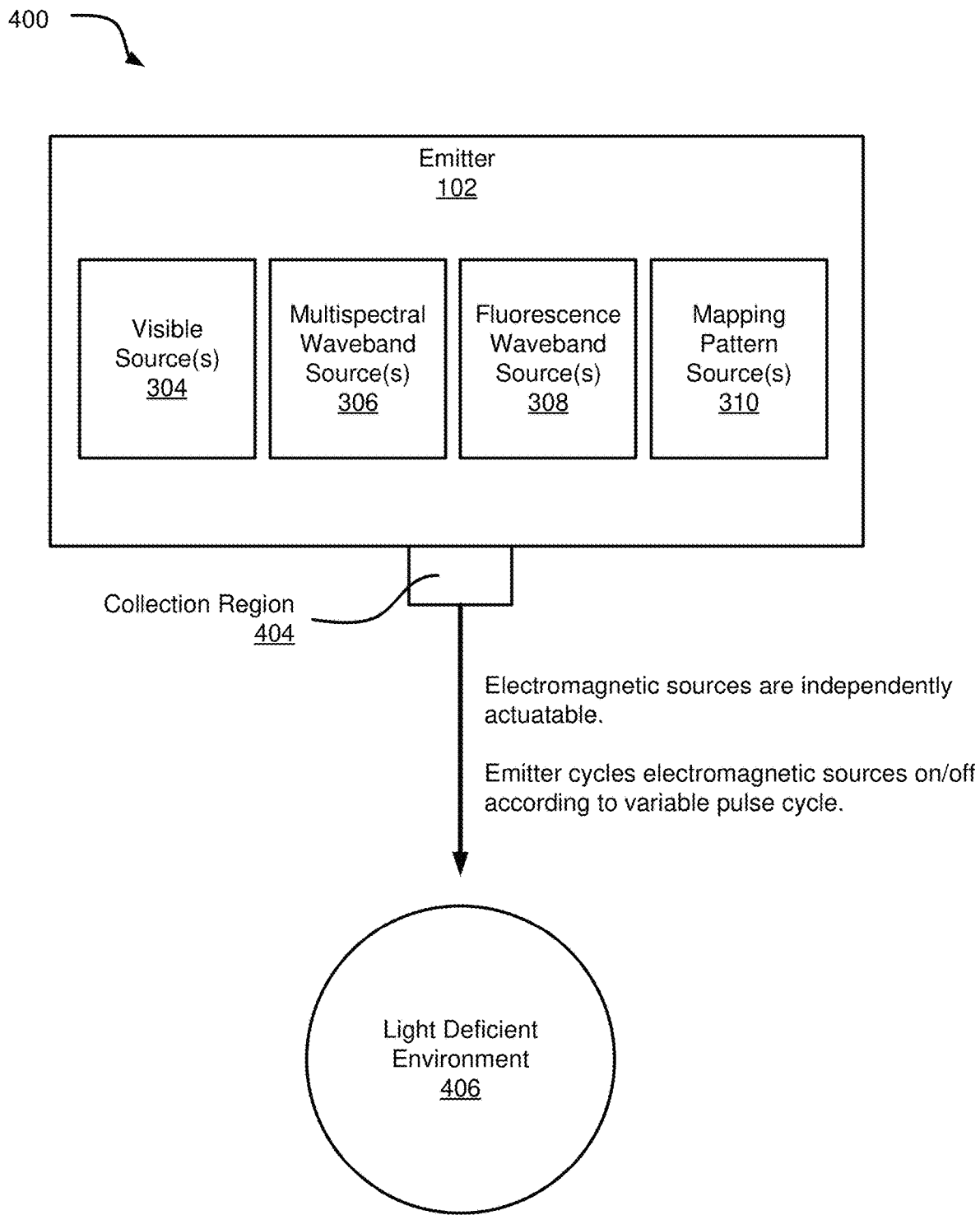
FIG. 4 is a schematic diagram of an illumination system for illuminating a light deficient environment according to a variable pulse cycle.

FIG. 4 is a schematic diagram of an illumination system 400 for illuminating a light deficient environment 406 such as an interior of a body cavity. In most cases, the emitter 102 is the only source of illumination within the light deficient environment 406 such that the pixel array of the image sensor does not detect any ambient light sources. The emitter 102 includes a plurality of separate and independently actuatable sources of EMR, which may include visible source(s) 304, multispectral waveband source(s) 306, fluorescence waveband source(s) 308, and mapping pattern source(s) 310. The emitter may cycle a selection of the sources on and off to pulse according to the variable pulse cycle received from the controller 104. Each of the EMR sources feeds into a collection region 404 of the emitter 102. The collection region 404 may then feed into a waveguide (see e.g., 130 in FIG. 1A) that transmits the pulsed EMR to a distal end of an endoscope within the light deficient environment 406.

The variable pulsing cycle is customizable and adjustable in real-time based on user input. The emitter 102 may instruct the individual EMR sources to pulse in any order. Additionally, the emitter 102 may adjust one or more of a duration or an intensity of each pulse of EMR. The variable pulse cycle may be optimized to sufficiently illuminate the light deficient environment 406 such that the resultant data frames read out by the pixel array 125 are within a desired exposure range (i.e., the frames are neither underexposed nor overexposed). The desired exposure range may be determined based on user input, requirements of the image signal processor 140, and/or requirements of a certain image processing algorithm (see 344, 346, 348, and 350 in FIG. 3B). The sufficient illumination of the light deficient environment 406 is dependent on the energy output of the individual EMR sources and is further dependent on the efficiency of the pixel array 125 for sensing different wavebands of EMR.

Figure 5:
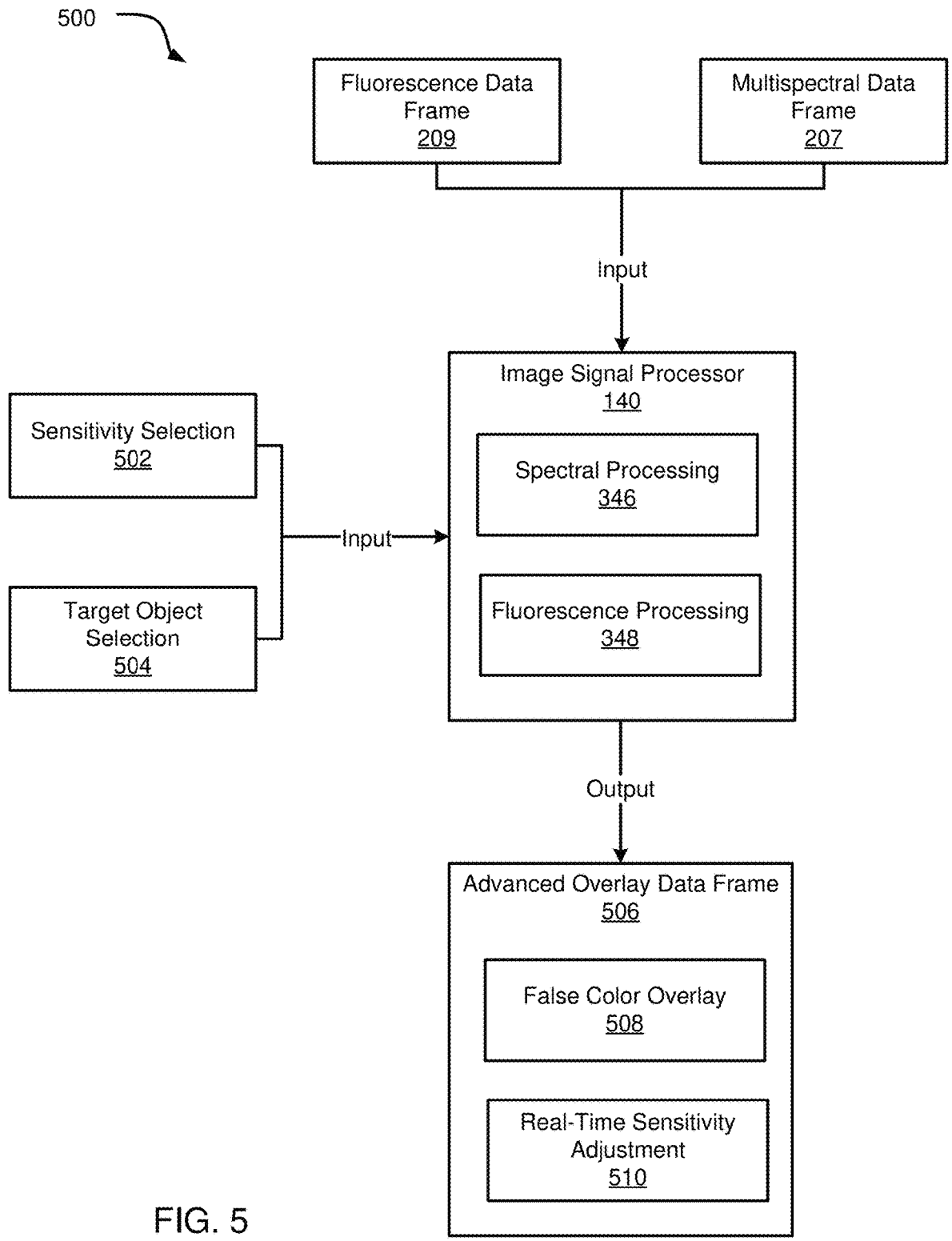
FIG. 5 is a schematic block diagram of an example system and process flow for generating advanced overlay data frames comprising a false color overlay that is adjustable in real-time based on user input.

FIG. 5 is a schematic block diagram of a process flow 500 for instructing the image signal processor 140 to generate an advanced overlay data frame 506 based on user inputs. The process flow 500 depicted in FIG. 5 is implemented based on one or more threshold response spectrums, such as the example threshold response spectrum 600 illustrated in FIG. 6. The image signal processor 140 generates the advanced overlay data frame 506 based on specifications that may change over time.

The advanced overlay data frame 506 is a specialty frame for visualizing a scene. The advanced overlay data frame 506 may specifically include the combination of a color data frame 205 with information extracted from one or more of a multispectral data frame 207, a fluorescence data frame 209, or a mapping data frame 211. The information extracted from the advanced data frame 207, 209, 211 is rendered as an overlay on the color data frame 205.

In some cases, the advanced overlay data frame 506 includes the color data frame 205 and further includes a false color overlay 508 highlighting certain regions of the color data frame 205. The false color overlay 508 may be used to highlight certain objects or tissues. The advanced overlay data frame 506 may include multiple false color overlays 508 to highlight different tissues. For example, the advanced overlay data frame 506 may include a red false color overlay to highlight arteries, a blue false color overlay to highlight veins, and a purple false color overlay to highlight nervous tissue. A user of the system 100 may select which colors should be assigned to different objects or tissues within the scene.

In some cases, the advanced overly data frame 506 includes textual messages overlaid on the color data frame 205. The textual messages may include an alert, a distance, a dimension, or other information. A user of the system 100 may request an audio and/or visual alert to be issued when a tool within the scene comes within a threshold distance of a certain type of tissue, such as a blood vessel or nerve. The user may request an audio and/or visual alert to be issued when the user has successfully excised all known cancerous tissue, or other type of tissue. The textual messages may additionally include the patient's identifying information, the current date or time, the length of the surgery of visualization session, data captured by other systems, and so forth. The data captured by other systems may include, for example, the patient's current vitals or an alert if the patient's vitals come within a critical range.

In the process flow 500, the advanced overlay data frame 506 specifically includes information extracted from one or more of the multispectral data frame 207 or the fluorescence data frame 209. In some implementations, a user requests the system 100 output a real-time video stream comprising advanced overlay data frames 506. This advanced video stream enables the user to view the scene with a series of color data frames 205, and further enables the user to garner additional information extracted from a series of multispectral data frames 207 or fluorescence data frames 209. The information extracted from the multispectral data frames 207 and/or the fluorescence data frames 209 may be rendered on the color data frame 205 as a false color overlay 508 heatmap highlighting target objects within the scene.

The specifications for the advanced overlay data frame 506 may be stored in memory of the system 100 and retrieved as a default setting. Additionally, the specifications may be input by a user in real-time while the user is actively visualizing a scene, and in this case, the image signal processor 140 will react to the user inputs in real-time to adjust the advanced overlay data frame 506 to comply with the user requests. The system 100 may provide several options to a user for adjusting the sensitivity selection 502 in real-time. For example, the system 100 may enable the user to select one of "low sensitivity," "medium sensitivity," or "high sensitivity" for each target object to be identified. In another implementation, the system 100 enables the user to input a numerical sensitivity selection, for example the user may input any sensitivity rating from 0% sensitivity up through 100% sensitivity.

The specifications include at least a sensitivity selection 502 and a target object selection 504. The target object selection 504 indicates which objects or tissues a user wishes to highlight with the false color overlay 508. In an example implementation, the system 100 is used during a surgical procedure to visualize the interior of a patient's body cavity. The user performing the surgery may request that the system 100 highlight certain tissues, such as arteries, veins, nerves, cancerous tissue, ureters, bile ducts, tissue perfusion, and so forth. The user may also indicate how those objects or tissues should be highlighted or identified, including whether they should be highlighted with a false color overlay of a certain color, whether they should be highlighted with a binary yes/no overlay, and whether they should be highlighted with a graduated false color heatmap.

The user may indicate a sensitivity 502 for visualizing the target object 504. The image signal processor 140 adjusts the false color overlay 508 based on the selected sensitivity 502. If the sensitivity 502 is set to a low sensitivity, then fewer regions within the scene are likely to be highlighted. If the sensitivity 502 is set to a high sensitivity, then more regions within the scene are likely to be highlighted. The sensitivity selection 502 indicates a threshold for determining whether a certain region should be identified as including the target object selection 504. The information extracted via the spectral processing 346 and the fluorescence processing 348 is unlikely to be "perfect" and enable a definitive yes or no prediction on whether a certain region of the scene includes the target object selection 504. It is more likely the spectral processing 346 and the fluorescence processing 348 output a degree of likelihood that the region includes the target object selection 504. The sensitivity selection 502 informs the image signal processor 140 of the applicable threshold for adding the false color overlay 508 to the advanced overlay data frame 506 viewed by the user. Additionally, different surgical staff will naturally have different preferences in terms of the level of detail they would like the system to display, regardless of the overall mathematical "accuracy" of the false color overlay 508.

Thus, the advanced overlay data frame 506 may not include a binary yes/no overlay but may include a graduated heatmap. The graduated heatmap includes regions of distinct colors to inform a user whether a certain region is more or less likely to include the target object. In an example implementation, a region that almost certainly includes the target object may be highlighted with a red false color overlay 508. The boundaries of this region may then be highlighted with a pink false color overlay 508 to indicate that the spectral processing 346 and/or fluorescence processing 348 algorithm is less certain whether that region includes the target object.

Figure 6:
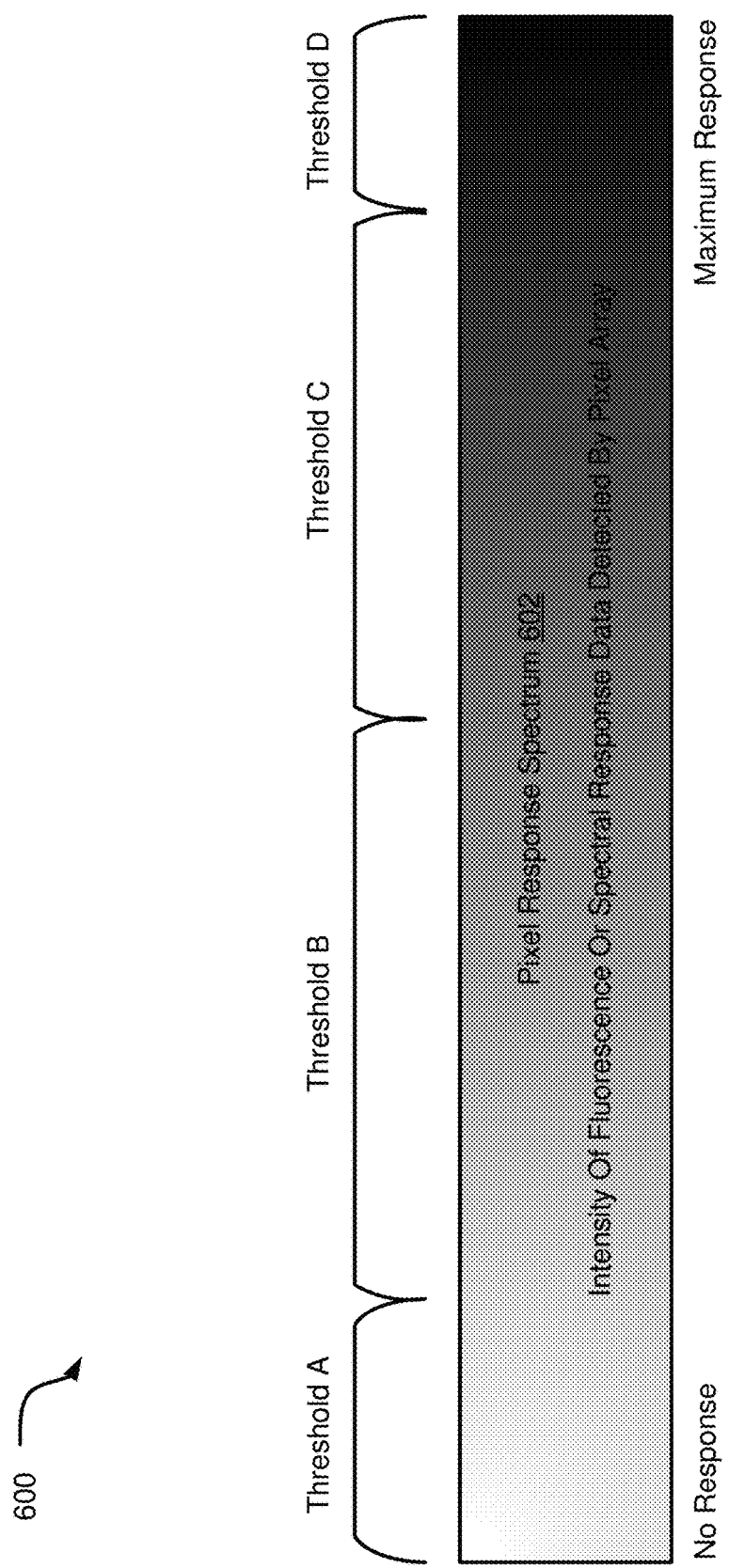
FIG. 6 is a schematic diagram of an example threshold response spectrum for classifying whether a pixel should be displayed with a false color overlay.

FIG. 6 is a schematic illustration of an example threshold response spectrum 600 for classifying a pixel within a threshold sensitivity range. Each sensitivity selection 502 is associated with a threshold range for pixel values. In most cases, the user is provided with several options for selecting the desired sensitivity, such as "low sensitivity," "medium sensitivity," and "high sensitivity." The range of sensitivity options will be plotted on a pixel response spectrum 602 such as the one illustrated in FIG. 6.

The pixel response spectrum 602 is associated with a certain pixel array 125 (including, for example, a certain brand or type of pixel array), a certain waveband of EMR pulsed by the emitter 102, a certain intensity and/or duration of the pulse of EMR emitted by the emitter 102 and may further be based on a type of surgical scene or predicted distance from the target object. Thus, each EMR source 138 may be associated with a different pixel response spectrum 602 stored in memory. The response spectrum 602 plots the intensity of EMR detected by the pixel array 125 in response to the emitter 102 pulsing a fluorescence or multispectral waveband of EMR. The pixel response spectrum 602 may specifically plot the detected fluorescence relaxation EMR (emitted by a reagent or tissue in response to the emitter 102 pulsing the fluorescence excitation wavelength of EMR) or the detected spectral response (emitted by a tissue in response to the emitter 102 pulsing a multispectral waveband of EMR). The pixel response spectrum 602 ranges from no response (indicating the pixel did not detect EMR) to maximum response (indicating the pixel accumulated the maximum known amount of EMR for the applicable pulse of EMR).

In the example illustrated in FIG. 6, the thresholds are plotted on the pixel response spectrum 602 for determining whether a pixel should be highlighted with a false color overlay. Pixels accumulating an amount of energy within Threshold A may be classified as "no response," indicating that region of the scene is unlikely to include the target object, and thus, that region of the resultant advanced overlay data frame 506 should not include the false color overlay 508. Pixels accumulating an amount of energy within Threshold B may be classified as "weak response," indicating that region of the scene might include the target object but is unlikely to include the target object. Pixels within Threshold B might be included in the false color overlay 508 only if the user selects a "high sensitivity" setting. Pixels accumulating an amount of energy within Threshold C may be classified as "medium response," indicating that region of the scene might include the target object. Pixels within Threshold C might be included in the false color overlay 508 if the user selects a "high sensitivity" or "medium sensitivity" setting. Pixels accumulating an amount of energy within Threshold D may be classified as "strong response," indicating that region of the scene is likely to include the target object. Pixels within Threshold D might be included in the false color overlay 508 with all overlay settings, including "low sensitivity," "medium sensitivity," and "high sensitivity."

As discussed herein, the example threshold response spectrum 600 depicted in FIG. 6 may be associated with a system providing low, medium, and high sensitivity selection options. However, it should be appreciated that the threshold response spectrum 600 may be modified to accommodate any applicable sensitivity selection options as needed.

In most cases, the user is familiar with the patient's anatomy and has a preexisting understanding of where certain veins, arteries, nerves, organs, and the like are likely to be located. In these cases, the user may elect lower sensitivity to simply confirm the user's understanding of where certain tissue types are located within the scene. Thus, the user may primarily rely on the color video stream of the scene while utilizing the false color overlay 508 and as an additional confirmation tool. In other cases, for example, when the user is excising a cancerous tumor, the user may elect higher sensitivity to view all boundaries of potential cancerous tissue. This may assist the user in ensuring that all cancerous tissue has been successfully excised during a procedure.

Figure 7B:
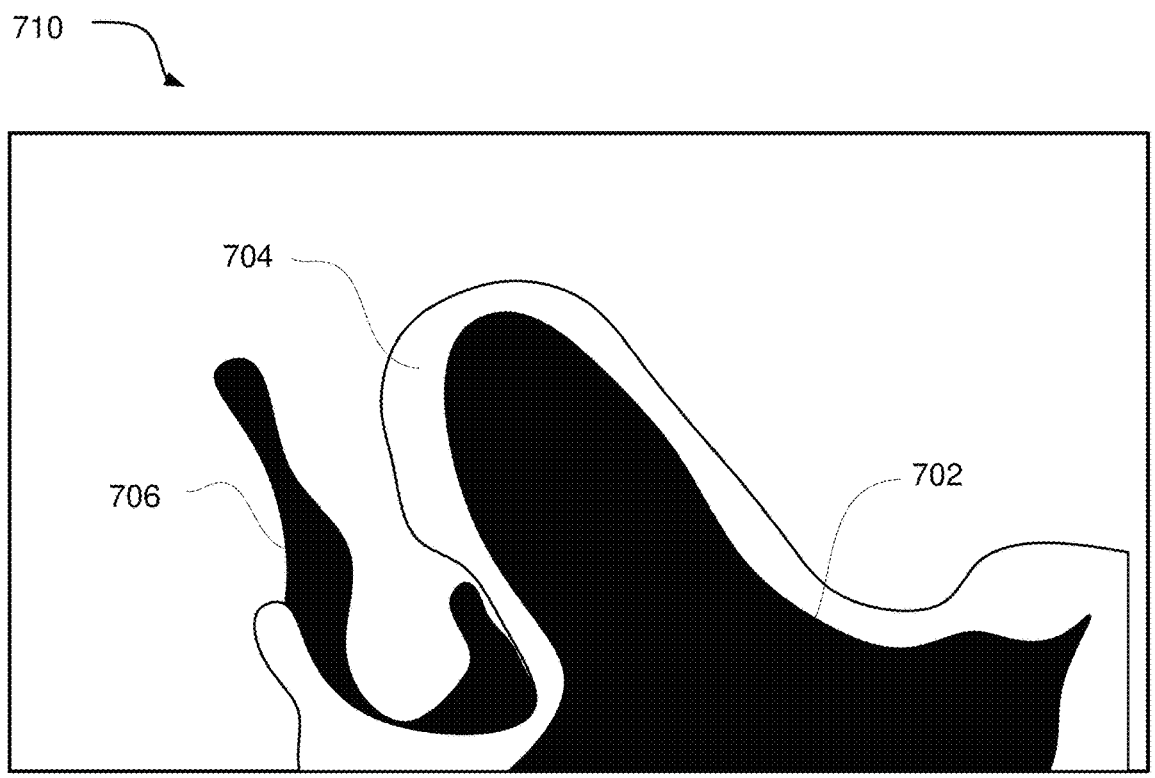

FIGS. 7A and 7B are schematic illustrations of example heatmaps 700, 710 of the same scene with different sensitivity selections 502. The heatmap 700 illustrated in FIG. 7A is depicted at lower sensitivity, while the heatmap 710 illustrated in FIG. 7B is depicted with higher sensitivity. It should be appreciated that the shading utilized in the schematic illustrations depicted herein is illustrative only, and that different colors and saturation levels may be used based on user preference.

The heatmaps 700, 710 each include at least a first false color overlay 702 having a first color, and a second false color overlay 704 having a second color. The second false color overlay 704 is distributed as a boundary around the first false color overlay 702 and represents a region where the spectral processing 346 and/or fluorescence processing 348 algorithm is less certain that region includes the target object selection 504. Each of the first false color overlay 702 and the second false color overlay 704 may be implemented to highlight a single tissue type, such as vein tissue, artery tissue, nervous tissue, cancerous tissue, and the like.

The higher sensitivity heatmap 710 further includes a third false color overlay 706 having a third color. The third false color overlay 706 may highlight an entirely different tissue type than either of the first or second false color overlays 702, 704. In an implementation, the third false color overlay 706 represents a region likely to include a tissue structure that is not visible with standard white light imaging. For example, this overlay may highlight a region likely to include a vein, artery, nervous tissue, or cancerous tissue located behind tissue visible in the color image. This information may be garnered through the fluorescence data frame 209 and/or the multispectral data frame 207. Alternatively, the third false color overlay 706 may represent a region with lesser likelihood it includes the target tissue, when compared with the regions highlighted by the first and second false color overlays 702, 704.

As shown in FIGS. 7A-7B, when fixed thresholds are used, the deep structure highlighted with the third false color overlay 706 is not visible because the detection confidence from the deep learning algorithm (see 346, 348) falls below a set threshold. When the user is given a sensitivity adjustment for the detection displays, the user may choose to exercise a lower threshold such that the deep structure becomes visible. The sensitivity adjustment enables the user to elect the tradeoff between noise and sensitivity based on their personal preferences and the scene being visualized.

The heatmaps 700, 710 are provided in lieu of showing binary detections of critical structures overlayed on color images. The heatmaps 700, 710 are derived from deep learning probability map outputs from the multispectral processing 346 and/or fluorescence processing 348 algorithms. The image signal processor 140 calculates the heatmaps 700, 710 in real-time based on the user's clinical preference and the scene of interest. The image signal processor 140 is programmed to provide preset heatmaps and optimized ranges based on specifical surgical procedures and the user's past preferences. The sensitivity setting and heatmaps are not only for visual functions, but also directly impact perceived algorithm performance. This enables detection of deeper structures not otherwise possible to view with white light.

FIGS. 8A-8C depict schematic illustrations of example heatmaps 800, 810, 820 depicting the same scene with varying sensitivity selections. The heatmap 800 depicted in FIG. 8A is rendered with low sensitivity, the heatmap 810 depicted in FIG. 8B is rendered with medium sensitivity, and the heatmap 820 depicted in FIG. 8C is rendered with high sensitivity. Each of the heatmaps 800, 810, 820 seeks to highlight the same critical tissue type, such as veinous tissue, arterial tissue, nervous tissue, cancerous tissue, and so forth.

Each of the example heatmaps 800, 810, 820 includes a first false color overlay 802 and a second false color overlay 804. As shown, the medium sensitivity heatmap 810 and the high sensitivity heatmap 820 include additional regions highlighted with the first and second false color overlays 802, 804. These regions are less likely to include the target object selection 504 but may still include the target object selection 504 based on the data extracted from the fluorescence data frame 209 and/or the multispectral data frame 207.

FIGS. 9A-9C depict schematic illustrations of example heatmaps 900, 910, 920 depicting the same scene with varying sensitivity selections. The scene illustrated in FIGS. 9A-9C is the same scene illustrated in FIGS. 8A-8C, but with an additional tissue type highlighted with different false color overlays. Like FIGS. 8A-8C, the heatmap 900 depicted in FIG. 9A is rendered with low sensitivity, the heatmap 910 depicted in FIG. 9B is rendered with medium sensitivity, and the heatmap 920 depicted in FIG. 9C is rendered with high sensitivity.

The example heatmaps 900, 910, 920 include the same first and second false color overlays 802, 804 first depicted in FIGS. 8A-8C. The heatmaps 900, 910, 920 additionally include a third false color overlay 902 and a fourth false color overlay 904 depicted with different colors than either of the first or second false color overlays 802, 804. The third and fourth false color overlays 902, 904 may be rendered to highlight a different target tissue type. For example, the first and second false color overlays 802, 804 may highlight arterial tissue while the third and fourth false color overlays 902, 904 highlight venous tissue.

In the example illustrated in FIGS. 9A-9C, the scene is adjusted with a global sensitivity tuning capability that adjusts the sensitivity for all target objects within the scene simultaneously. However, this is not the case in all implementations, and the system 100 enables the user to adjust the sensitivity setting for different target objects on a case-by-case basis. Thus, the heatmaps illustrated in FIGS. 8A-8C and 9A-9C may be optimized such that the first tissue type (highlighted with the first and second false color overlays 802, 804) may be highlighted with a different sensitivity rating than the second tissue type (highlighted with the third and fourth false color overlays 902, 904). For example, the first tissue type may be highlighted with low sensitivity, such as in the heatmap 800. This may be combined with the second tissue type being highlighted with medium or high sensitivity, such as in the heatmaps 910, 920. The user may select any number of tissue types to be highlighted with different false color overlays, and each tissue type may be highlighted with a different sensitivity selection.

The heatmaps described herein are derived from deep learning probability map outputs by the spectral processing 346 algorithm or the fluorescence processing 348 algorithm. The deep learning algorithms typically output a softmax probability output for each pixel in the scene as belonging to one of the target object classes. Typically, in practice, the target object class having the highest probability or a probability level above a fixed threshold will be selected as the detected target structure and overlayed on the user's monitor. In traditional systems, these overlays are binary (i.e., a pixel is classified as a target object or not), which results in overlay performance optimized over a large number of datasets on average, but results in suboptimal individual results that are not tailored to the user's preferences. The heatmaps described herein resolve many of the issues with traditional systems by providing a customizable rendering to the user based on the user's preferences.

FIG. 10 is a series of images depicting example advanced overlay data frames. The schematic illustrations depicted in FIGS. 8A-8C correspond with the artery images of FIG. 10. Similarly, the schematic illustrations depicted in FIGS. 9A-9C correspond with the artery and vein images of FIG. 10. Each of the images of FIG. 10 depict the same scene with different false color overlays. Specifically, FIG. 10 depicts a scene comprising an artery highlighted with a false color overlay according to low sensitivity, medium sensitivity, and high sensitivity settings. FIG. 10 further depicts wherein the same scene is depicted with a false color overlay on each of the artery and the vein, with low sensitivity, medium sensitivity, and high sensitivity.

FIG. 11 is a series of images depicting example advanced overlay data frames. Specifically, FIG. 11 depicts the same scene depicted in FIG. 10, but with different sensitivity settings on the artery and the vein.

FIG. 12 is a schematic block diagram of an example process flow 1200 for rendering an advanced overlay data frame 506 with an adaptive persistence display 1218. The adaptive persistence display 1228 does not require manual hyperparameter determination. The image signal processor 140 leverages an inertial measurement unit (IMU) on the camera (see, e.g., the optical visualization system 106) and the temporal gradient of the resultant images to estimate the amount of movement and stabilize the false color overlay on the resultant images.

The systems described herein aim to detect critical structures such as arteries, veins, nerves, ureters, bile ducts, cancerous tissue, tissue perfusion, and so forth using multispectral or fluorescence visualization techniques. The dynamic nature of surgery and surgical scenes will result in unpredictable changes in lighting conditions and optical reflection properties. Under these conditions, deep learning algorithms such as the spectral processing algorithm 346 and the fluorescence processing algorithm 348 will struggle to identify the critical tissue structures on an individual pixel level, even when overall detections are successful. Oftentimes, there will be a small group of pixels where detections will be on and off across individual data frames. This potentially causes an unpleasant experience for the user.

The process flow 1200 is implemented to generate an adaptive overlay stabilization for enhanced visualization of critical structures within a scene. The process flow 1200 illustrated in FIG. 12 works in connection with the process flow 500 discussed in connection with FIG. 5. The adaptive persistence display 1218 is rendered to stabilize the false color overlay 508 of the advanced overlay data frame 506.

The image stabilization 1220 techniques may be necessary due to one or more of noise 1202, light fluctuations 1204, and/or algorithmic uncertainties 1206. Additionally, the image stabilization 1220 algorithms may be implemented to compensate for movement of the image sensor 124 when the system 100 is in use. These imperfections may cause the false color overlays 508 to appear fluid and may blur the lines of the false color overlays 508 such that their effectiveness is reduced. In some cases, the false color overlays 508 may flicker in and out because the spectral processing 346 and/or fluorescence processing 348 algorithms inconsistently classify a certain pixel over time as comprising the target object. Temporal persistent methods may be deployed to stabilize the display of the false color overlays 508 by post-processing the spectral processing 346 outputs and/or the fluorescence processing 348 outputs in real-time. Any image stabilization techniques may be used, including the ones explicitly described herein and other image stabilization techniques not mentioned herein.

The image signal processor 140 may execute any suitable image stabilization 1220 algorithms known in the art for stabilizing the false color overlay 508 within the advanced overlay data frame 506. Example image stabilization 1220 algorithms include temporal persistence 1208 algorithms, hysteresis-based tracking 1210 algorithms, Kalman filter-based tracking 1212 algorithms, particle filter tracking 1214 algorithms, and SLAM tracking 1216 algorithms.

The image stabilization 1220 techniques may include temporal persistence 1208 modeling. Temporal persistence 1208 is a solution to an object search problem for domains in which object permanence cannot be assumed. In this case, object search may be formalized as a failure analysis problem and contribute temporal persistence modeling (TPM), an algorithm for probabilistic prediction of the time that an object is expected to remain at a given location given sparse prior observations. The temporal persistence 1208 modeling algorithm is implemented to track the continued location of the target object, which will be highlighted with the advanced color overlay 508. If the location of the target object is inconsistent from frame to frame (e.g., due to the spectral processing 346 or fluorescence processing 348 algorithms inconsistently classifying a pixel as comprising the target object), then the image stabilization 1220 techniques such as temporal persistence 1208 may be used to "smooth" the false color overlay 508 over time.

In some implementations, hysteresis-based tracking algorithms 1210 are implemented to post-process the outputs from the spectral processing 346 and/or fluorescence processing 348 algorithms. This post processing is implemented to track movement within the scene based on the movement of object edges. Edge tracking by hysteresis is primarily reliant on strong edge pixels, which are deemed true edges within the image. However, there will be some debate on weak edge pixels, and whether those pixels could form a true edge, or be considered a noise/color variation. Weak edge pixels are dropped from consideration if they are deemed noise/color variation. The hysteresis tracking 1210 algorithm leverages the concept that weak edge pixels from true edges will typically be connected to strong edge pixels, while noise responses are unconnected. To track the edge connection, blob analysis is applied by looking at a weak edge pixel and its eight connected neighborhood pixels. If there is one strong edge pixel involved in the blob, then the weak edge point may be identified as on that should be preserved. These weak edge pixels become strong edges that can then cause their neighboring weak edge pixels to be preserved.

In some cases, the hysteresis tracking algorithm 1210 may be implemented as a component of a Canny edge detector algorithm. Canny edge detection is a technique to extract useful structural information from different vision objects and reduce the amount of data to be processed. Canny edge detection includes applying a Gaussian filter to smooth the image and remove noise, locating intensity gradients within the image, applying gradient magnitude thresholding to remove spurious response to edge detection, applying double threshold to determine potential edges, and then tracking edges by hysteresis.

The hysteresis-based tracking algorithm 1210 includes a persistence algorithm component. In an implementation, a rolling window of data frames is averaged over time, and the quantity of averaged data frames may be optimized depending on how fast the scene is moving. For example, if the scene is relatively stable, then the past 20 data frames may be averaged over time to reduce noise and jitter. If the camera begins moving, then the algorithm will weigh heavily towards more recent frames and begin ignoring past frames. This process may include point matching and optical flow models.

In some implementations, Kalman filter-based tracking algorithms 1212 are implemented to post-process the outputs from the spectral processing 346 and/or fluorescence processing 348 algorithms. Kalman filtering (also known as linear quadratic estimation) is an algorithm that uses a series of measurements observed over time, including statistical noise and other inaccuracies, and produces estimates of unknown variables that tend to be more accurate than those based on a single measurement alone. The Kalman filter has numerous uses, including applications in control and computer vision. The Kalman filter may be leveraged to track objects and predict the object's future location, reduce noise introduced by inaccurate detection, and facilitate the process of associating multiple objects to their respective movement tracks. For statistics and control theory, Kalman filtering (also known as linear quadratic estimation) is an algorithm that uses a series of measurements observed over time, including statistical noise and other inaccuracies, and produces estimates of unknown variables that tend to be more accurate than those based on a single measurement alone.

In some implementations, particle filter-based tracking algorithms 1214 are implemented to post-process the outputs from the spectral processing 346 and/or fluorescence processing 348 algorithms. Particle filtering may be implemented to track objects in video sequences. Particle filtering may be selected because it is robust for non-linear and non-Gaussian dynamic state estimation problems and performs well when clutter and occlusions are present in the video stream.

The "filtering" problem includes the process of estimating a system's current state which is hidden, based on past and current observations. This is represented by the probability density function. In the case of visual tracking as discussed in connection with FIG. 12, the state can be position, velocity, orientation, or scale of an object, and the observation can be the color histogram, edge orientation histogram, or contours of the image data. In general, the object tracking problem can be modeled by the state-space representation.

Particle filtering may be implemented using a constant-velocity Kalman filter model to estimate intentional camera movement. When designing the particle filter, an importance density is selected, and this may be accomplished by using feature tracking to determine the means of a Gaussian density function. Particle filtering may be implemented to estimate desired motion and compensate for unwanted motion caused by camera vibration. This is implemented by executing a Kalman filter-based estimation algorithm and then using the resultant intentional motion vector to compensate for unwanted motion.

In some implementations, SLAM (simultaneous localization and mapping) based tracking algorithms 1216 are implemented to post-process the outputs from the spectral processing 346 and/or fluorescence processing 348 algorithms.

The image signal processor 140 utilizes the IMU x, y, z acceleration values and/or the difference between two or more sequential images to automatically adjust one or more of the hysteresis or memory of the persistent algorithm. For example, if the optical visualization system 106 is determined to be moving slowly, more images will be averaged from the past to improve robustness of the detection. If the optical visualization system 106 is moving quickly, only the last few images will be applied to the persistence logic.

The image signal processor 140 automatically estimates camera movement to enable adaptive persistence displays that do not require manual hyperparameter determination. The image signal processor 140 leverages an IMU on the camera and the temporal gradient of the images over time to estimate the amount of movement. Depending on the movement estimate, the persistence forget factor may be adjusted, e.g., the faster the camera moves, the greater the forgetting factor.

FIGS. 13A and 13B are example advanced overlay image frames of a surgical scene, wherein a false color overlay is rendered over a color image frame of a scene. FIG. 13B represents a stabilized version of FIG. 13A, wherein the image signal processor 140 executed one or more stabilization algorithms such as those described in connection with FIG. 12. The overlay image frames include a color image frame 1304 with a false color overlay 1302 displayed over the color image frame 1304. The false color overlay 1302 highlights a tissue structure depicted within the image frame 1304.

FIG. 14 illustrates a portion of the electromagnetic spectrum 1400 divided into twenty different wavebands. The number of wavebands is illustrative only. In at least one embodiment, the spectrum 1400 may be divided into hundreds of wavebands. The spectrum 1400 may extend from the infrared spectrum 1402, through the visible spectrum 1404, and into the ultraviolet spectrum 1406. Each waveband may be defined by an upper wavelength and a lower wavelength.

Multispectral imaging incudes imaging information from across the electromagnetic spectrum 1400. A multispectral pulse of EMR may include a plurality of sub-pulses spanning one or more portions of the electromagnetic spectrum 1400 or the entirety of the electromagnetic spectrum 1400. A multispectral pulse of EMR may include a single partition of wavelengths of EMR. A resulting multispectral data frame includes information sensed by the pixel array subsequent to a multispectral pulse of EMR. Therefore, a multispectral data frame may include data for any suitable partition of the electromagnetic spectrum 1400 and may include multiple data frames for multiple partitions of the electromagnetic spectrum 1400.

The emitter 102 may include any number of multispectral EMR sources as needed depending on the implementation. In one embodiment, each multispectral EMR source covers a spectrum covering 40 nanometers. For example, one multispectral EMR source may emit EMR within a waveband from 500 nm to 540 nm while another multispectral EMR source may emit EMR within a waveband from 540 nm to 580 nm. In another embodiment, multispectral EMR sources may cover other sizes of wavebands, depending on the types of EMR sources available or the imaging needs. Each multispectral EMR source may cover a different slice of the electromagnetic spectrum 1400 ranging from far infrared, mid infrared, near infrared, visible light, near ultraviolet and/or extreme ultraviolet. In some cases, a plurality of multispectral EMR sources of the same type or wavelength may be included to provide sufficient output power for imaging. The number of multispectral EMR sources needed for a specific waveband may depend on the sensitivity of a pixel array 125 to the waveband and/or the power output capability of EMR sources in that waveband.

The waveband widths and coverage provided by the EMR sources may be selected to provide any desired combination of spectrums. For example, contiguous coverage of a spectrum 1400 using small waveband widths (e.g., 10 nm or less) may allow for highly selective multispectral and/or fluorescence imaging. The waveband widths allow for selectively emitting the excitation wavelength(s) for one or more particular fluorescent reagents. Additionally, the waveband widths may allow for selectively emitting certain partitions of multispectral EMR for identifying specific structures, chemical processes, tissues, biological processes, and so forth. Because the wavelengths come from EMR sources which can be selectively activated, extreme flexibility for fluorescing one or more specific fluorescent reagents during an examination can be achieved. Additionally, extreme flexibility for identifying one or more objects or processes by way of multispectral imaging can be achieved. Thus, much more fluorescence and/or multispectral information may be achieved in less time and within a single examination which would have required multiple examinations, delays because of the administration of dyes or stains, or the like.

FIG. 15 is a schematic diagram illustrating a timing diagram 1500 for emission and readout for generating an image. The solid line represents readout (peaks 1502) and blanking periods (valleys) for capturing a series of data frames 1504-1514. The series of data frames 1504-1514 may include a repeating series of data frames which may be used for generating mapping, multispectral, and/or fluorescence data that may be overlaid on an RGB video stream. The series of data frames include a first data frame 1504, a second data frame 1506, a third data frame 1508, a fourth data frame 1510, a fifth data frame 1512, and an Nth data frame 1526.

In one embodiment, each data frame is generated based on at least one pulse of EMR. The pulse of EMR is reflected and detected by the pixel array 125 and then read out in a subsequent readout (1502). Thus, each blanking period and readout results in a data frame for a specific waveband of EMR. For example, the first data frame 1504 may be generated based on a waveband of a first one or more pulses 1516, a second data frame 1506 may be generated based on a waveband of a second one or more pulses 1518, a third data frame 1508 may be generated based on a waveband of a third one or more pulses 1600, a fourth data frame 1510 may be generated based on a waveband of a fourth one or more pulses 1602, a fifth data frame 1512 may be generated based on a waveband of a fifth one or more pulses 1524, and an Nth data frame 1526 may be generated based on a waveband of an Nth one or more pulses 1526.

The pulses 1516-1526 may include energy from a single EMR source or from a combination of two or more EMR sources. For example, the waveband included in a single readout period or within the plurality of data frames 1504-1514 may be selected for a desired examination or detection of a specific tissue or condition. According to one embodiment, one or more pulses may include visible spectrum light for generating an RGB or black and white image while one or more additional pulses are emitted to sense a spectral response to a multispectral wavelength of EMR.

The pulses 1516-1526 are emitted according to a variable pulse cycle determined by the controller 104. For example, pulse 1516 may include a white light, pulse 1518 may include a multispectral waveband, pulse 1600 may include a white light, pulse 1602 may include a fluorescence waveband, pulse 1524 may include white light, and so forth.

The plurality of frames 1504-1514 are shown having varying lengths in readout periods and pulses having different lengths or intensities. The blanking period, pulse length or intensity, or the like may be selected based on the sensitivity of a monochromatic sensor to the specific wavelength, the power output capability of the EMR source(s), and/or the carrying capacity of the waveguide.

In one embodiment, dual image sensors may be used to obtain three-dimensional images or video feeds. A three-dimensional examination may allow for improved understanding of a three-dimensional structure of the examined region as well as a mapping of the different tissue or material types within the region.

In an example implementation, a patient is imaged with an endoscopic imaging system to identify quantitative diagnostic information about the patient's tissue pathology. In the example, the patient is suspected or known to suffer from a disease that can be tracked with multispectral imaging to observe the progression of the disease in the patient's tissue. The endoscopic imaging system pulses white light to generate an RGB video stream of the interior of the patient's body. Additionally, the endoscopic imaging system pulses one or more multispectral wavebands of light that permit the system to "see through" some tissues and generate imaging of the tissue affected by the disease. The endoscopic imaging system senses the reflected multispectral EMR to generate multispectral imaging data of the diseased tissue, and thereby identifies the location of the diseased tissue within the patient's body. The endoscopic imaging system may further emit a mapping pulsing scheme for generating a three-dimensional topographical map of the scene and calculating dimensions of objects within the scene. The location of the diseased tissue (as identified by the multispectral imaging data) may be combined with the topographical map and dimensions information that is calculated with the mapping data. Therefore, the precise location, size, dimensions, and topology of the diseased tissue can be identified. This information may be provided to a medical practitioner to aid in excising, imaging, or studying the diseased tissue. Additionally, this information may be provided to a robotic surgical system to enable the surgical system to excise the diseased tissue.

FIGS. 16A and 16B illustrate schematic diagrams of a system 1600 for emitting EMR in a mapping pattern 210. The emitter 102 may pulse the mapping pattern 210 using a low mode laser light that is diffracted to generate the applicable mapping pattern 210. The mapping pattern 210 reflects off tissue in a way that depends on the wavelength of the EMR and the specific anatomical features of the tissue.

The example mapping pattern 210 illustrated in FIG. 16A is a grid array comprising vertical hashing 1602 and horizontal hashing 1604. The example mapping pattern 210 illustrated in FIG. 16B is a dot array. The mapping pattern 210 may include any suitable array for mapping a surface, including, for example, a raster grid of discrete points, an occupancy grid map, a dot array, vertical hashing, horizontal hashing, and so forth. The mapping pattern 210 is emitted by an illumination source 1608, which may originate with an EMR source within the emitter 102 and terminate with an endoscope 110 or tool 108.

As discussed in connection with FIGS. 1A-1C, the distal end of an endoscope 110 may include one or more waveguides 130 that emit EMR that originated at the emitter 102. The mapping pattern 210 may be emitted from these waveguides 130 and projected on to a surface of a tissue. Additionally, one or more tools 108 within a scene may include a waveguide 131 that terminates at a distal end of the tool 108 and/or a side of the tool 108 as shown in FIG. 1A. This waveguide 131 may also emit the mapping pattern 210 on to a surface of a tissue within a scene. In some cases, the tool 108 and the endoscope 110 emit the mapping pattern 210 in concert, and the resultant data frames captured by the image sensor 124 comprise data for tracking the location of the tool 108 within the scene relative to the endoscope 110 or other tools 108.

The emitter 102 may pulse the mapping pattern 210 at any suitable wavelength of EMR, including, for example, ultraviolet light, visible, light, and/or infrared or near infrared light. The surface and/or objects within the environment may be mapped and tracked at very high resolution and with very high accuracy and precision.

The mapping pattern 210 is selected for the desired anatomical measurement scheme, such as three-dimensional topographical mapping, measuring distances and dimensions within a scene, tracking a relative position of a tool 108 within a scene, and so forth. The image sensor 124 detects reflected EMR and outputs a mapping data frame 211 in response to the emitter 102 pulsing the mapping pattern 210. The resultant mapping data frame 211 is provided to a topographical processing 350 algorithm that is trained to calculate one or more of a three-dimensional topographical map of a scene, a distance between two or more objects within the scene, a dimension of an object within the scene, a relative distance between a tool and another object within the scene, and so forth.

The emitter 102 may pulse the mapping pattern 210 at a sufficient speed such that the mapping pattern 210 is not visible to a user. In various implementations, it may be distracting to a user to see the mapping pattern 210 during an endoscopic visualization procedure. In some cases, a rendering of the mapping pattern 210 may be overlaid on a color video stream to provide further context to a user visualizing the scene. The user may further request to view real-time measurements of objects within the scene and real-time proximity alerts when a tool approaches a critical structure such as a blood vessel, nerve fiber, cancer tissue, and so forth. The accuracy of the measurements may be accurate to less than one millimeter.

FIG. 17 illustrates a schematic block diagram of an example computing device 1800. The computing device 1800 may be used to perform various procedures, such as those discussed herein. The computing device 1800 can perform various monitoring functions as discussed herein, and can execute one or more application programs, such as the application programs or functionality described herein. The computing device 1800 can be any of a wide variety of computing devices, such as a desktop computer, in-dash computer, vehicle control system, a notebook computer, a server computer, a handheld computer, tablet computer and the like.

The computing device 1800 includes one or more processor(s) 1804, one or more memory device(s) 1804, one or more interface(s) 1706, one or more mass storage device(s) 1708, one or more Input/output (I/O) device(s) 1810, and a display device 1730 all of which are coupled to a bus 1712. Processor(s) 1804 include one or more processors or controllers that execute instructions stored in memory device(s) 1804 and/or mass storage device(s) 1708. Processor(s) 1804 may also include several types of computer-readable media, such as cache memory.

Memory device(s) 1804 include various computer-readable media, such as volatile memory (e.g., random access memory (RAM) 1714) and/or nonvolatile memory (e.g., read-only memory (ROM) 1716). Memory device(s) 1804 may also include rewritable ROM, such as Flash memory.

Mass storage device(s) 1708 include various computer readable media, such as magnetic tapes, magnetic disks, optical disks, solid-state memory (e.g., Flash memory), and so forth. As shown in FIG. 17, a particular mass storage device 1708 is a hard disk drive 1724. Various drives may also be included in mass storage device(s) 1708 to enable reading from and/or writing to the various computer readable media. Mass storage device(s) 1708 include removable media 1726 and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, and the like.

Display device 1730 includes any type of device capable of displaying information to one or more users of computing device 1800. Examples of display device 1730 include a monitor, display terminal, video projection device, and the like.

Interface(s) 1706 include various interfaces that allow computing device 1800 to interact with other systems, devices, or computing environments. Example interface(s) 1706 may include any number of different network interfaces 1820, such as interfaces to local area networks (LANs), wide area networks (WANs), wireless networks, and the Internet. Other interface(s) include user interface 1718 and peripheral device interface 1722. The interface(s) 1706 may also include one or more user interface elements 1718. The interface(s) 1706 may also include one or more peripheral interfaces such as interfaces for printers, pointing devices (mice, track pad, or any suitable user interface now known to those of ordinary skill in the field, or later discovered), keyboards, and the like.

Bus 1712 allows processor(s) 1804, memory device(s) 1804, interface(s) 1706, mass storage device(s) 1708, and I/O device(s) 1810 to communicate with one another, as well as other devices or components coupled to bus 1712. Bus 1712 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1800 and are executed by processor(s) 1802. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a system. The system includes an emitter comprising a plurality of electromagnetic sources. The system includes an image sensor comprising a pixel array that detects electromagnetic radiation and reads out a plurality of data frames. The system includes an image signal processor that receives the plurality of data frames read out by the image sensor, wherein the plurality of data frames comprises a color data frame and an advanced data frame. The image signal processor generates an advanced overlay data frame comprising the color data frame and a false color overlay generated based on the advanced data frame. The image signal processor adjusts a sensitivity of the advanced overlay data frame in real-time based on user input.

Example 2 is a system as in Example 1, wherein the advanced data frame comprises one or more of: a fluorescence data frame detected in response to the emitter emitting a fluorescence excitation wavelength of electromagnetic radiation selected to fluoresce one or more of a tissue or a reagent; or a multispectral data frame detected in response to the emitter emitting a multispectral wavelength of electromagnetic radiation selected to elicit a spectral response from a tissue and/or penetrate through a tissue.

Example 3 is a system as in any of Examples 1-2, wherein the image signal processor communicates with a deep learning algorithm configured to identify a target object within a scene based on the advanced data frame.

Example 4 is a system as in any of Examples 1-3, wherein the image signal processor generates the advanced overlay data frame based on an output from the deep learning algorithm, and wherein the false color overlay comprises a heatmap that comprises: a first false color overlay highlighting a region having a high likelihood of comprising the target object; and a second false color overlay highlighting a region having a lesser likelihood of comprising the target object relative to the region highlighted by the first false color overlay; wherein the first false color overlay comprises a different color than the second false color overlay.

Example 5 is a system as in any of Examples 1-4, wherein the advanced overlay data frame comprises: a first false color overlay highlighting a first target object; and a second false color overlay highlighting a second target object, wherein the first target object is different than the second target object.

Example 6 is a system as in any of Examples 1-5, wherein one or more of the first target object or the second target object comprises an arterial tissue, a venous tissue, a nervous tissue, a cancerous tissue, or a ureter tissue.

Example 7 is a system as in any of Examples 1-6, wherein each of the first false color overlay and the second false color overlay comprises a heatmap indicating a likelihood that a region comprises the first target object or the second target object; and wherein the heatmap for each of the first false color overlay and the second false color overlay comprises a plurality of colors for representing varying likelihoods of comprising the first target object or the second target object.

Example 8 is a system as in any of Examples 1-7, wherein the sensitivity represents one or more threshold ranges indicating whether a pixel of the advanced overlay data frame should be highlighted with the false color overlay to indicate a presence of a target object.

Example 9 is a system as in any of Examples 1-8, wherein the one or more threshold ranges comprises one or more of: a first threshold range, wherein pixel values within the first threshold range indicate the corresponding pixel has no likelihood of comprising the target object; a second threshold range, wherein pixel values within the second threshold range indicate the corresponding pixel has a low likelihood of comprising the target object; a third threshold range, wherein pixel values within the third threshold range indicate the corresponding pixel has a medium likelihood of comprising the target object; and a fourth threshold range, wherein pixel values within the fourth threshold range indicate the corresponding pixel has a high likelihood of comprising the target object.

Example 10 is a system as in any of Examples 1-9, wherein the user input comprises a sensitivity selection, and wherein the sensitivity selection comprises one or more of: a low sensitivity selection indicating that pixels only within the fourth threshold range should be highlighted with the false color overlay; a medium sensitivity selection indicating that pixels within each of the fourth threshold range and the third threshold range should be highlighted with the false color overlay; or a high sensitivity selection indicating that pixels within each of the fourth threshold range, the third threshold range, and the second threshold range should be highlighted with the false color overlay.

Example 11 is a system as in any of Examples 1-10, wherein the image signal processor renders a video stream comprising a plurality of advanced overlay data frames, and wherein the image signal processor executes an adaptive persistence algorithm to stabilize movement of the false color overlay.

Example 12 is a system as in any of Examples 1-11, wherein the image signal processor stabilizes the movement of the false color overlay to compensate for movement of the image sensor.

Example 13 is a system as in any of Examples 1-12, wherein the adaptive persistence algorithm comprises applying persistence on movement detections within the advanced data frame to stabilize the movement of the false color overlay across the plurality of advanced overlay data frames.

Example 14 is a system as in any of Examples 1-13, wherein applying the persistence on the movement detections comprises executing one or more of: a hysteresis-based tracking algorithm; a Kalman filter-based tracking algorithm; a particle filter-based tracking algorithm; or a SLAM (simultaneous localization and mapping) based tracking algorithm.

Example 15 is a system as in any of Examples 1-14, further comprising an inertial measurement unit (IMU) associated with the image sensor, wherein the IMU measures movement of the image sensor in real-time; and wherein the image signal processor further receives sensor data from the IMU; and wherein the adaptive persistence algorithm comprises stabilizing movement of the false color overlay at least based on the sensor data from the IMU.

Example 16 is a system as in any of Examples 1-15, wherein the image signal processor is further configured to automatically adjust one or more of a hysteresis or a memory of the adaptive persistence algorithm in real-time.

Example 17 is a system as in any of Examples 1-16, wherein the image signal processor adjusts the one or more of the hysteresis or the memory of the adaptive persistence algorithm in real-time based on one or more of: a velocity of movement of the image sensor determined based on the sensor data from the IMU; or a velocity of movement of the image sensor determined based on motion tracking of objects within sequential data frames output by the image sensor.

Example 18 is a system as in any of Examples 1-17, further comprising a controller in communication with each of the emitter, the image sensor, and the image signal processor, wherein the controller is configured to: instruct the emitter to cycle the plurality of electromagnetic sources on and off according to a pulse cycle; and instruct the image sensor to accumulate electromagnetic radiation and read out the pixel array according to a sensor cycle; wherein the pulse cycle is synchronized with the sensor cycle.

Example 19 is a system as in any of Examples 1-18, wherein the plurality of electromagnetic sources of the emitter comprises: a white light source; a plurality of excitation sources configured to emit electromagnetic radiation within a waveband selected for fluorescing a tissue or reagent; and a plurality of multispectral sources configured to emit electromagnetic radiation within a waveband selected for eliciting a spectral response from a tissue.

Example 20 is a system as in any of Examples 1-19, wherein the plurality of excitation sources is tuned to emit electromagnetic radiation within a narrow waveband of 20 nm or less; wherein the plurality of multispectral sources is tuned to emit electromagnetic radiation within a narrow waveband of 20 nm or less; and wherein the plurality of excitation sources is tuned to emit electromagnetic radiation within a near infrared range of the electromagnetic spectrum.

Example 21 is a system. The system includes an image sensor comprising a pixel array that detects electromagnetic radiation and reads out a plurality of data frames. The system includes an image sensor processor that receives the plurality of data frames read out by the image sensor, wherein the plurality of data frames comprises a plurality of color data frames and a plurality of advanced data frames. The image signal processor renders a video stream comprising a plurality of advanced overlay data frames, wherein each of the plurality of advanced overlay data frames comprises a color data frame and a false color overlay generated based on an advanced data frame. The image signal processor executes an adaptive persistence algorithm to stabilize movement of the false color overlay across the plurality of advanced overlay data frames.

Example 22 is a system as in Example 21, wherein the image signal processor stabilizes the movement of the false color overlay to compensate for movement of the image sensor.

Example 23 is a system as in any of Examples 21-22, wherein the adaptive persistence algorithm comprises applying persistence on movement detections within the plurality of advanced overlay data frames to stabilize the movement of the false color overlay across the plurality of advanced overlay data frames.

Example 24 is a system as in any of Examples 21-23, wherein applying the persistence on the movement detections comprises executing one or more of: a hysteresis-based tracking algorithm; a Kalman filter-based tracking algorithm; a particle filter-based tracking algorithm; or a SLAM (simultaneous localization and mapping) based tracking algorithm.

Example 25 is a system as in any of Examples 21-24, further comprising an inertial measurement unit (IMU) associated with the image sensor, wherein the IMU measures movement of the image sensor in real-time; and wherein the image signal processor further receives sensor data from the IMU; and wherein the adaptive persistence algorithm comprises stabilizing the movement of the false color overlay at least based on the sensor data from the IMU.

Example 26 is a system as in any of Examples 21-25, wherein the image signal processor is further configured to automatically adjust one or more of a hysteresis or a memory of the adaptive persistence algorithm in real-time.

Example 27 is a system as in any of Examples 21-26, wherein the image signal processor adjusts the one or more of the hysteresis or the memory of the adaptive persistence algorithm in real-time based at least on a velocity of movement of the image sensor determined based on the sensor data from the IMU.

Example 28 is a system as in any of Examples 21-27, wherein the image signal processor adjusts the one or more of the hysteresis or the memory of the adaptive persistence algorithm in real-time based at least on a velocity of movement of the image sensor determined based on motion tracking of objects within sequential data frames output by the image sensor.

Example 29 is a system as in any of Examples 21-28, wherein the image sensor comprises two image sensors that simultaneously output a plurality of stereo pairs of data frames.

Example 30 is a system as in any of Examples 21-29, further comprising a controller that provides the plurality of stereo pairs of data frames to an algorithm configured to generate a plurality of disparity maps, wherein each of the plurality of disparity maps is calculated based on a stereo pair of data frames.

Example 31 is a system as in any of Examples 21-30, wherein the controller is further configured to provide relative positions of the two image sensors and the plurality of disparity maps to an algorithm configured to calculate a three-dimensional topographical map of a scene using triangulation.

Example 32 is a system as in any of Examples 21-31, further comprising an emitter comprising a plurality of electromagnetic sources comprising a white light source and further comprising one or more of: a plurality of excitation sources configured to emit electromagnetic radiation within a waveband selected for fluorescing a tissue or reagent; or a plurality of multispectral sources configured to emit electromagnetic radiation within a waveband selected for eliciting a spectral response from a tissue.

Example 33 is a system as in any of Examples 21-32, wherein the plurality of excitation sources is tuned to emit electromagnetic radiation within a narrow waveband of 20 nm or less; and wherein the plurality of multispectral sources is tuned to emit electromagnetic radiation within a narrow waveband of 20 nm or less.

Example 34 is a system as in any of Examples 21-33, wherein each of the plurality of advanced data frames comprises one or more of: a fluorescence data frame detected in response to an emitter emitting a fluorescence excitation wavelength of electromagnetic radiation selected to fluoresce one or more of a tissue or a reagent; or a multispectral data frame detected in response to the emitter emitting a multispectral wavelength of electromagnetic radiation selected to elicit a spectral response from a tissue and/or penetrate through a tissue.

Example 35 is a system as in any of Examples 21-34, wherein the image signal processor communicates with a deep learning algorithm configured to identify a target object within a scene based on one or more of the plurality of advanced data frames.

Example 36 is a system as in any of Examples 21-35, wherein the false color overlay highlights the target object within the scene, and wherein the target object comprises one or more of an arterial tissue, a venous tissue, a nervous tissue, a cancerous tissue, a tissue perfusion, or a ureter tissue.

Example 37 is a system as in any of Examples 21-36, wherein the false color overlay is rendered as a heatmap indicating a likelihood that a region comprises the target object.

Example 38 is a system as in any of Examples 21-37, wherein executing the adaptive persistence algorithm to stabilize movement of the false color overlay comprises: averaging a rolling window of the plurality of advanced data frames over time, wherein a quantity of data frames within the rolling window is determined at least in part on movement of the image sensor; and rendering the false color overlay based on the averaged advanced data frames to compensate for one or more of noise, light fluctuations, or algorithm uncertainties.

Example 39 is a system as in any of Examples 21-38, wherein executing the adaptive persistence algorithm to stabilize movement of the false color overlay comprises: identifying one or more pixels across a portion of the plurality of advanced data frames that is inconsistently identified as comprising the target object by the deep learning algorithm; averaging readings for each of the one or more pixels across the portion of the plurality of advanced data frames; and stabilizing the false color overlay across a corresponding portion of the advanced overlay data frames based on the averaged readings for each of the one or more pixels.

Example 40 is a system as in any of Examples 21-39, further comprising an inertial measurement unit (IMU) associated with the image sensor, wherein the IMU measures movement of the image sensor in real-time; and wherein stabilizing the movement of the false color overlay across the plurality of advanced overlay data frames comprises using x, y, z acceleration values retrieved from the IMU to automatically adjust one or more of a hysteresis or a memory of the adaptive persistence algorithm.

Example 41 is a system as in any of Examples 21-40, wherein stabilizing the movement further comprises stabilizing based on a temporal gradient of the plurality of data frames over time.

Example 42 is a system as in any of Examples 21-41, further comprising calculating an estimated movement of the image sensor based on differences two or more sequential data frames of the plurality of data frames.

Example 43 is a system as in any of Examples 21-42, wherein stabilizing the movement of the false color overlay across the plurality of advanced overlay data frames comprises utilizing the estimated movement of the image sensor to automatically adjust one or more of a hysteresis or a memory of the adaptive persistence algorithm.

Example 44 is a system as in any of Examples 21-43, wherein the image signal processor automatically adjusts a forgetting factor for the adaptive persistence algorithm based on a velocity of movement of the image sensor.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
    an image sensor comprising a pixel array that detects electromagnetic radiation and reads out a plurality of data frames; and
    an image sensor processor that receives the plurality of data frames read out by the image sensor, wherein the plurality of data frames comprises a plurality of color data frames and a plurality of advanced data frames;
    wherein the image signal processor renders a video stream comprising a plurality of advanced overlay data frames, wherein each of the plurality of advanced overlay data frames comprises a color data frame and a false color overlay generated based on an advanced data frame; and
    wherein the image signal processor executes an adaptive persistence algorithm to stabilize movement of the false color overlay across the plurality of advanced overlay data frames.

2. The system of claim 1, wherein the image signal processor stabilizes the movement of the false color overlay to compensate for one or more of movement of the image sensor, noise within the plurality of data frames, fluctuations in light across the plurality of data frames, or algorithm uncertainties in generating the false color overlay.

3. The system of claim 1, wherein the adaptive persistence algorithm comprises applying persistence on movement detections within the plurality of advanced overlay data frames to stabilize the movement of the false color overlay across the plurality of advanced overlay data frames.

4. The system of claim 3, wherein applying the persistence on the movement detections comprises executing one or more of:
- a hysteresis-based tracking algorithm;
- a Kalman filter-based tracking algorithm;
- a particle filter-based tracking algorithm; or
- a SLAM (simultaneous localization and mapping) based tracking algorithm.

5. The system of claim 1, further comprising an inertial measurement unit (IMU) associated with the image sensor, wherein the IMU measures movement of the image sensor in real-time; and
- wherein the image signal processor further receives sensor data from the IMU; and
- wherein the adaptive persistence algorithm comprises stabilizing the movement of the false color overlay at least based on the sensor data from the IMU.

6. The system of claim 5, wherein the image signal processor is further configured to automatically adjust one or more of a hysteresis or a memory of the adaptive persistence algorithm in real-time.

7. The system of claim 6, wherein the image signal processor adjusts the one or more of the hysteresis or the memory of the adaptive persistence algorithm in real-time based at least on a velocity of movement of the image sensor determined based on the sensor data from the IMU.

8. The system of claim 6, wherein the image signal processor adjusts the one or more of the hysteresis or the memory of the adaptive persistence algorithm in real-time based at least on a velocity of movement of the image sensor determined based on motion tracking of objects within sequential data frames output by the image sensor.

9. The system of claim 1, wherein the image sensor comprises two image sensors that simultaneously output a plurality of stereo pairs of data frames; and
- wherein the system further comprises a controller that provides the plurality of stereo pairs of data frames to an algorithm configured to generate a plurality of disparity maps, wherein each of the plurality of disparity maps is calculated based on a stereo pair of data frames.

10. The system of claim 9, wherein the controller is further configured to provide relative positions of the two image sensors and the plurality of disparity maps to an algorithm configured to calculate a three-dimensional topographical map of a scene using triangulation.

11. The system of claim 1, further comprising an emitter comprising a plurality of electromagnetic sources comprising a white light source and further comprising one or more of:
- a plurality of excitation sources configured to emit electromagnetic radiation within a waveband selected for fluorescing a tissue or reagent; or
- a plurality of multispectral sources configured to emit electromagnetic radiation within a waveband selected for eliciting a spectral response from a tissue.

12. The system of claim 1, wherein each of the plurality of advanced data frames comprises one or more of:
- a fluorescence data frame detected in response to an emitter emitting a fluorescence excitation wavelength of electromagnetic radiation selected to fluoresce one or more of a tissue or a reagent; or
- a multispectral data frame detected in response to the emitter emitting a multispectral wavelength of electromagnetic radiation selected to elicit a spectral response from a tissue and/or penetrate through a tissue.

13. The system of claim 1, wherein the image signal processor communicates with a deep learning algorithm configured to identify a target object within a scene based on one or more of the plurality of advanced data frames; and
- wherein the false color overlay highlights the target object within the scene, and wherein the target object comprises one or more of an arterial tissue, a venous tissue, a nervous tissue, a cancerous tissue, a tissue perfusion, or a ureter tissue.

14. The system of claim 13, wherein the false color overlay is rendered as a heatmap indicating a likelihood that a region comprises the target object.

15. The system of claim 13, wherein executing the adaptive persistence algorithm to stabilize movement of the false color overlay comprises:
- averaging a rolling window of the plurality of advanced data frames over time, wherein a quantity of data frames within the rolling window is determined at least in part on movement of the image sensor; and
- rendering the false color overlay based on the averaged advanced data frames to compensate for one or more of noise, light fluctuations, or algorithm uncertainties.

16. The system of claim 13, wherein executing the adaptive persistence algorithm to stabilize movement of the false color overlay comprises:
- identifying one or more pixels across a portion of the plurality of advanced data frames that is inconsistently identified as comprising the target object by the deep learning algorithm;
- averaging readings for each of the one or more pixels across the portion of the plurality of advanced data frames; and
- stabilizing the false color overlay across a corresponding portion of the advanced overlay data frames based on the averaged readings for each of the one or more pixels.

17. The system of claim 1, further comprising an inertial measurement unit (IMU) associated with the image sensor, wherein the IMU measures movement of the image sensor in real-time; and
- wherein stabilizing the movement of the false color overlay across the plurality of advanced overlay data frames comprises using x, y, z acceleration values retrieved from the IMU to automatically adjust one or more of a hysteresis or a memory of the adaptive persistence algorithm.

18. The system of claim 1, wherein stabilizing the movement further comprises stabilizing based on a temporal gradient of the plurality of data frames over time.

19. The system of claim 1, further comprising calculating an estimated movement of the image sensor based on differences two or more sequential data frames of the plurality of data frames;
- wherein stabilizing the movement of the false color overlay across the plurality of advanced overlay data frames comprises utilizing the estimated movement of the image sensor to automatically adjust one or more of a hysteresis or a memory of the adaptive persistence algorithm.

20. The system of claim 1, wherein the image signal processor automatically adjusts a forgetting factor for the adaptive persistence algorithm based on a velocity of movement of the image sensor.

* * * * *